(12) United States Patent
Neerincx et al.

(10) Patent No.: US 11,117,299 B2
(45) Date of Patent: Sep. 14, 2021

(54) METHOD OF MOLDING USING MOLD INSERTS AND APPARATUS THEREFOR

(71) Applicant: SABIC Global Technologies B.V., Bergen op Zoom (NL)

(72) Inventors: Peter Neerincx, Oisterwijk (NL); Ruud Heerkens, Bergen op Zoom (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 18 days.

(21) Appl. No.: 15/762,369

(22) PCT Filed: Sep. 23, 2016

(86) PCT No.: PCT/IB2016/055718
§ 371 (c)(1),
(2) Date: Mar. 22, 2018

(87) PCT Pub. No.: WO2017/051383
PCT Pub. Date: Mar. 30, 2017

(65) Prior Publication Data
US 2018/0257282 A1 Sep. 13, 2018

Related U.S. Application Data

(60) Provisional application No. 62/232,508, filed on Sep. 25, 2015.

(51) Int. Cl.
*B29C 45/26* (2006.01)
*B29C 45/56* (2006.01)
(Continued)

(52) U.S. Cl.
CPC .......... *B29C 45/561* (2013.01); *B29C 43/361* (2013.01); *B29C 45/14* (2013.01);
(Continued)

(58) Field of Classification Search
CPC ........ B29C 45/1628; B29C 2045/1629; B29C 2045/1631; B29C 2045/1632;
(Continued)

(56) References Cited

U.S. PATENT DOCUMENTS

| 4,249,872 A | 2/1981 | Akaura et al. |
| 4,435,147 A | 3/1984 | Myers et al. |

(Continued)

FOREIGN PATENT DOCUMENTS

| DE | 19745909 A1 | 4/1999 |
| DE | 102004002012 B4 | 8/2005 |

(Continued)

OTHER PUBLICATIONS

European Patent No. 1938944; Date of Publication: Jul. 2, 2008; Abstract Only, 1 page.

(Continued)

*Primary Examiner* — Ryan M Ochylski
(74) *Attorney, Agent, or Firm* — Cantor Colburn LLP

(57) ABSTRACT

A method for forming a part in an injection mold, includes: heating a molding material to a molding temperature; injecting the molding material through a gate and into a molding cavity of the injection molding apparatus of any of the preceding claims; pressing the stationary half and the moving half together to form the molding cavity between the resin mold surface and the insert molding surface; moving the movable mold insert, and thereby moving the insert molding surface and adjusting the molding cavity shape, the molding cavity depth, the molding cavity volume, or a combination comprising at least one of the foregoing along at least a portion of the molding cavity; cooling a surface of the molding cavity with the cooling system; separating the resin mold surface and the moving half mold surface; and ejecting the part from the injection molding apparatus.

11 Claims, 63 Drawing Sheets

(51) Int. Cl.
   *B29C 45/73* (2006.01)
   *B29C 43/36* (2006.01)
   *B29C 45/16* (2006.01)
   *B29C 45/14* (2006.01)
   *B29C 45/37* (2006.01)
   *B29K 67/00* (2006.01)
   *B29K 69/00* (2006.01)
   *B29K 105/00* (2006.01)
   *B29L 31/30* (2006.01)

(52) U.S. Cl.
   CPC ...... *B29C 45/1628* (2013.01); *B29C 45/2673* (2013.01); *B29C 45/73* (2013.01); *B29C 45/37* (2013.01); *B29C 2043/3621* (2013.01); *B29C 2045/564* (2013.01); *B29C 2045/7356* (2013.01); *B29K 2067/003* (2013.01); *B29K 2069/00* (2013.01); *B29K 2105/0094* (2013.01); *B29L 2031/3005* (2013.01)

(58) Field of Classification Search
   CPC ..... B29C 45/561; B29C 43/361; B29C 45/14; B29C 45/73; B29C 45/37; B29C 45/2673; B29C 2043/3621; B29C 2045/564; B29C 2045/7356; B29L 2031/3005
   See application file for complete search history.

(56) References Cited

U.S. PATENT DOCUMENTS

| | | | |
|---|---|---|---|
| 4,489,033 A | 12/1984 | Uda et al. | |
| 4,828,769 A | 5/1989 | Maus et al. | |
| 4,836,960 A | 6/1989 | Spector et al. | |
| 4,889,478 A | 12/1989 | Sato | |
| 5,458,818 A | 10/1995 | Kim et al. | |
| 6,296,799 B1 | 10/2001 | Sato et al. | |
| 6,468,381 B1 | 10/2002 | Morgan | |
| 6,645,414 B2 | 11/2003 | Reid, Jr. et al. | |
| 6,875,384 B1 | 4/2005 | Whitney | |
| 7,718,248 B2 | 5/2010 | Summerer | |
| 2006/0097425 A1 | 5/2006 | Okahara et al. | |
| 2006/0286916 A1 | 12/2006 | Clarke | |
| 2008/0143017 A1 | 6/2008 | Hoogland | |
| 2009/0168313 A1 | 7/2009 | Wei et al. | |
| 2012/0128866 A1* | 5/2012 | Eichlseder | B60R 1/0602 427/58 |
| 2013/0140735 A1 | 6/2013 | Fukumoto et al. | |
| 2013/0161844 A1 | 6/2013 | Takator et al. | |

FOREIGN PATENT DOCUMENTS

| | | |
|---|---|---|
| DE | 102014010573 A1 | 1/2016 |
| EP | 1938944 A1 | 7/2008 |
| WO | 8905718 A1 | 6/1989 |
| WO | 9014207 A1 | 11/1990 |
| WO | 2016088051 A1 | 6/2016 |
| WO | 2017051375 A1 | 3/2017 |

OTHER PUBLICATIONS

Fan et al. "Simulation of Injection-Compression Molding for Optical Media", Polymer Engineering and Science, 2003, vol. 43, No. 3; pp. 596-606.
German Patent No. 102004002012; Date of Publication: Mar. 23, 2006; Abstract Only, 1 page.
German Patent No. 102014010573; Date of Publication: Jan. 21, 2016; Abstract Only, 2 pages.
German Patent No. 19745909; Date of Publication: Apr. 22, 1999; Abstract Only, 1 page.
Hopmann et al., "Plastic Automobile Windows", Feb. 18, 2005; 2 pages.
International Search Report for International Application No. PCT/IB2016/055718; dated Dec. 8, 2015; 4 pages.
Javierre et al., "Criteria on Feeding System Design: Conventional and Sequential Injection Moulding", Journal of Materials Processing Technology 171, 2006, pp. 373-384.
Written Opinion of the International Search Report for International Application No. PCT/IB2016/055718; dated Dec. 8, 2015; 8 pages.

* cited by examiner

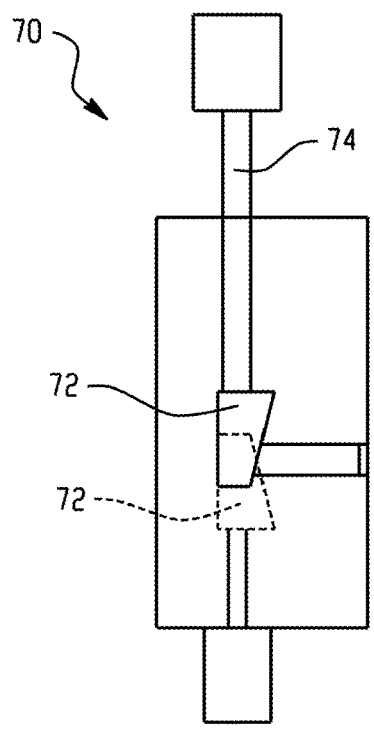
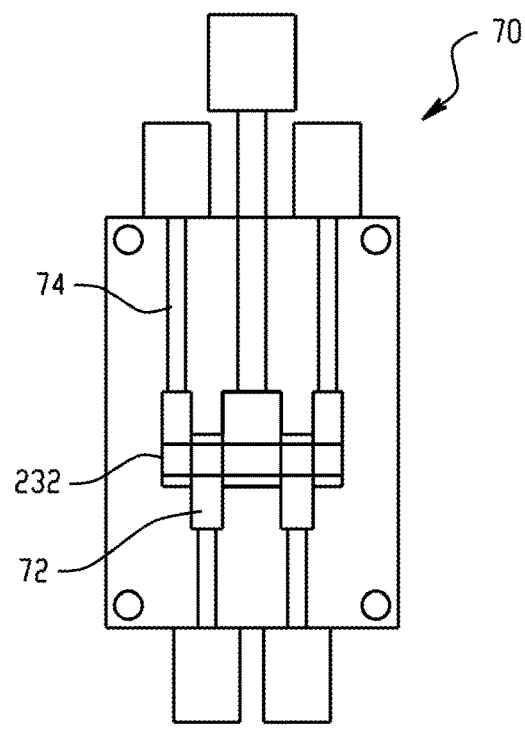
Fig. 18A
Fig. 18B
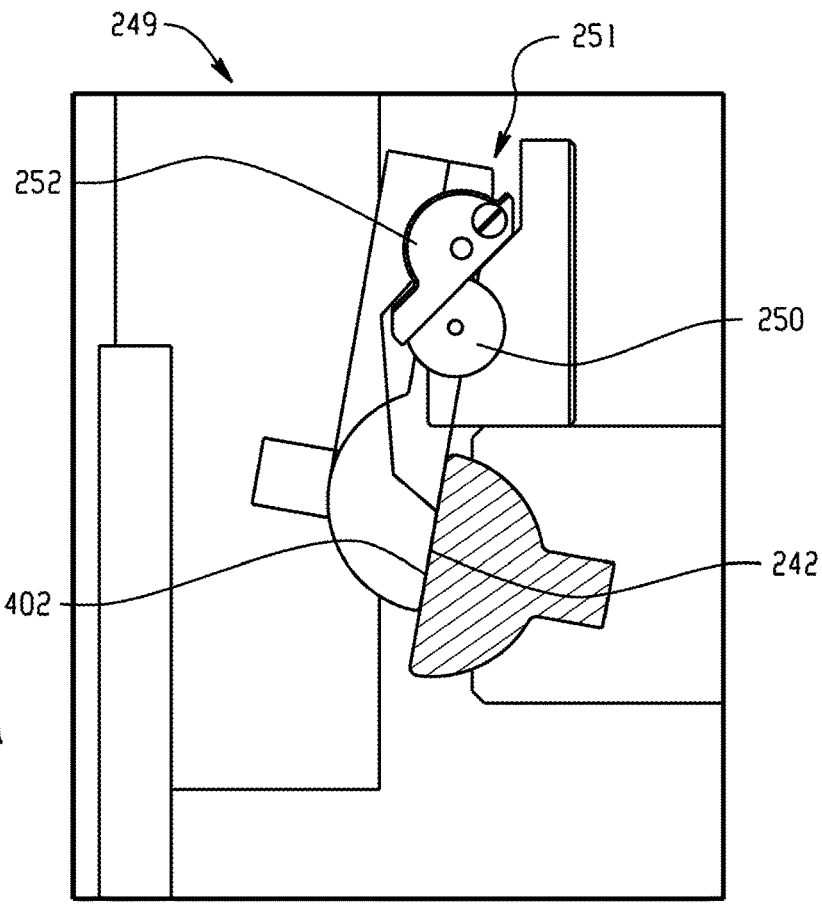
Fig. 19A

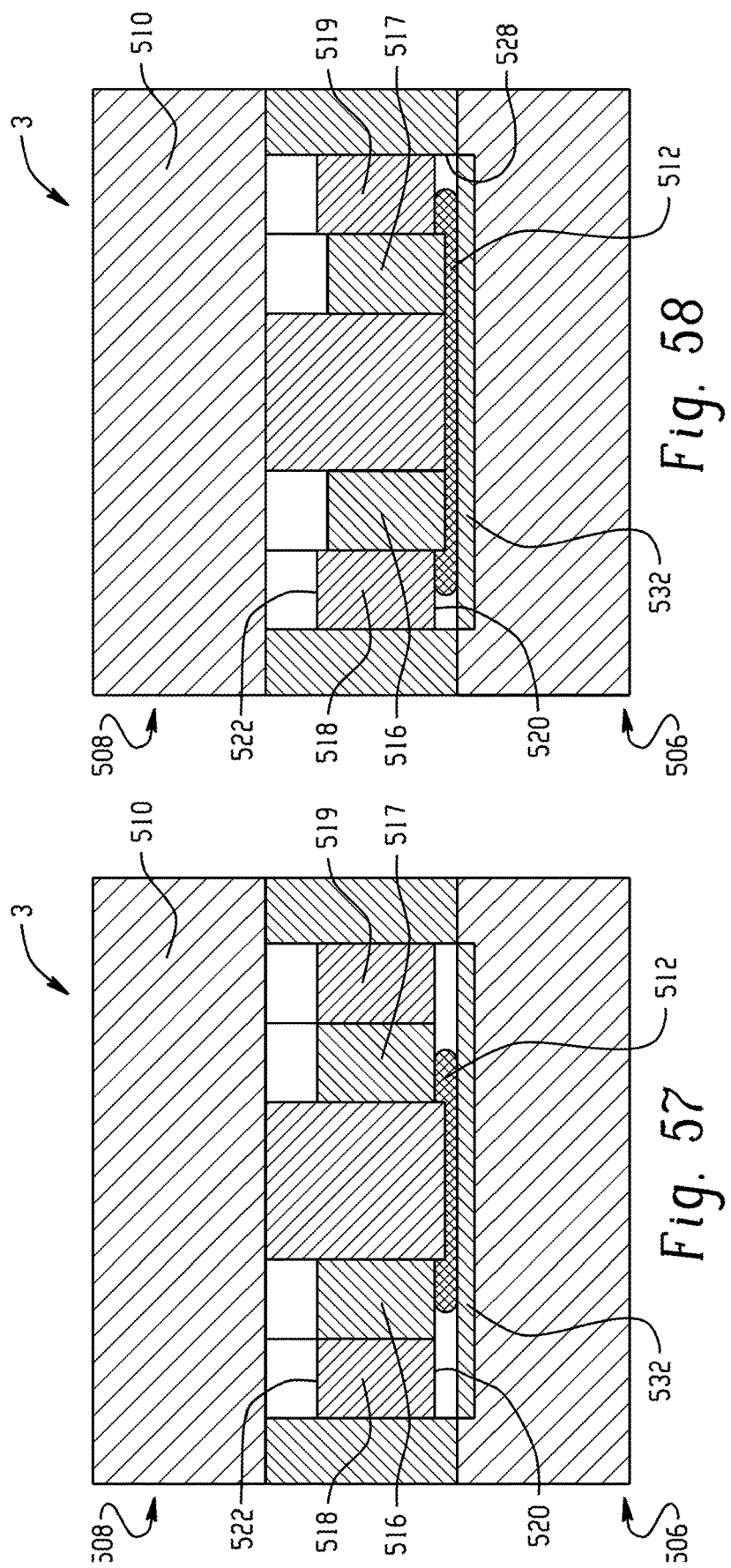

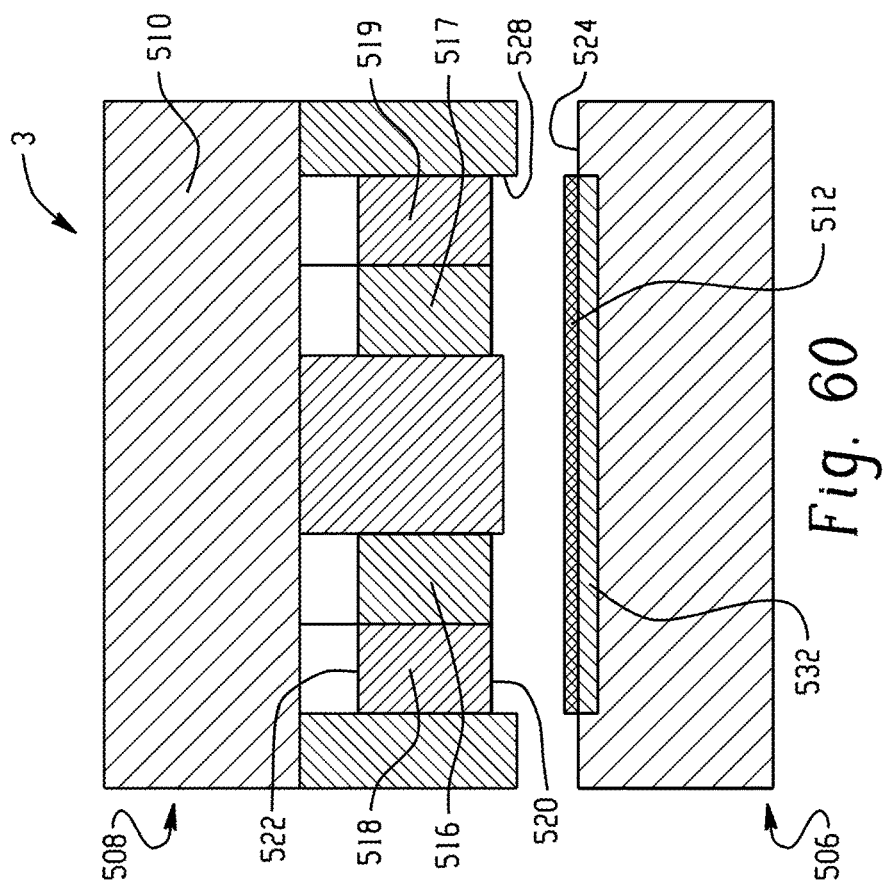
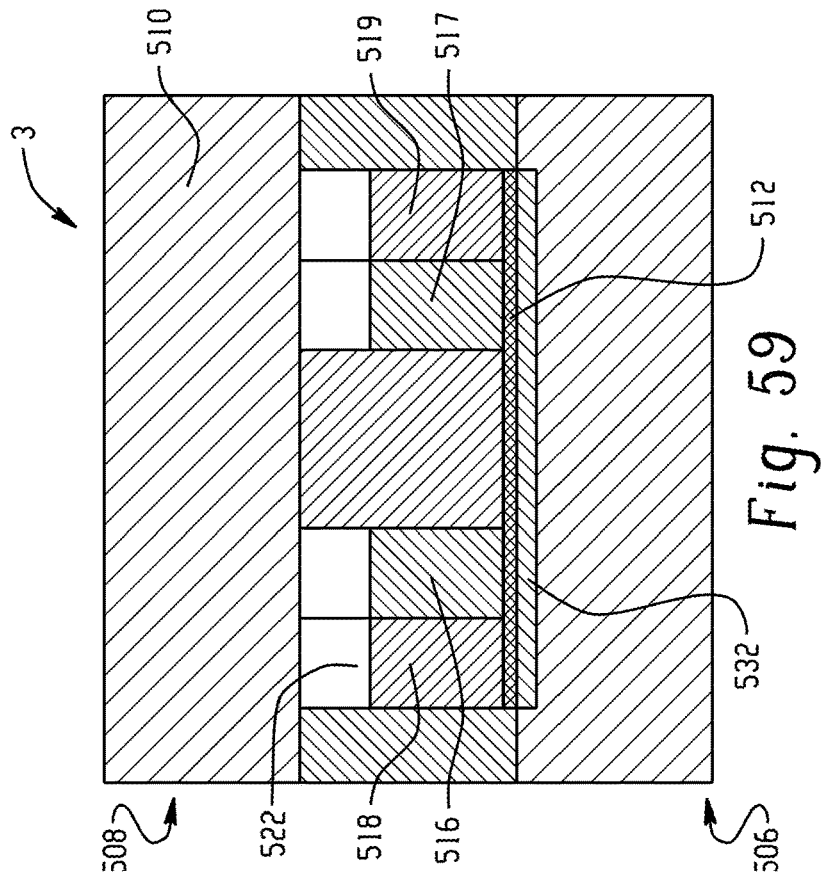

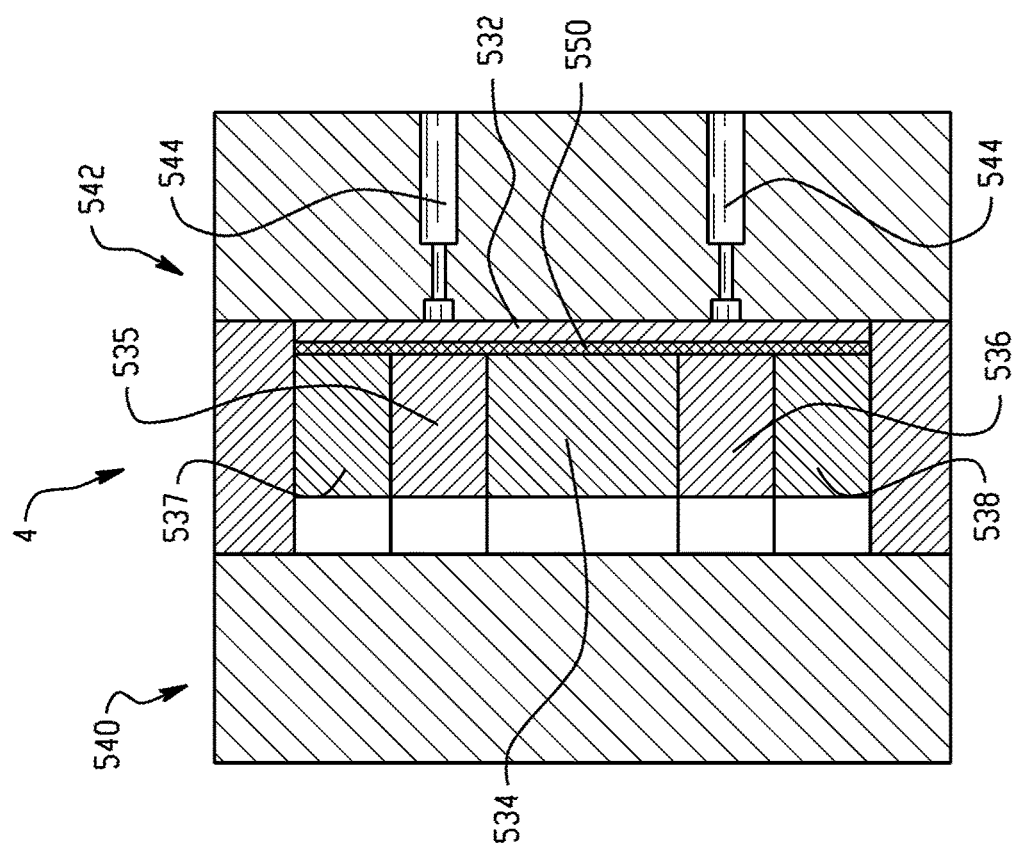
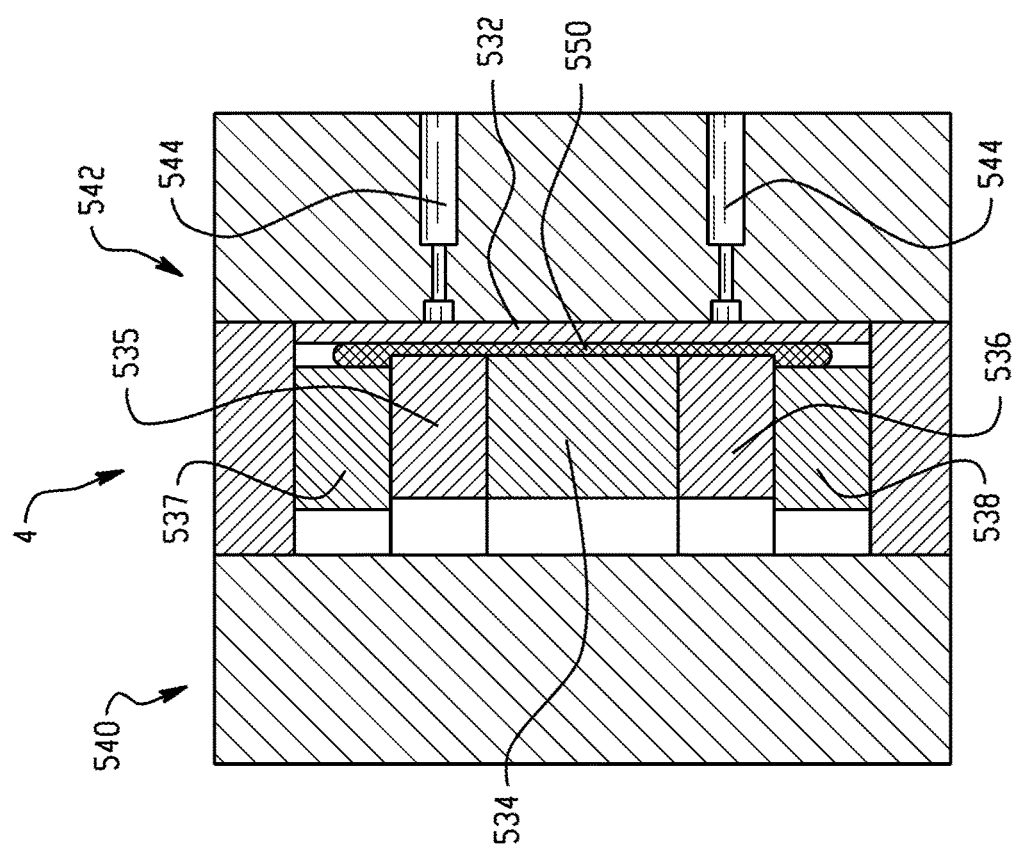

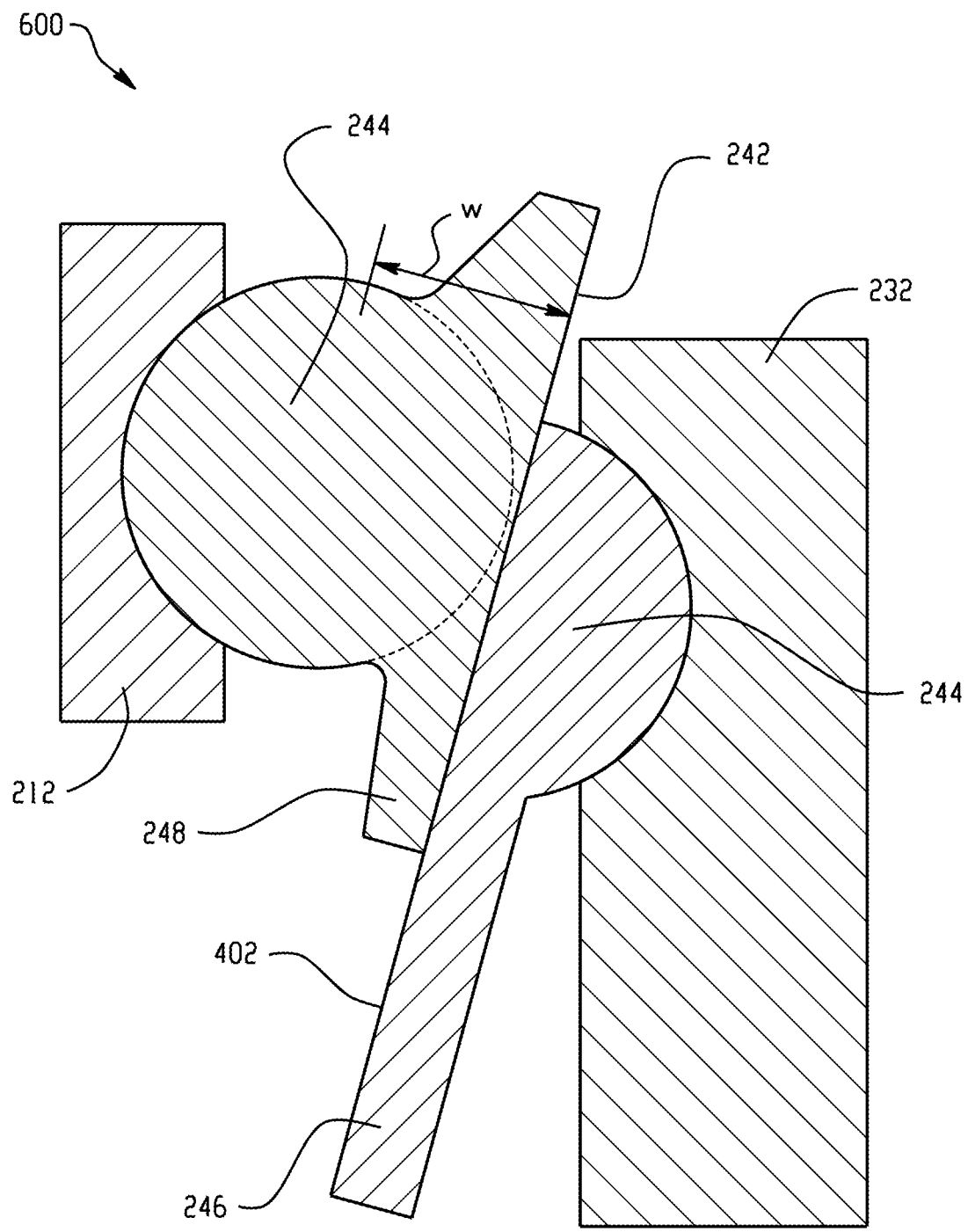
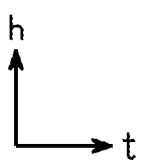
Fig. 76A

METHOD OF MOLDING USING MOLD INSERTS AND APPARATUS THEREFOR

CROSS REFERENCE TO RELATED APPLICATIONS

This application is a 371 of International Application No. PCT/IB2016/055718, filed Sep. 23, 2016, which claims priority to U.S. Application No. 62/232,508, filed Sep. 25, 2015, both of which are incorporated herein by reference in their entirety.

BACKGROUND

A molding apparatus (e.g., an injection molding apparatus, compression molding apparatus, etc.) can include a stationary half and a moving half. These halves can be brought together by relative movement of the two halves. When together, molding surfaces from either half can combine to form a part forming mold cavity. In injection molding, a passage can convey material to be molded (e.g., material which is molten or at a temperature greater than its glass transition temperature), also referred to as the shot, from the injection machine to the mold cavity. A sprue passage can convey the shot through a gate and into the part forming mold cavity.

Injection molding can rely on presses to press the material to be molded into the part forming mold cavity during a molding process. The pressure exerted by an injection molding machine on the molding material is related to the force of the injection molding machine and to the size of the projected area of the molded part. Thus, molded parts having large projected areas can be difficult to injection mold at least in part due to the availability of injection molding machines which can generate the required force needed to mold the part with the large projected area.

Compression molding presses are available in various sizes; however there are limitations as to the feasible part size that can be produced with this process. The drive to create lightweight, thinner parts can put a compression molding process outside its processing window such that process stability, dimension control, and mechanical performance can be adversely affected.

BRIEF DESCRIPTION

An injection molding apparatus includes: a stationary half comprising: a resin mold surface, an opening in the resin mold surface defining a gate, an injection passage extending from the gate through a thickness of the stationary half; and an injector for introducing a molding material through the injection passage and into the molding cavity; a moving half disposed opposite the stationary half; a movable mold insert in mechanical communication with the moving half and comprising an insert molding surface and an insert pressing surface, wherein the movable mold insert is disposed between the moving half and the stationary half and wherein the insert molding surface and the resin mold surface face one another, wherein a molding cavity is formed between the insert molding surface and the resin mold surface; and a moveable insert actuator in mechanical communication with the moving half and the insert pressing surface of the movable mold insert, wherein the movable insert actuator is configured to move the movable mold insert adjusting a molding cavity shape, a molding cavity depth, a molding cavity volume, or a combination comprising at least one of the foregoing; or a movable mold insert in communication with the stationary half and comprising an insert molding surface and an insert pressing surface, wherein the movable mold insert is disposed between the moving half and the stationary half and wherein the insert molding surface and a moving half molding surface face one another, wherein a molding cavity is formed between the insert molding surface and the resin mold surface; and a movable insert actuator in mechanical communication with the stationary half and the insert pressing surface of the movable mold insert, wherein the movable insert actuator is configured to move the movable mold insert adjusting a molding cavity shape, a molding cavity depth, a molding cavity volume, or a combination comprising at least one of the foregoing.

A method for forming a part in an injection mold includes: heating a molding material to a molding temperature, wherein the molding temperature is greater than or equal to at least one of a glass transition temperature or a melting point temperature of the molding material; injecting the molding material through a gate and into a molding cavity of the injection molding apparatus of any of the preceding embodiments; pressing the stationary half and the moving half together to form the molding cavity between the resin mold surface and the insert molding surface; moving the movable mold insert, and thereby moving the insert molding surface and adjusting the molding cavity shape, the molding cavity depth, the molding cavity volume, or a combination comprising at least one of the foregoing along at least a portion of the molding cavity; cooling a surface of the molding cavity with the cooling system; separating the resin mold surface and the moving half mold surface; and ejecting the part from the injection molding apparatus.

A compression molding apparatus includes: a movable mold insert in mechanical communication with a moving half and comprising an insert molding surface and an insert pressing surface, wherein the movable mold insert is disposed between the moving half and a stationary half and wherein the insert molding surface and the resin mold surface face one another, wherein a molding cavity is formed between the insert molding surface and the resin mold surface; and a moveable insert actuator in mechanical communication with the moving half and the insert pressing surface of the movable mold insert, wherein the movable insert actuator is configured to move the movable mold insert adjusting a molding cavity shape, a molding cavity depth, a molding cavity volume, or a combination comprising at least one of the foregoing; or a movable mold insert in communication with the stationary half and comprising an insert molding surface and an insert pressing surface, wherein the movable mold insert is disposed between the moving half and the stationary half and wherein the insert molding surface and a moving half molding surface face one another, wherein a molding cavity is formed between the insert molding surface and the resin mold surface; and a movable insert actuator in mechanical communication with the stationary half and the insert pressing surface of the movable mold insert, wherein the movable insert actuator is configured to move the movable mold insert adjusting a molding cavity shape, a molding cavity depth, a molding cavity volume, or a combination comprising at least one of the foregoing.

The above described and other features are exemplified by the following figures and detailed description.

BRIEF DESCRIPTION OF THE DRAWINGS

Refer now to the figures, which are exemplary embodiments, and wherein the like elements are numbered alike.

FIG. 18A is a side view of another movable insert actuator with wedges that are driven individually by individual hydraulic cylinders.

FIG. 18B is a front view of another movable insert actuator with wedges that are driven individually by individual hydraulic cylinders.

FIG. 19A is a cross-sectional view of a molding apparatus having another mold insert and another movable insert actuator.

FIG. 57 is a cross-sectional illustration of the molding apparatus of FIG. 56 in a closed position with the mold inserts in a first position.

FIG. 58 is a cross-sectional illustration of the molding apparatus FIG. 57 in a closed position with the mold inserts in a second position.

FIG. 59 is a cross-sectional illustration of the molding apparatus of FIG. 58 in a closed position with the mold inserts in a third position.

FIG. 60 is a cross-sectional illustration of the molding apparatus of FIG. 59 in an open position with the formed part.

FIG. 67 is a cross-sectional illustration of the molding apparatus of FIG. 66 in a closed position with the mold inserts in a third position.

FIG. 68 is a cross-sectional illustration of the molding apparatus of FIG. 67 in a closed position with the mold inserts in a fourth position.

FIG. 76A is a cross-sectional view of a molding apparatus having another mold insert and another movable insert actuator.

DETAILED DESCRIPTION

Figure 1:
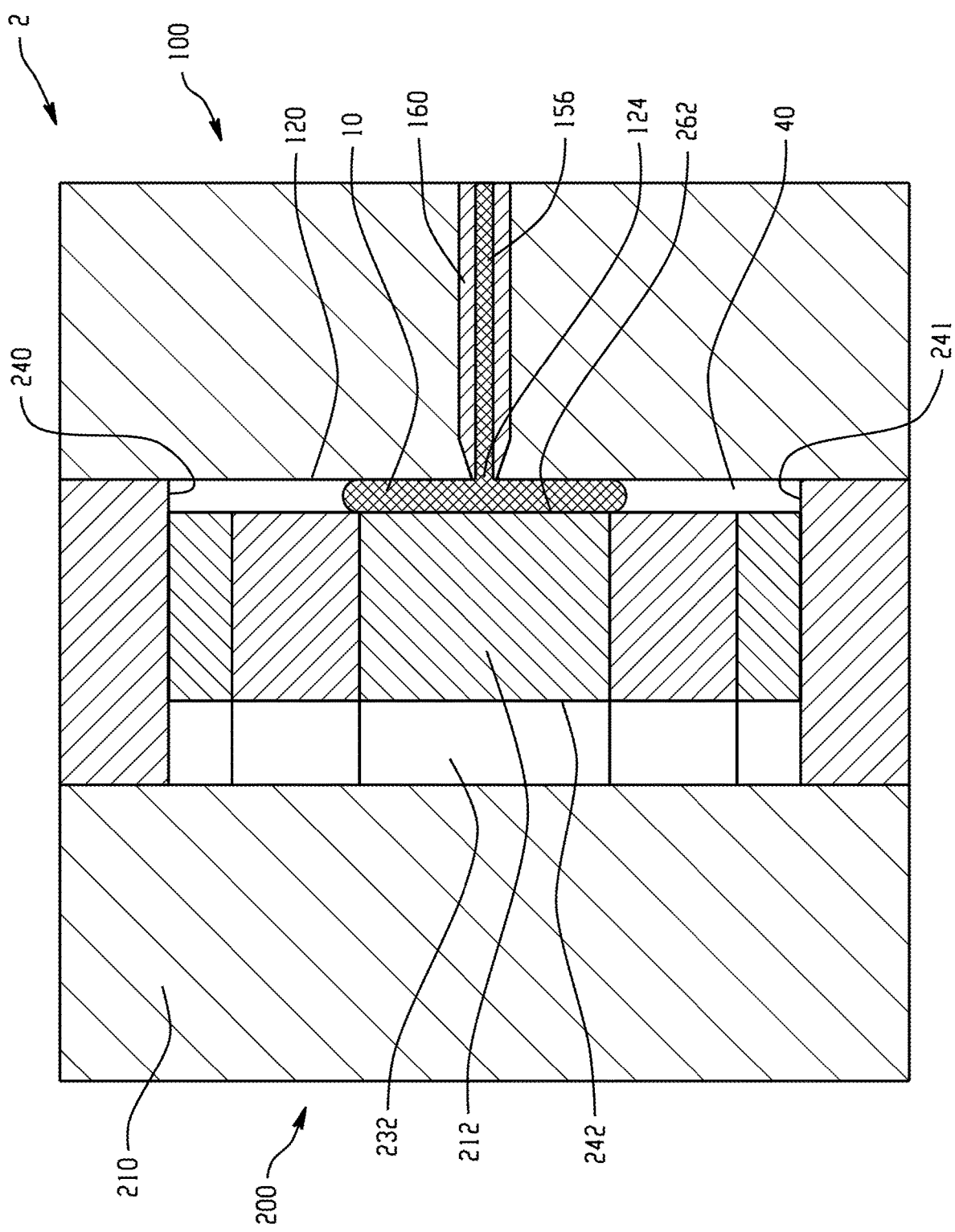
FIG. 1 is a cross-sectional illustration of a molding apparatus in an open position where a moving half of the molding apparatus is stationary during the compression phase of the injection molding cycle.

Advantages of molded parts in comparison to formed parts (e.g., vacuum formed, thermoformed and the like) can include reduced material handling operations, reduced number of secondary manufacturing operations, reduced part cycle time, improved reproducibility, reduced scrap, or a combination including at least one of the foregoing. For example, molding can produce a part where trimming, sanding, buffing, painting, coating, and/or other post forming secondary processes used to achieve the final form of the part can be reduced or eliminated. Molded parts can also utilize thermoplastic materials. In that regard, thermoplastic parts can offer improved reusability, recyclability, and the like in comparison to thermoset parts due to the nature of thermoset materials. However, the clamping force needed to mold large parts (e.g., parts having projected area of greater than or equal to 1.2 square meters ($m^2$)) can be significant and can exceed the capability of some molding apparatus (e.g., injection molding, compression molding, etc.). For example, a part having a projected area of 2 $m^2$ and a thickness of 4 millimeters (mm) can rely on a clamping force of greater than or equal to 80 megaNewtons (MN). Herein the term "projected area" can refer to the area of a projection of a side of a three dimensional part as measured along an arbitrary plane, e.g., the h-d plane in the accompanying figures.

The molding apparatus and method disclosed herein can mold large parts (e.g., parts having a projected area of greater than or equal to 1.2 square meters ($m^2$)) with reduced clamping force in comparison to other methods making the same size parts. For example, the clamping force of the molding apparatus can be reduced by dividing the projected area of the molded part into sections while maintaining the total clamping force and applying it independently to each section, thereby increasing the clamping force per projected area applied to each section accordingly. The sections can be pressed to a final position independently such that the pressing of the halves can be done in any order (e.g., sequentially, simultaneously, patterned). Fragmented injection compression molding can decrease the amount of clamping force used to fill the mold by greater than or equal to 25% as compared a standard injection molding apparatus and method, e.g., compact injection molding, sequential injection molding, injection compression molding, etc. The molding apparatus and method disclosed herein (e.g., fragmented injection compression molding apparatus) can decrease the amount of clamping force used to fill the mold by greater than or equal to 75% as compared to a standard injection molding apparatus and method. The molding apparatus and method disclosed herein (e.g., fragmented injection compression molding) can decrease the amount of clamping force used to fill the mold by up to 85% as compared to a compression injection molding apparatus and method. The disclosed molding apparatus and method can also be used to mold parts having a projected area of less than 1.2 $m^2$, while reducing the clamping force used to fill the mold as compared to other injection molding processes. Thinner parts, e.g., thinner parts as compared to the thickness of parts made using current techniques available on the market can be molded with the disclosed molding apparatus due to the movement of the molding inserts.

Other advantages to using the process disclosed herein can include, but are not limited to the ability to injection mold a viscous material, molding at low melt temperatures of the polymer being molded, ability to use a low dispersion speed, ability to use a faster injection speed leading to shorter cycle times (e.g., for medical parts), ability to mold thinner parts, ability to mold at a lower mold temperature, and the ability to mold parts with less molded in stress. These advantages are possible because of the more efficient melt spreading in the apparatus and methods disclosed herein. Viscous material as described herein refers to a material having a melt flow rate (measured in grams per 10 minutes) of less than or equal to 12, for example, 3 to 12, or even lower. Extrusion grade material can even be injection molded having melt flow rates of less than or equal to 5. Low melt temperatures refers to the ability to mold the material at a temperature lower than average for molding the material. For example, with the apparatus disclosed herein, polycarbonate, even polycarbonate containing additives, can be injection molded at a temperature of less than or equal to 240° C., where polycarbonate is typically processed at temperatures of 300° C. or higher. A low dispersion speed generally refers to injecting at a shear rate of 50 to 100,000 $s^{-1}$, for example, 50 to 10,000 $s^{-1}$, for example, 50 to 1,000 $s^{-1}$.

Further advantages can be realized in the ability to overmold parts where mold inserts can be used to assist in removal of parts from the mold cavity after formation and particularly, in compression molding where the use of a vertical press can make an overmolding process simple since gravity functions to keep the inlay in position during the overmolding process.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Turning now to FIGS. 1 to 4, a molding apparatus 2 is illustrated. FIG. 1 is an illustration of a cross-sectional view of the molding apparatus 2 in an open position. The molding apparatus 2 can have a stationary half 100 and a moving half 200. In this molding apparatus 2, the moving half 200 can remain stationary during the compression phase of the injection molding cycle. The stationary half 100 can include a resin mold surface 120, a runner 160 (e.g., a hot runner), and a sprue passage 156 (e.g., injection passage). The resin mold surface 120 can include an opening defining a gate 124 where the molding material 10 can enter a mold cavity 40. The sprue passage 156 can guide the molding material 10 through the stationary half 100, through the gate 124 and into the mold cavity 40. The molding apparatus 2 can include any number of sprue passages 156 and/or gates 124 which can direct the molding material 10 to selected locations of the mold cavity 40, resin mold surface 120, or a combination including at least one of the foregoing. The gate 124 can be selected from an edge gate, a fan gage, a sub gate, a flash gate, a film gate, a disk gate, a sprue gate 124, or a ring gate. A runner system can be located on the stationary half 100 of the mold to assist in evenly distributing molten plastic in the mold cavity 40 under equal temperature and pressure. The runner system can include a cold runner system or a hot runner system. In either system, it is desirable for all molded parts in a mold (e.g., in a multi-cavity mold) to fill at exactly the same time to avoid over-packing early filling parts of the mold (e.g., first portion 41).

The moving half 200 can include a support plate 210. The support plate 210 can be pressed to impart pressure on the molding material 10 in the molding cavity 40.

The molding apparatus 2 can include a movable mold insert 212. The movable mold insert 212 can be disposed in the moving half 200, the stationary half 100, or the movable mold insert 212 can be disposed in both halves. The movable mold insert 212 can be positioned horizontally in the mold apparatus 2. The moldable mold insert 212 can be positioned vertically in the mold apparatus 2. The moveable mold insert 212 can include an insert molding surface 262 and an insert pressing surface 242. The insert molding surface 262 can be disposed opposite the insert pressing surface 242. The insert molding surface 262 can face the resin mold surface 120 of the stationary half 100 when the movable mold insert 212 is disposed in the moving half 200. Likewise, when the movable mold insert 212 is disposed in the stationary half 100, the insert molding surface can face the moving half 200. The molding apparatus 2 of FIGS. 1 to 4 is shown having five movable mold inserts 212 along the cross-section, however the molding apparatus 2 can include any number of movable mold inserts 212. For simplicity, and ease of understanding, reference to the movable mold insert 212 in the following description can refer to any one, or combination of any of, the movable mold inserts 212.

The moving half 200 can be in mechanical communication with the movable mold insert 212. The moving half 200 can include a movable insert actuator 232. The movable insert actuator 232 can be in mechanical communication with the movable mold insert 212. The movable insert actuator 232 can be in mechanical communication with the moving half 200 or any element thereof. For example, elements can include a platen, plate, support plate 210, pin, drive shaft, drive plate, drive coupling, and the like. The movable insert actuator 232 can be in mechanical communication with the movable mold insert 212 (e.g., the insert pressing surface 242) and the moving half 200 or any element thereof (e.g., the support plate 210). The movable insert actuator 232, or a portion thereof, can be disposed at least partially between the moving half 200 and the movable mold insert 212.

The movable insert actuator 232, the moving half 200, any element of the moving half 200, or a combination including at least one of the foregoing, can cooperate in moving the movable mold insert 212 relative to the moving half 200, the stationary half 100, or both. For example, the movable insert actuator 232 can be in mechanical communication with an actuation system, e.g., hydraulic element (e.g., a piston or ram), pneumatic, electro mechanic a mechanical mechanism (e.g., hydraulic, pneumatic, screw), electromechanical mechanism (e.g., induction), and the like which can move the movable insert actuator 232 and correspondingly move the insert molding surface 262 toward the resin mold surface 120.

When the molding apparatus 2 is in the open position (e.g., FIG. 1) the mold cavity 40, disposed between the insert molding surface 262 and the resin mold surface 120, is correspondingly open (e.g., where the molding material 10 is not spatially confined within the molding cavity 40, with the exception of flow passages, such as the gate 124 where the molding material 10 can be introduced to the molding cavity 40).

In the open position, the molding cavity 40, disposed between the insert molding surface 262 and the resin mold surface 120, can be further defined by a first mold cavity edge 240, and a second mold cavity edge 241.

Figure 2:
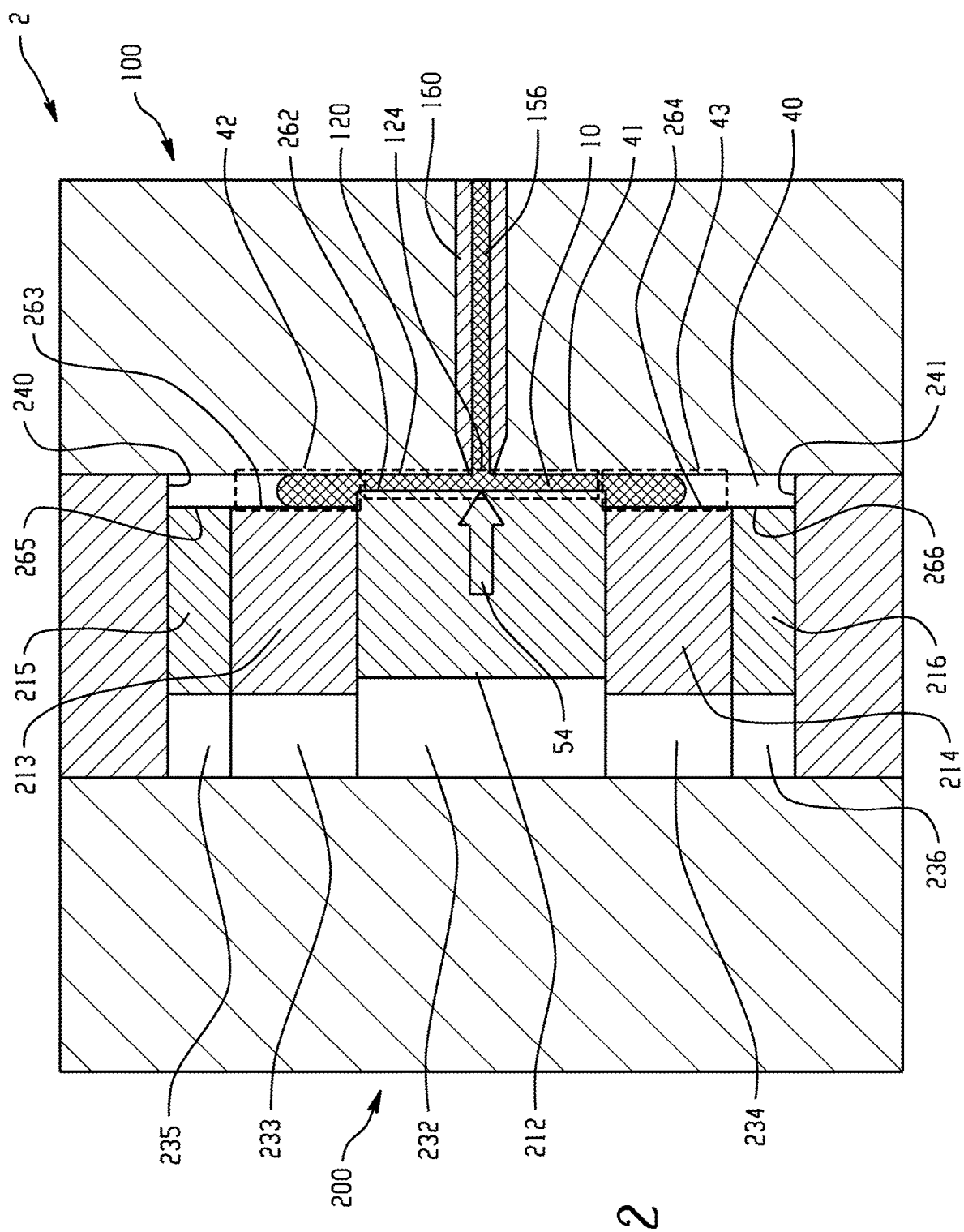
FIG. 2 is a cross-sectional illustration of the molding apparatus of FIG. 1 in a closed position where the mold inserts are in a first position.

Pressure applied to a clamp toggle by a clamp cylinder can hold the moving half 200 in a forward position to bring the stationary half 100 and the moving half 200 together into a closed position (e.g., FIG. 2). The clamp toggle can operate using any mechanism for moving the halves, such as a mechanical mechanism (e.g., hydraulic, pneumatic, screw), electromechanical mechanism (e.g., induction), and the like.

FIG. 2 is an illustration of a cross-sectional view of the molding apparatus 2 in the closed position. In the closed position, a portion of the stationary half 100 and a portion of the moving half 200 can be in direct contact. In the closed position, the molding cavity 40, disposed between the insert molding surface 262 and the resin mold surface 120, can be further defined by the first mold cavity edge 240 and the second mold cavity edge 241. In the closed position, the molding cavity 40 can be correspondingly closed (e.g., where the molding material 10 is spatially confined within the molding cavity 40, with the exception of flow passages, such as the gate 124 where the molding material 10 can be introduced to the molding cavity 40). The movable mold insert 212 can be moved relative to the moving half 200 and can correspondingly change a molding cavity shape, a molding cavity area, a molding cavity thickness (e.g., as measured along the t dimension in the accompanying figures), a molding cavity depth (e.g., as measured along the d dimension in the accompanying figures), a molding cavity volume, or a combination including at least one of the foregoing.

The movable mold insert 212 can be configured to move relative to the moving half 200, any element of the moving half 200, or a combination including at least one of the foregoing. For example, the moveable mold insert 212 can be configured to move away from the support plate 210 toward the resin mold surface 120 of the stationary half 100.

Figure 3:
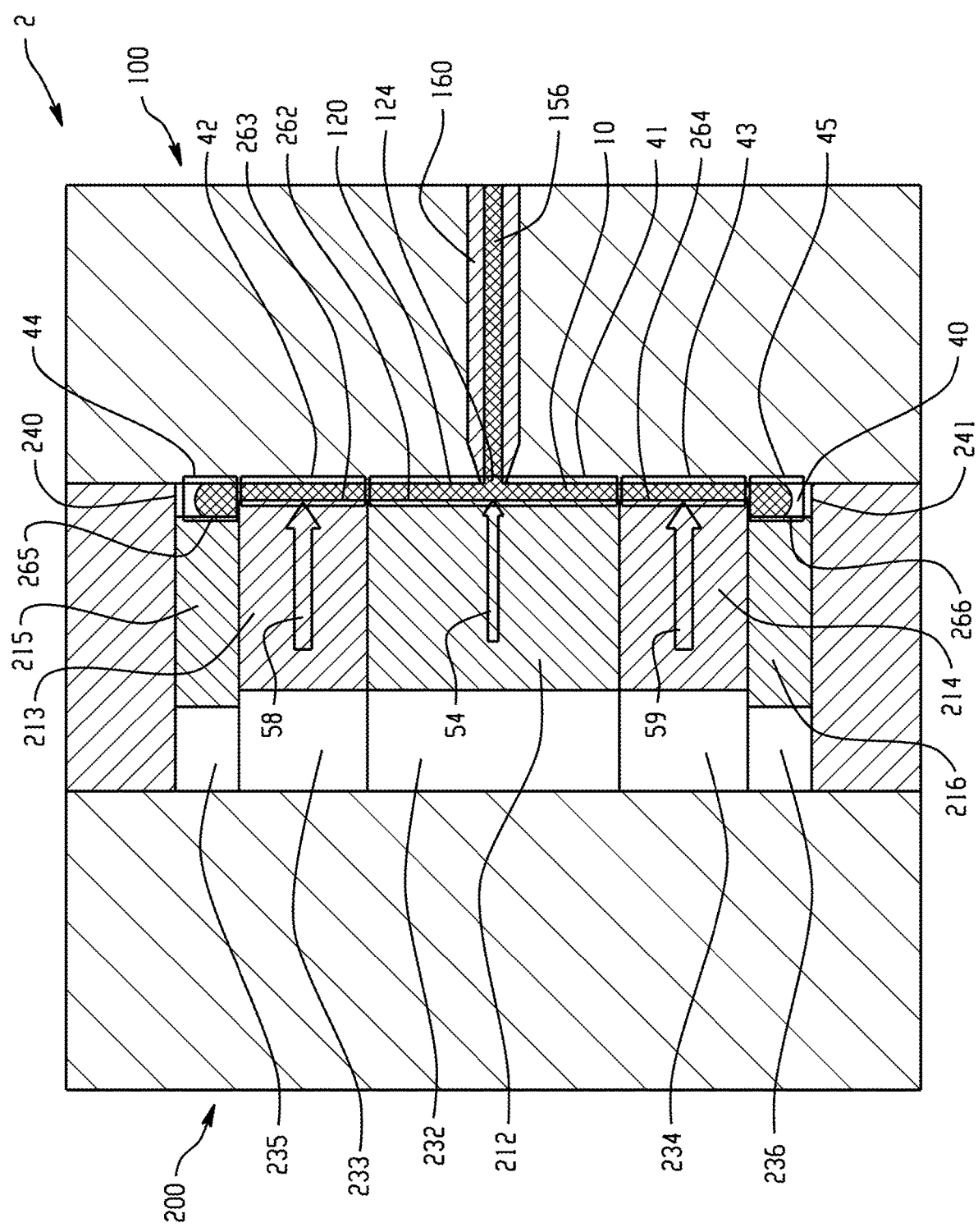
FIG. 3 is a cross-sectional illustration of the molding apparatus of FIG. 2 where the mold inserts are in a second position.
Figure 4:
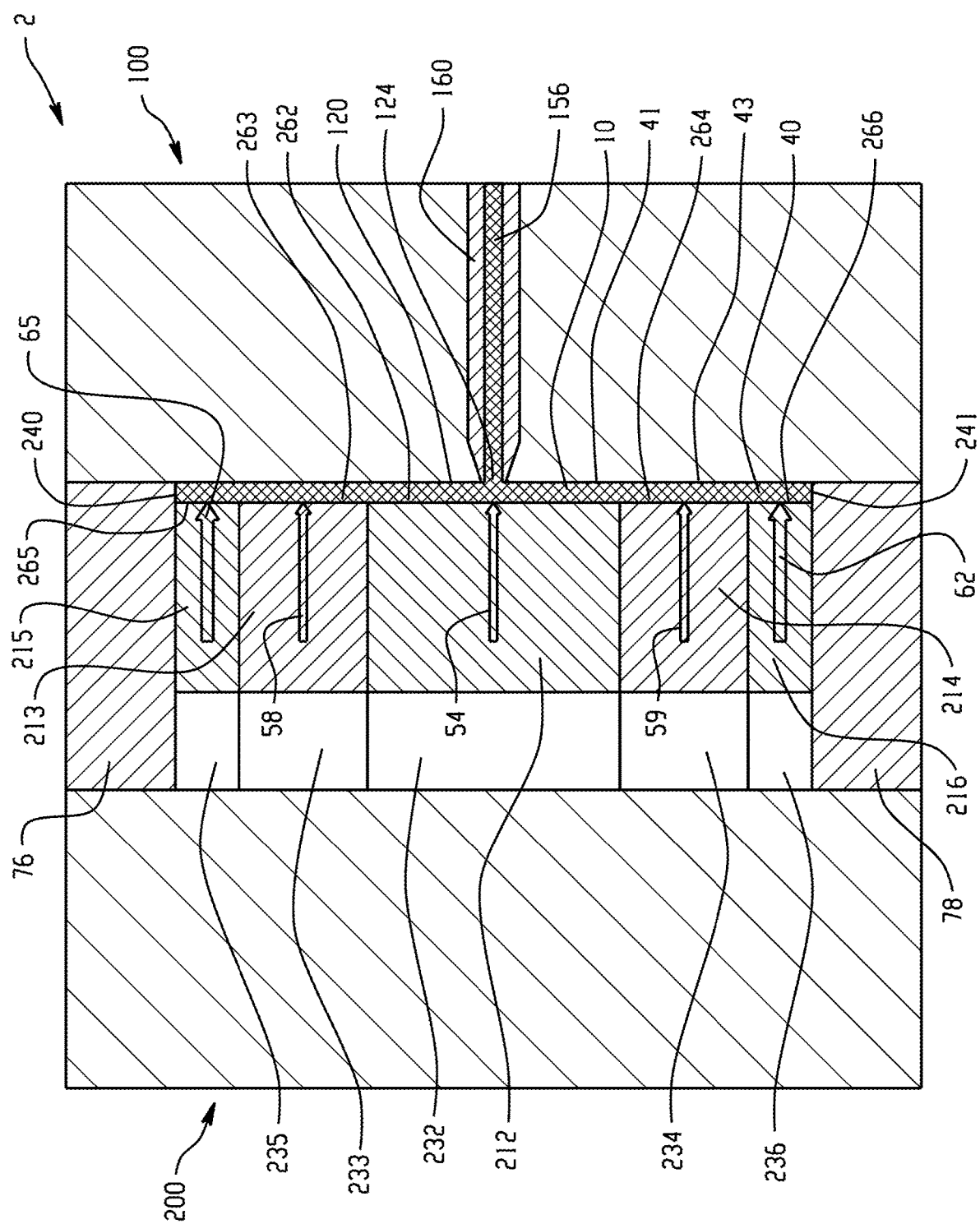
FIG. 4 is a cross-sectional illustration of the molding apparatus of FIG. 3 where the mold inserts are in a third position.
Figure 5:
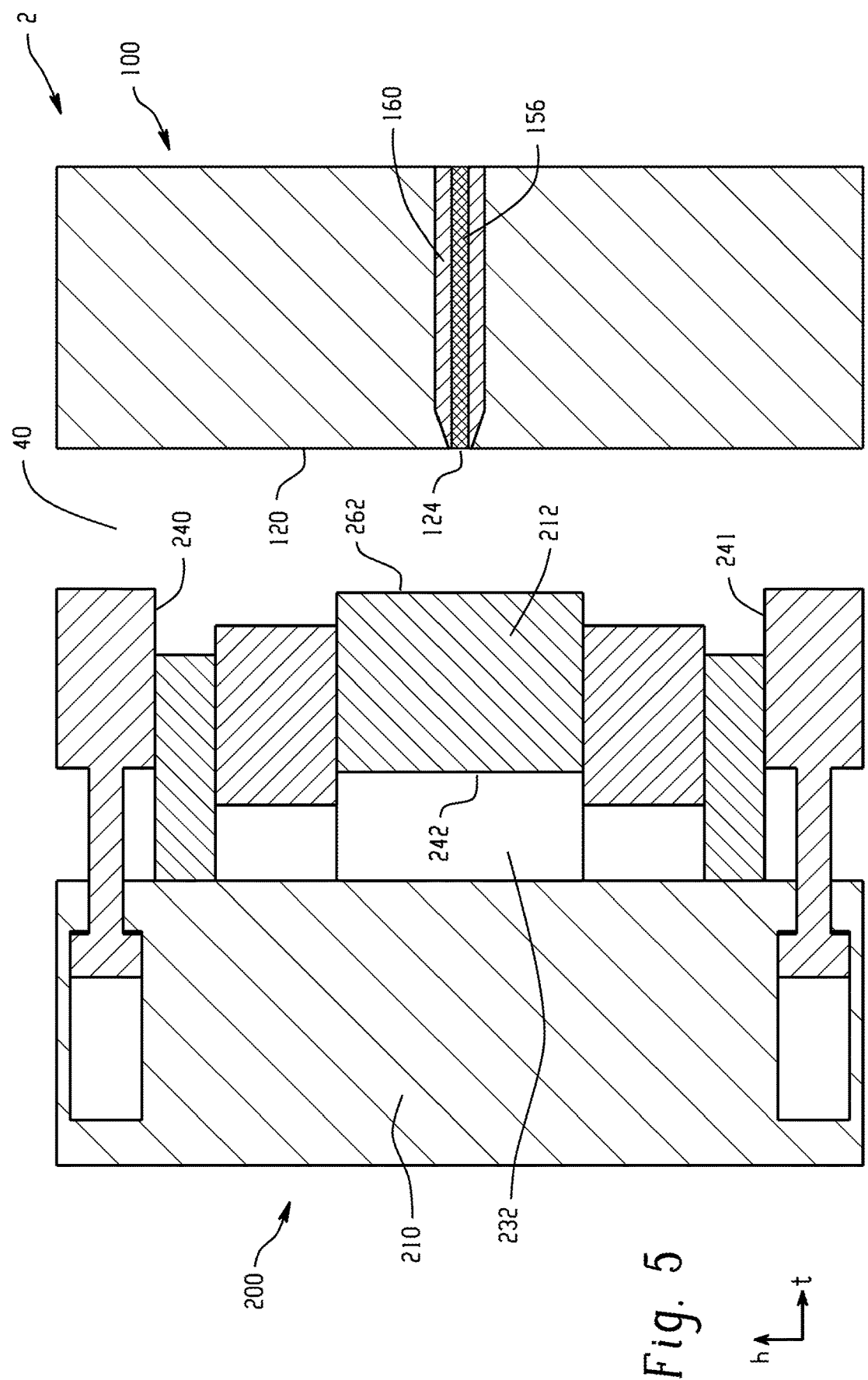
FIG. 5 is a cross-sectional illustration of a molding apparatus in an open position.
Figure 6:
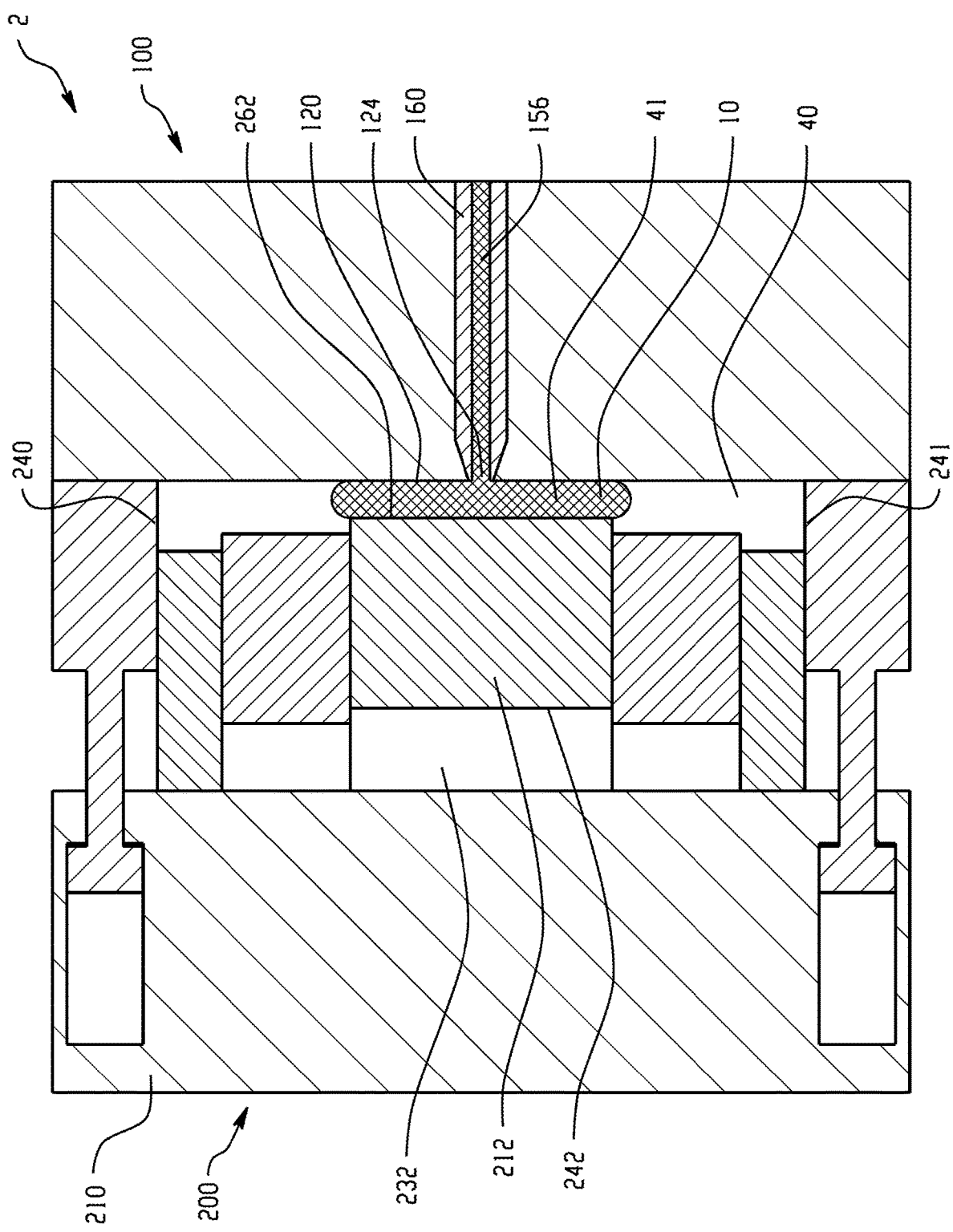
FIG. 6 is a cross-sectional illustration of the molding apparatus of FIG. 5 in a closed position where the mold inserts are in a first position.
Figure 7:
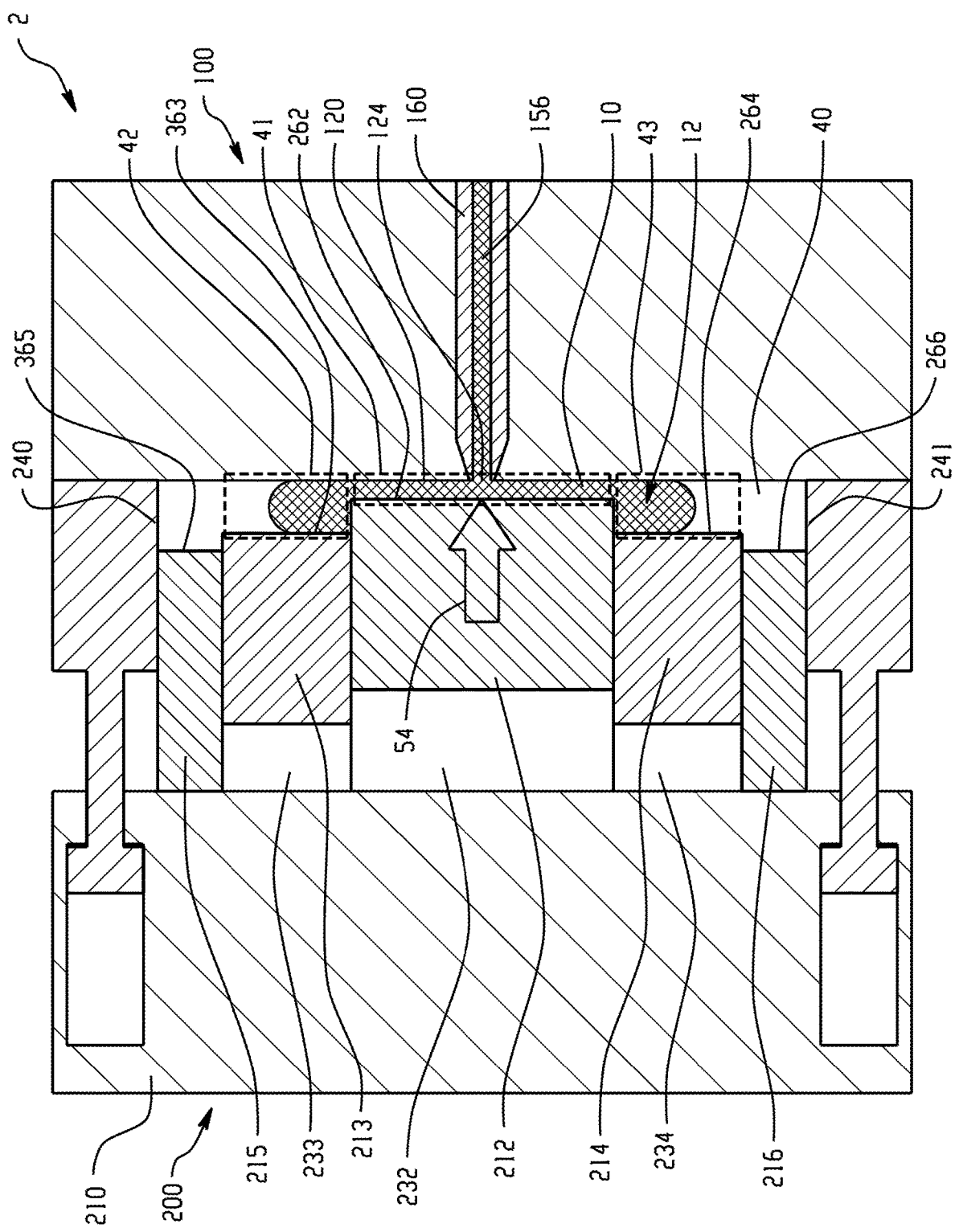
FIG. 7 is a cross-sectional illustration of the molding apparatus of FIG. 6 where the melt has been pushed further away from a first mold insert.

The following description is made in reference to FIGS. 2 to 4 which illustrate a molding process comprising the sequential operation of the molding apparatus 2. However, the present disclosure is not limited to such operation. It should be appreciated, that the described sequence can be altered without departing from the spirit of the disclosure.

As shown in FIG. 2, molding material 10 can be injected through the sprue passage 156 and runner 160 into the molding cavity 40 (e.g., into a runner system located on the resin mold surface 120). A first portion 41 of the molding cavity 40 can be defined by at least a portion of the resin mold surface 120 and the first insert molding surface 262. A first movable mold insert 212, comprising the first insert molding surface 262, can be moved toward the resin mold surface 120 by a first force 54. The first insert molding surface 262 can push against the molding material 10 forcing it out of the first portion 41 and into adjacent portions of the molding cavity 40. In this way, the molding material 10 can begin to spread into the remaining volume (e.g., unoccupied volume) of the molding cavity 40. The first force 54 can be imparted on the first movable mold insert 212 by a first movable insert actuator 232. The first force 54 can be varied throughout the molding process. The first force 54 can vary depending on various factors, including, but not limited to, the projected surface area of the insert, and/or the viscosity of the polymer used, and/or the shear rate of the polymer melt that is being spread throughout the mold cavity 40. The percentage of the mold desired to be filled by the first force 54 can vary depending on the number of mold inserts that are utilized. For example, in a process in which 5 inserts are used, (e.g., a three-step process) such as illustrated in FIGS. 1 to 4, it can be desirable to fill 25-60% of the molding cavity 40 with the first movable mold insert 212, for example, it can be desirable to fill 30-50% of the molding cavity 40 with the first movable mold insert 212.

The molding material 10 can move into a second portion 42 of the molding cavity 40. The movement of molding material 10 into the second portion 42 of the molding cavity 40 can be due at least in part to packing of the molding material 10 in the molding cavity 40, and/or movement of the movable mold inserts (212, 213, 214, 215, 216), and/or compression capabilities of the injection molding machine. For example, such as by limiting the mold cavity volume with one or more of the other movable mold inserts (212, 213, 214, 215, and 216) which can be moved by a corresponding movable insert actuator 232, support plate 210, or a combination including at least one of the foregoing. The second portion 42 can be defined by at least a portion of the resin molding surface 120 and a second insert molding surface 263 disposed along a side of a second movable mold insert 213. It is to be understood that in all the embodiments disclosed herein, movement of each mold insert can overlap one another, e.g., the first insert can still be moving while subsequent inserts begin moving. Stated another way, movement of the mold inserts can be simultaneous. Furthermore, although described herein where the first movable mold insert is the first to move, it is to be understood that movement of the inserts can begin at any one of the inserts and is not limited to the a center insert moving first.

The molding material 10 can move into a third portion 43 of the molding cavity 40. The movement of molding material 10 into the third portion 43 of the molding cavity 40 can be due at least in part to packing of the molding material 10 in the molding cavity 40, and/or movement of the movable mold inserts (212, 213, 214, 215, 216), and/or compression capabilities of the injection molding machine. For example, such as by limiting the volume with one or more of the other movable mold inserts 212, 213, 214, 215, and 216. The third portion 43 can be defined by at least a portion of the resin molding surface 120 and a third insert molding surface 264 disposed along a side of a third movable mold insert 214.

FIG. 3 is an illustration of the molding apparatus 2 of FIG. 2 where the melt has been pushed further away from the first mold insert 212, e.g., in a first position. The first force 54 applied to the first movable mold insert 212 can be reduced as the molding material 10 spreads out into the molding cavity volume. The first mold insert 212 can be kept in a position such that the thickness of the first portion 41 of the molding cavity 40 is maintained.

A second force 58 can be exerted by the second movable mold insert 213, such as corresponding to a force applied by a second movable insert actuator 233. The second force 58 can change a molding cavity shape, a molding cavity area, a molding cavity thickness (e.g., as measured along the t dimension in the accompanying figures), a molding cavity depth (e.g., as measured along the d dimension in the accompanying figures), a molding cavity volume, or a combination including at least one of the foregoing. The second force 58 can be varied throughout the molding process. The second force 58 can bring the second insert molding surface 263 in the same plane as another insert molding surface (e.g., the first insert molding surface 262) such that upon cooling a seam therebetween in the molded part is less noticeable. Seams can be located on a non-exposed side of the part in order to minimize visibility. The seams can be overmolded with a coating layer through an in-mold coating process (IMC).

A third force 59 can be applied to the third movable mold insert 214, such as corresponding to a force applied by a third movable insert actuator 234. The third force 59 can change a molding cavity shape, a molding cavity area, a molding cavity thickness (e.g., as measured along the t dimension in the accompanying figures), a molding cavity depth (e.g., as measured along the d dimension in the accompanying figures), a molding cavity volume, or a combination including at least one of the foregoing. The third force 59 can be varied throughout the molding process. The third force 59 can bring the third insert molding surface 264 in the same plane as another insert molding surface (e.g., the first insert molding surface 262) such that upon cooling a seam therebetween in the molded part is less noticeable.

The first force 54, second force 58, and/or third force 59 can be varied to maintain the depth, shape, area, volume, thickness, or a combination including at least one of the foregoing, of the first portion 41, second portion 42, and/or third portion 43, respectively, of the molding cavity 40. A fourth force 62 and a fifth force 65 can be applied to the fourth movable mold insert 215 and a fifth movable mold insert 216, respectively. The fourth force 62 can be applied to the fourth movable mold insert 215, such as corresponding to a force applied by a fourth movable insert actuator 235. The fifth force 65 can be applied to the fifth movable mold insert 216, such as corresponding to a force applied by a fourth movable insert actuator 236. The fourth force 62 and fifth force 65 can be varied to maintain the depth, shape, area, volume, thickness, or a combination including at least one of the foregoing, of the fourth portion 44 and/or fifth portion 45 of the molding cavity 40. Filling of the molding cavity 40 with molding material 10 can be due at least in part to packing of the molding material 10 in the molding cavity 40, and/or movement of the movable mold inserts (212, 213, 214, 215, 216), and/or compression capabilities of the injection molding machine. The fourth force 62 can bring the fourth insert molding surface 265 in the same plane as another insert molding surface (e.g., the first insert molding surface 262) such that upon cooling a seam therebetween in the molded part is less noticeable. The fifth force 65 can bring the fifth insert molding surface 266 in the same plane as another insert molding surface (e.g., the first insert molding surface 262) such that upon cooling a seam therebetween in the molded part is less noticeable. Seams can be located on a non-exposed side of the part in order to minimize visibility. The seams can be overmolded with a coating layer through an in-mold coating process (IMC).

It is to be understood that the movable mold inserts described herein can each move independently from each other. It is also be understood that the movable mold inserts described herein can move in pairs, e.g., first movable mold insert can be the first to move, then second and third movable mold inserts can being to move, either after first movable mold insert has finished moving or while it is still moving, and then fourth and fifth movable mold inserts can begin to move simultaneously, either after first, second, and third movable mold inserts have finished moving or while they are still moving. Furthermore, although described herein where the first movable mold insert is the first to move, it is to be understood that movement of the inserts can begin at any one of the inserts and is not limited to a center insert moving first.

The resin molding surface 120 can contact the molded part along an exposed surface, such that any seams (e.g., resulting from gaps between the movable mold inserts 212-216) are hidden from view of a viewer of the molded part. The surface of a molded part can include a Class A surface (e.g., at a minimum, such surfaces can be smooth, glossy, and weatherable). As used herein, the term "Class A surface" is given the general meaning known in the art and refers to a surface substantially free of visible defects such as hair-lines, pin-holes and the like. For example, a Class A surface can include a gloss of greater than 100 units at either 20° or 60°, a wavescan of less than 5 units (long as well as short), and a distinctness of image (DOI) of greater than 95 units.

FIG. 4 is an illustration of the molding apparatus 2 of FIG. 3 where the mold inserts 212, 213, and 214, 215, and 216 are in a second position. In this position, the molding apparatus 2 can maintain the final shape of the molding material as the mold is cooled to solidify the molded part. The forces 54, 58, 59, 62, and 65 can be varied to maintain the movable mold inserts 212 to 216 and the molding material 10 in a final shape, thickness, depth, volume, area, or a combination including at least one of the foregoing. As also illustrated in FIG. 4, the compression capabilities of the molding apparatus 2 can be used to compress the melt even further, e.g., with a compression frame components 76, 78.

The described sequence can allow for the manufacture of large (e.g., parts having a projected area of greater than or equal to 1.2 m², for example, greater than or equal to 2 m², for example, greater than or equal to 3 m²) through a molding process (e.g., injection molding process). In this way, large parts can be molded into final form, including shape and finish, without the need for post forming processes. The part can be ejected with the use of ejector pins.

Figure 8:
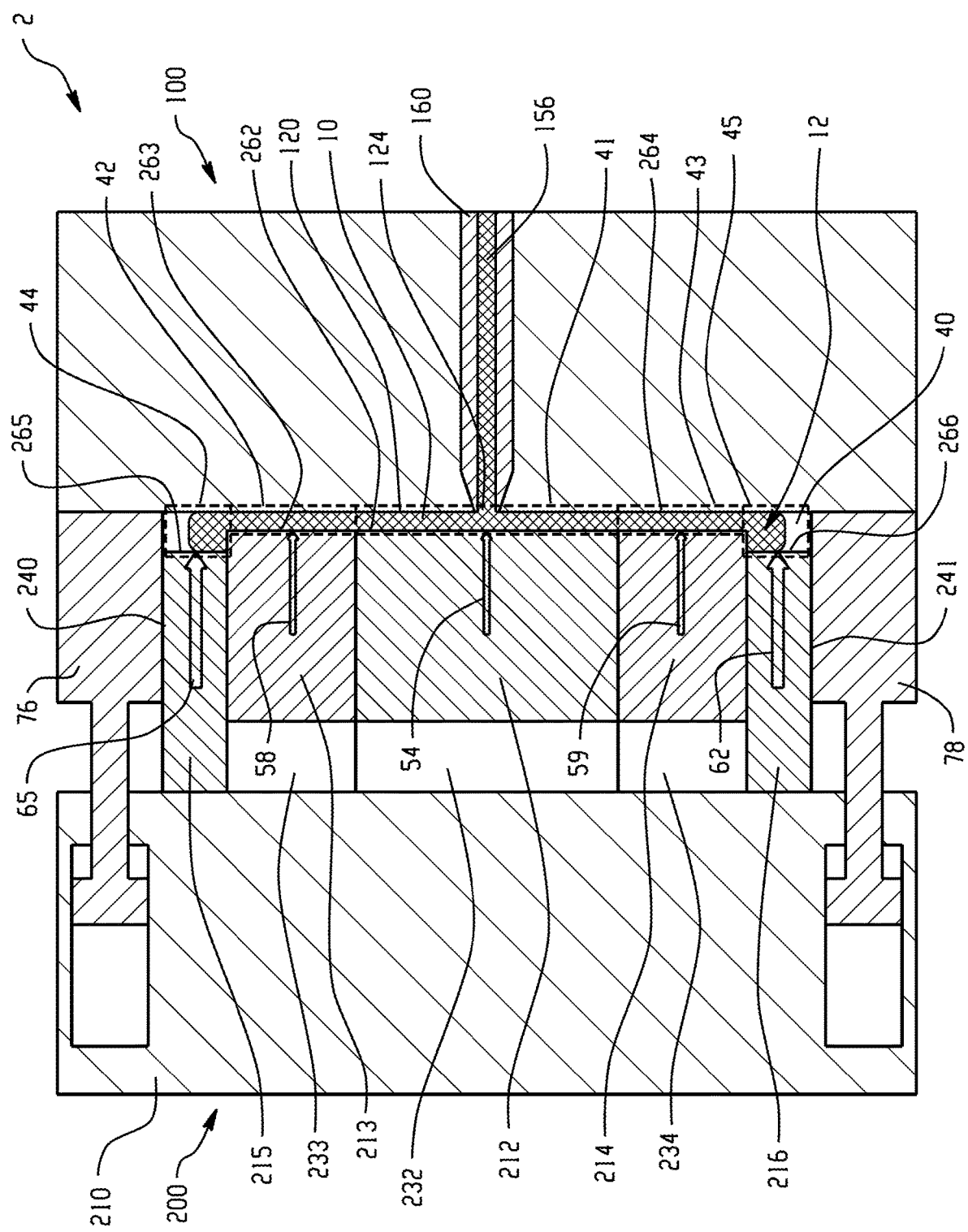
FIG. 8 is a cross-sectional illustration of the molding apparatus of FIG. 7 where the mold inserts are in a second position.

Turning now to FIGS. 5 to 9, an illustration of a cross-sectional view of a molding apparatus 2 in an open position. The molding apparatus 2 is identical to the molding apparatus illustrated in FIGS. 1 to 4, with the exception that movable mold inserts 212, 213, 214 can be retracted into the moving mold half 200 during the compression phase of the injection molding cycle as illustrated in FIG. 8. It is noted that the movable mold inserts can be retracted in sequence to align with other movable mold inserts. For example, movable mold insert 212 can be retracted to align with movable mold inserts 213 and 214. Movable mold inserts 212, 213, 214 can then be retracted (simultaneously or individually) to align with movable mold inserts 215, 216. As can be seen in FIG. 8, first movable mold insert 212 has been moved backward to align with second movable mold insert 213 and third movable mold insert 214.

In FIG. 8, mold inserts 212, 213, and 214 are in a second position, where mold inserts 212, 213, 214 are flush with one another. The first force 54 has been reduced to allow first movable mold insert 212 backward to align with second movable mold insert 213 and third movable mold insert 214. Backward movement of the first movable mold insert 212 and insert presser 232 can be affected through the use of computer numerical control that measures the cavity thickness and uses this to retract the moving inserts in such a way that the cavity thickness is maintained constant during the movement of the moving mold half. Backward movement can also be effected by a force on the melt during movement that moves movable mold inserts into the moving mold half 200 during compression. It can be desirable to have a hydrostatic pressure profile in the molding apparatus 2 when the inserts are aligned. Hydrostatic pressure generally refers to the pressure exerted by a fluid at equilibrium at a given point within the fluid, due to the force of gravity. Hydrostatic pressure increases in proportion to depth measured from the surface because of increasing weight of fluid exerting downward force from above. A fourth force 62 and a fifth force 65 can be applied to the fourth movable mold insert 215 and a fifth movable mold insert 216 respectively. Fourth movable mold insert 215 and fifth movable mold insert 216 can be connected to the moving half 200 of the molding apparatus 2 so that the fourth movable mold insert 215 and fifth movable mold insert 216 move when the molding apparatus 2 is moving toward a fully closed position (e.g., the fourth movable mold insert 215 and fifth movable mold insert 216 can move based on the compression movement of the molding apparatus 2 itself.

Figure 9:
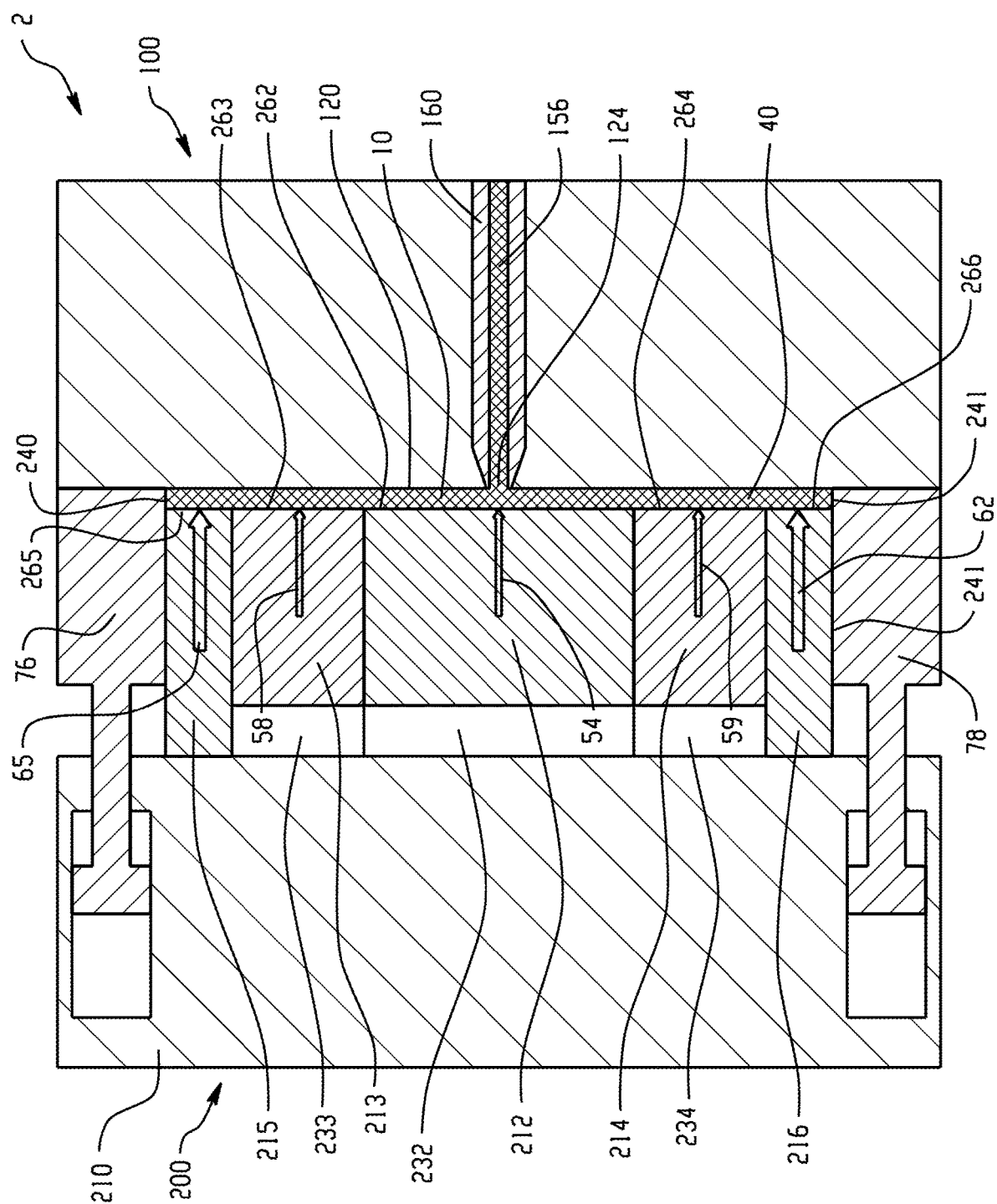
FIG. 9 is a cross-sectional illustration of the molding apparatus of FIG. 8 where the mold inserts are in a third position.

FIG. 9 is an illustration of the molding apparatus 2 of FIG. 8 where the mold inserts are in a third position. In this position, the molding apparatus 2 can maintain the final shape of the molding material as the mold is cooled to solidify the molded part. The forces 54, 58, 59, 62, and 65 can be varied to maintain the movable mold inserts 212 to 216 and the molding material 10 in a final shape, thickness, depth, volume, area, to compensate for shrinkage or a combination including at least one of the foregoing. The compression capabilities of the molding apparatus 2 can be used to compress the melt even further, e.g., with a compression frame components 76, 78 to compensate for shrinkage. Backward movement of the first movable mold insert 212 and insert presser 232 can be affected through the use of computer numerical control that measures the cavity thickness and uses this to retract the moving inserts in such a way that the cavity thickness is maintained constant during the movement of the moving mold half. Compression frame components 76, 78 can also be used to seal the cavity in the compression frame.

Figure 10:
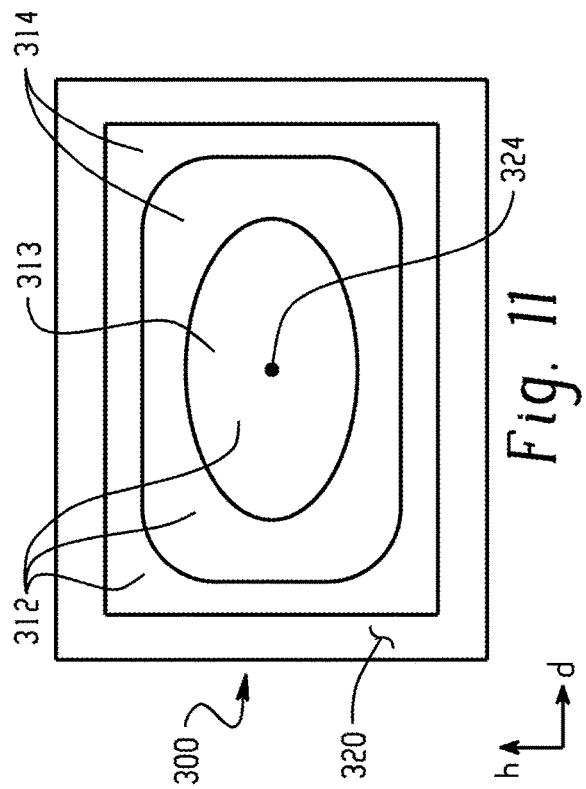
FIG. 10 is a front view of a mold half including five mold inserts in a parallel configuration and showing a location of a single, centered, gate.

The moveable mold inserts 212 can have any configuration. Various configurations are illustrated in FIGS. 10 through 13. FIG. 10 is an illustration of a cross-sectional view of a mold section 300 along the h-d plane. The mold section 300 includes five movable mold inserts 312 forming a molding surface 320. The movable mold inserts 312 are separated along the d-axis dimension into parallel sections. The center movable mold insert 313 can be adjacent to any number of outer movable mold inserts 314. The outer movable mold inserts 314 can have any shape. A gate 324 can be disposed in any location of the mold section 300. A gate 324 can be centered with respect to the movable mold inserts 312. A plurality of gates 324 can be used to distribute the melt over the area of the mold insert surfaces, such as to address uneven melt flow when the movable mold inserts 312 are moved within the molding cavity 40.

Figure 11:
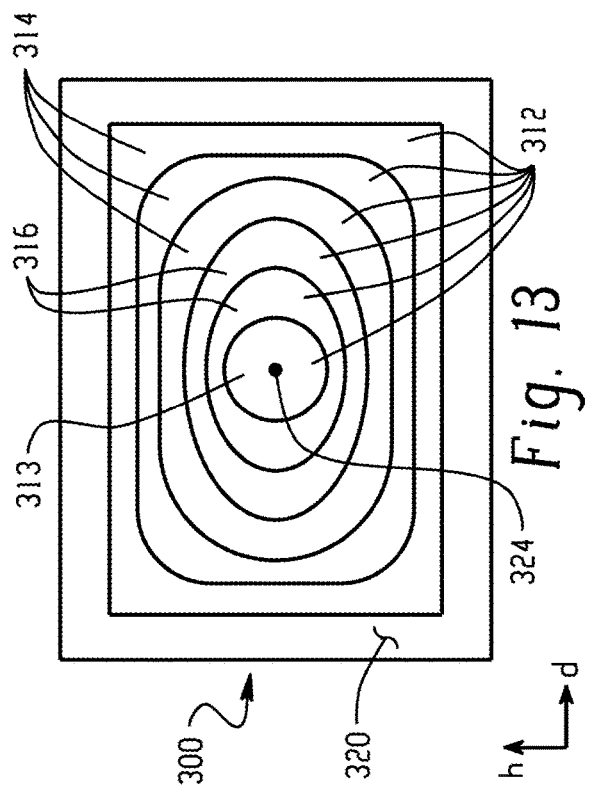
FIG. 11 is a front view of a mold half including three mold inserts and showing a location for a single, centered, gate.

FIG. 11 is an illustration of a cross-sectional view of a mold section 300 along the h-d plane. The mold section 300 includes three movable mold inserts 312 forming the molding surface 320. The center movable mold insert 313 can be any shape. For example, the center movable mold insert 313 can be circular, elliptical, polygonal having straight or curved edges, or the like. The center movable mold insert 313 can be surrounded by any number of outer movable mold inserts 314. The outer movable mold inserts 314 can have any shape. The shape of the outer movable mold inserts 314 can correspond on at least one side to the shape of the center movable mold insert 313, such that virtually no gap (e.g., with the exception of a gap sufficient in size to allow independent movement of the movable mold inserts 312) exists between the movable mold inserts 312. A gate 324 can be centered with respect to the center movable mold inserts 313.

Figure 12:
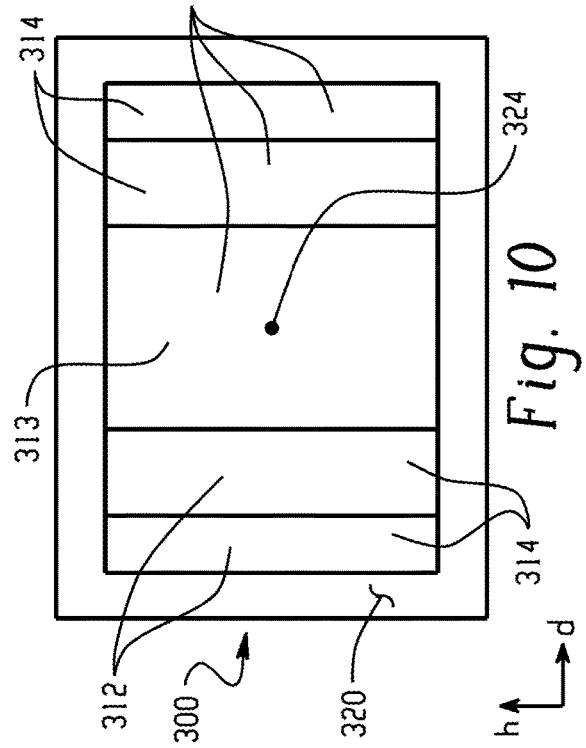
FIG. 12 is a front view of the mold half of FIG. 11 showing a location for multiple, spaced apart, gates.

FIG. 12 is an illustration of a cross-sectional view of the mold section 300 of FIG. 11 showing the location of five gates 324. A center gate 325 can be centered with respect to the center movable mold insert 313, the movable mold inserts 312, or a combination including at least one of the foregoing. A peripheral gate 326 can be located any distance or along any dimension away from the center gate 325. The gates 324 can be located in any arrangement. The gates 324 can be located to help distribute the melt along the area of the movable mold inserts 312, the resin molding surface 120, or a combination including at least one of the foregoing. The use of multiple gates 324 can help to maintain a desired distribution (e.g., uniform, Gaussian, multi-modal, and the like) along an area of the mold cavity 40, such that a shot of molding material 10 can be fed to into the molding cavity 40 in a desired fashion.

Figure 13:
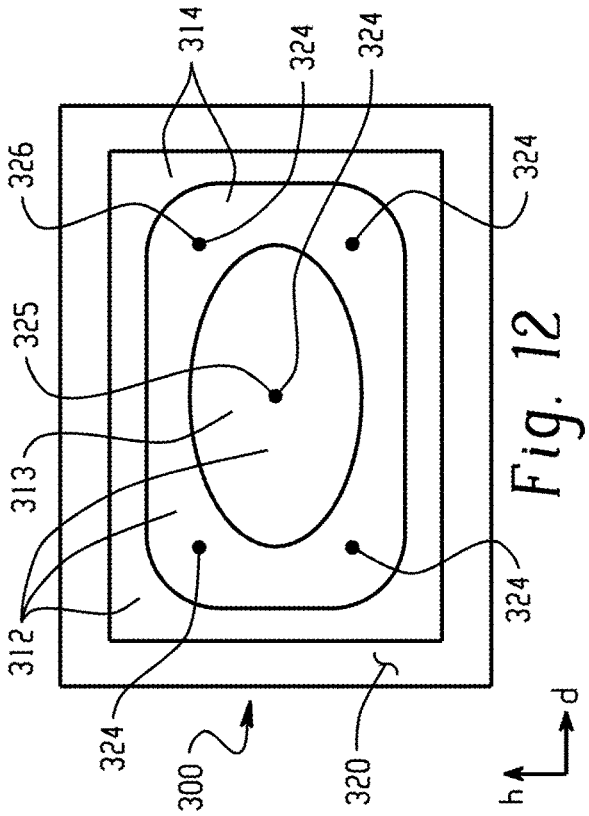
FIG. 13 is an illustration of a front view of a mold half including six mold inserts and showing a location for a single, centered, gate.

FIG. 13 is an illustration of a cross-sectional view of a mold section 300 along the h-d plane. The mold section 300 includes six moveable mold inserts 312 forming the molding surface 320. The movable mold inserts 312 can have any shape. In the embodiment of FIG. 9 the center movable mold insert 313 has a circular shape, two surrounding movable mold inserts 316 have an elliptical shape, and three outer movable mold inserts 314 have quasi-rectangular shapes (e.g., rectangular sides with curved edges) along at least one side, where the outermost movable mold insert 312 has a rectangular outside edge.

Figure 15:
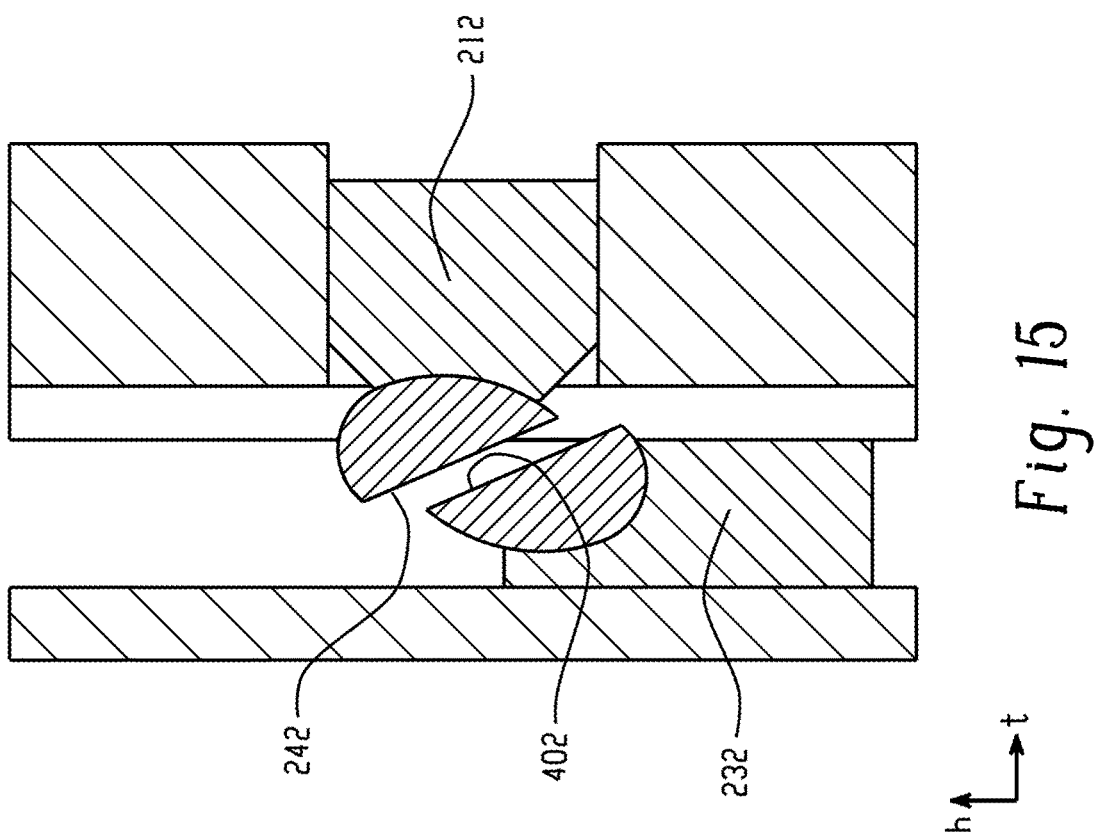
FIG. 15 is a cross-sectional view of a molding apparatus having another mold insert and another movable insert actuator.
Figure 14:
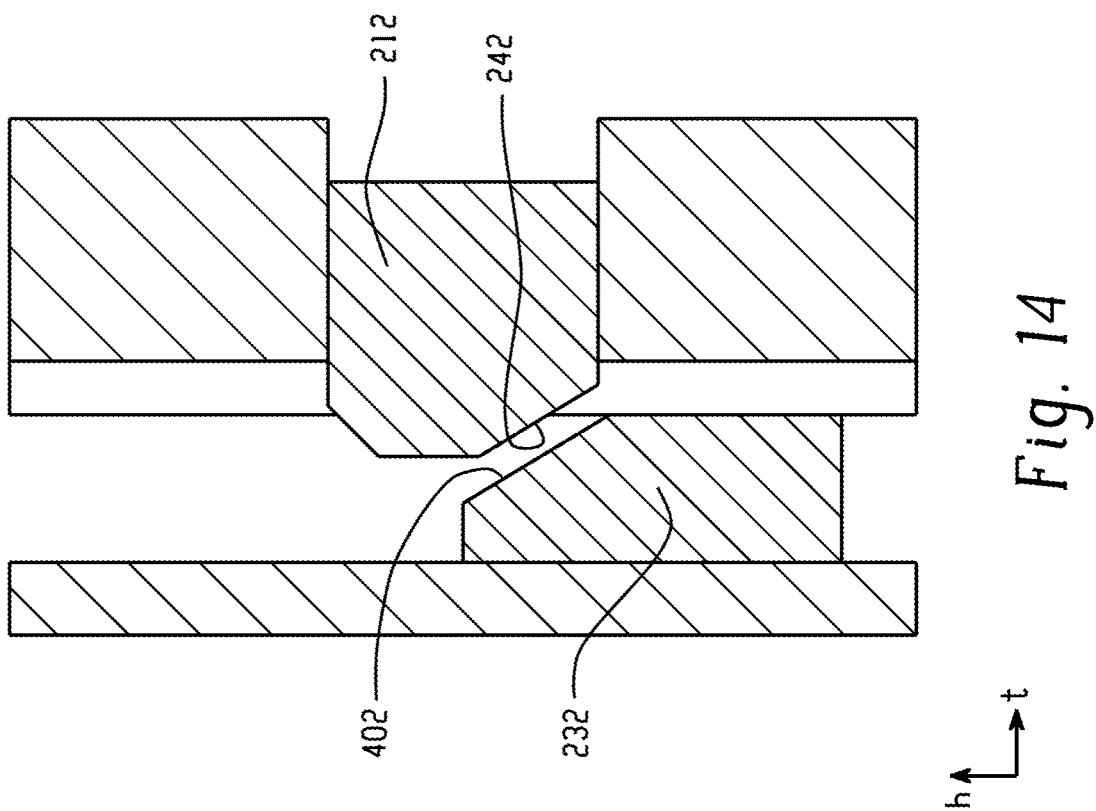
FIG. 14 is a cross-sectional view of a molding apparatus having a mold insert and a moveable insert actuator.

Turning now to FIGS. 14 and 15, the movable insert actuator 232 is illustrated in more detail. For example, FIGS. 14 and 15 illustrate that the movable insert actuator 232 can include any device which can move the movable mold insert 212. For example, the movable insert actuator 232 can include an actuator, screw, piston, pin, pushing surface, or the like. The movable insert actuator 232 can include a pushing surface 402 which can cooperate with the insert pressing surface 242 to move the movable mold insert 212 (see FIG. 10-11). The movable insert actuator 232 can move in any direction to move the movable mold inset 212. For example, the movable insert actuator 232 can move in a dimension (e.g., h-axis dimension in the accompanying figures) perpendicular to the movement dimension of the movable mold insert 212 (e.g., t-axis dimension in the accompanying figures).

Figure 17:
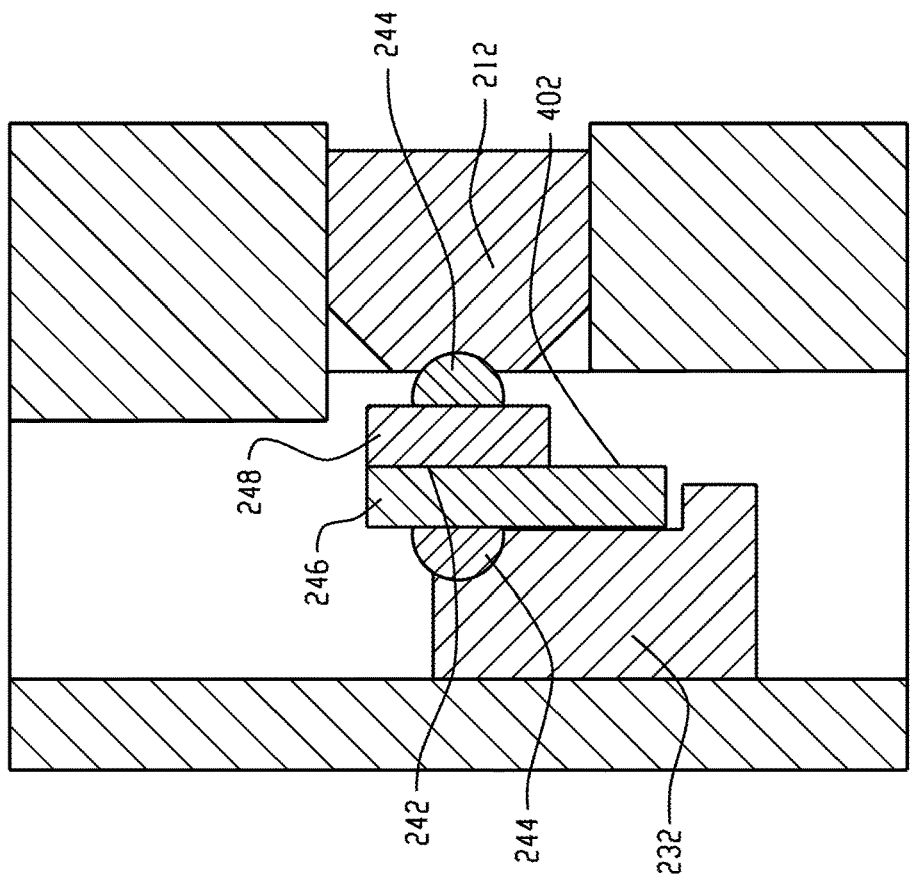
FIG. 17 is a cross-sectional view of the mold movable insert actuator of FIG. 16 in a closed position.
Figure 16:
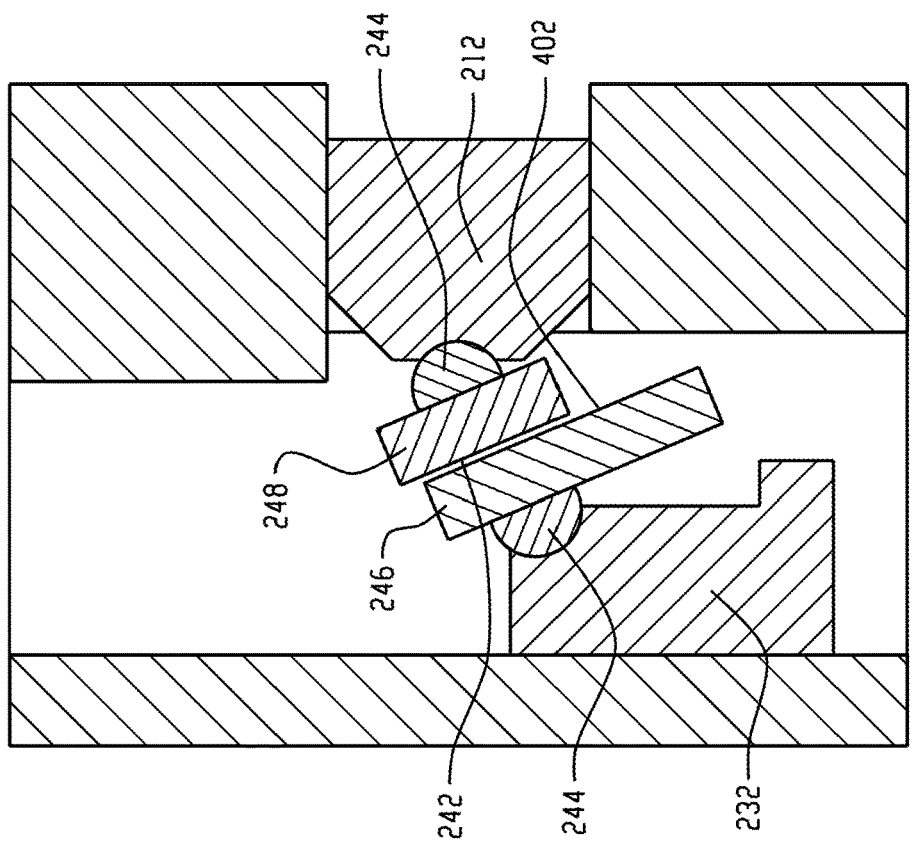
FIG. 16 is a cross-sectional view of a molding apparatus having another mold insert and another movable insert actuator in an open position.

FIGS. 16 and 17 illustrate another movable insert actuator 232 with a pushing surface 402 that can cooperate with an insert pressing surface 242 to move the movable mold insert 212. FIG. 16 illustrates the movable insert actuator 232 before it has pushed the movable mold insert 212 toward the melt, while FIG. 17 illustrates the movable insert actuator 232 after it has been actuated and pushed the movable mold insert 212 toward the melt. The movable insert actuator 232 can be coupled to a single cylinder in an injection molding machine, but can actuate more than one movable insert simultaneously. As illustrated in FIGS. 16 and 17, the movable insert actuator 232 can include a ball and socket joints 244 connected together by shafts 246, 248 where shaft 246 includes pushing surface 402 and is adjacent to movable insert actuator 232 and shaft 248 includes insert pressing surface 242 and is adjacent to movable mold insert 212. During actuation, the ball and socket joints can rotate allowing pushing surface 402 to move toward insert pressing surface 242. In the rest position as illustrated in FIG. 16, shaft 246 and shaft 248 can be oriented at an angle of less than 90° relative to the t axis illustrated in FIGS. 16 and 17, and in the actuated position, shaft 246 and shaft 248 can be oriented at 90° relative to the t axis. Once the pushing surface 402 and insert pressing surface 242 touch, movable insert actuator 232 can push movable mold insert 212 toward the melt in the injection molding cavity.

Turning now to FIGS. 18A and 18B, a hydraulic actuation system 70 is illustrated. FIG. 18A is a side view of the hydraulic actuation system 70 in which wedges 72 are utilized in order to move the mold inserts into the various positions. Each cylinder 74 can have its own hydraulic actuation system 70 with its own system of wedges 72 as is illustrated in FIG. 18B.

Figure 19C:
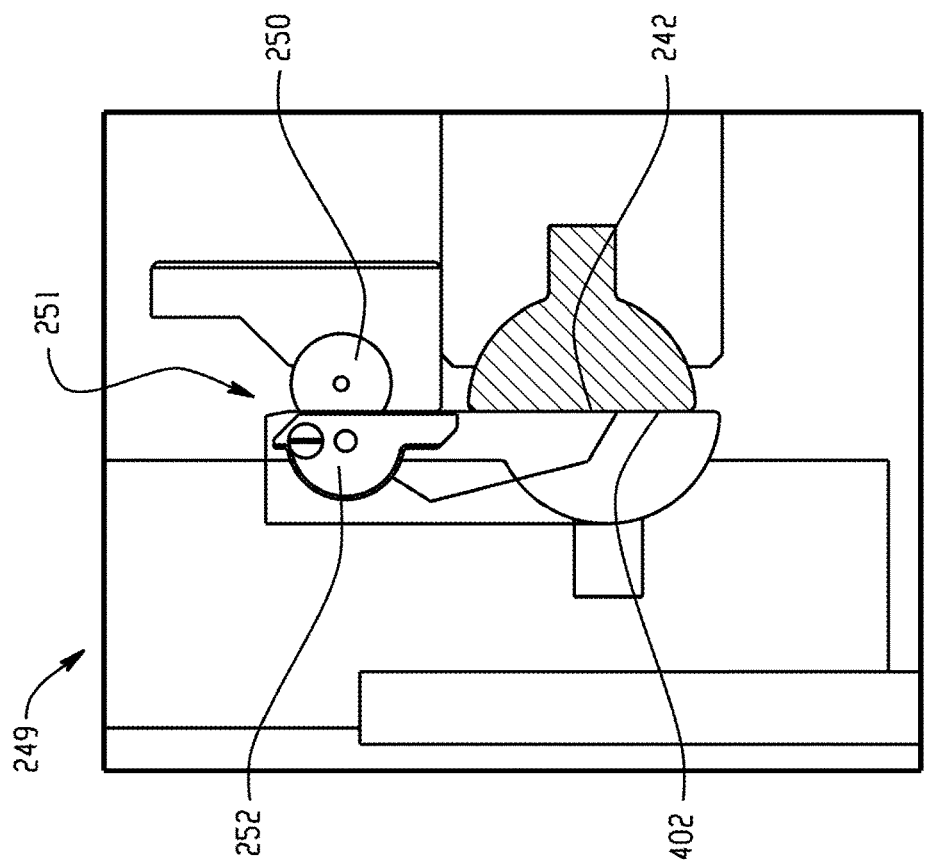
FIG. 19C is a cross-sectional view of a molding apparatus having another mold insert and another movable insert actuator.
Figure 19B:
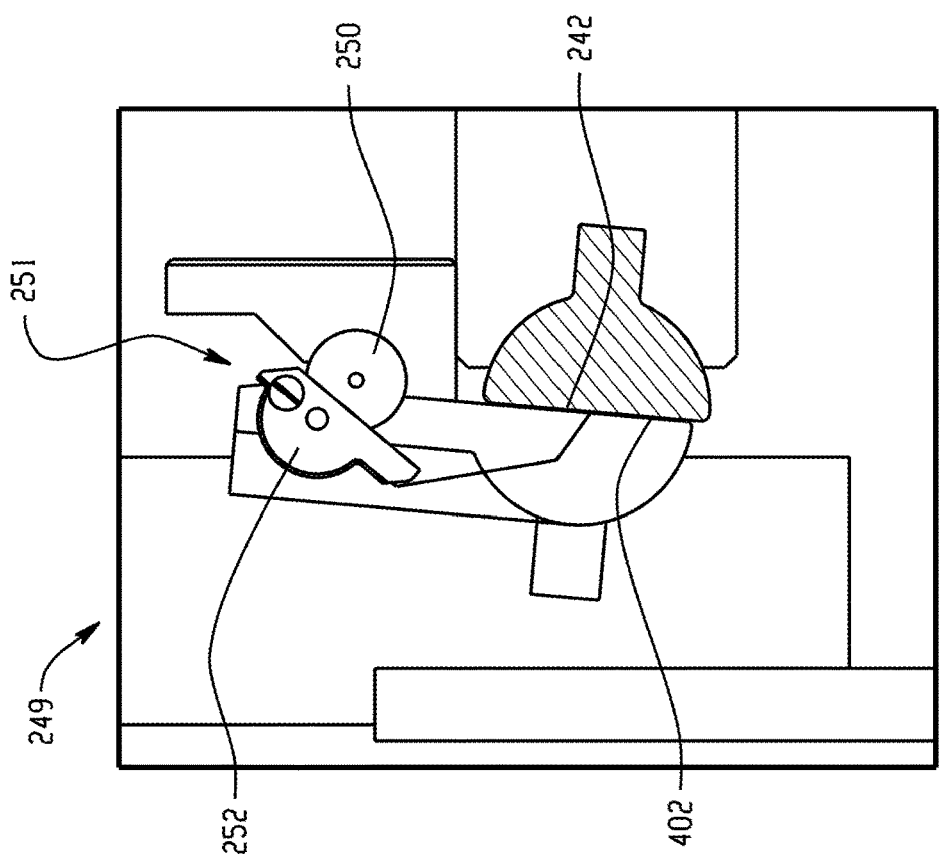
FIG. 19B is a cross-sectional view of a molding apparatus having another mold insert and another movable insert actuator.
Figure 20:
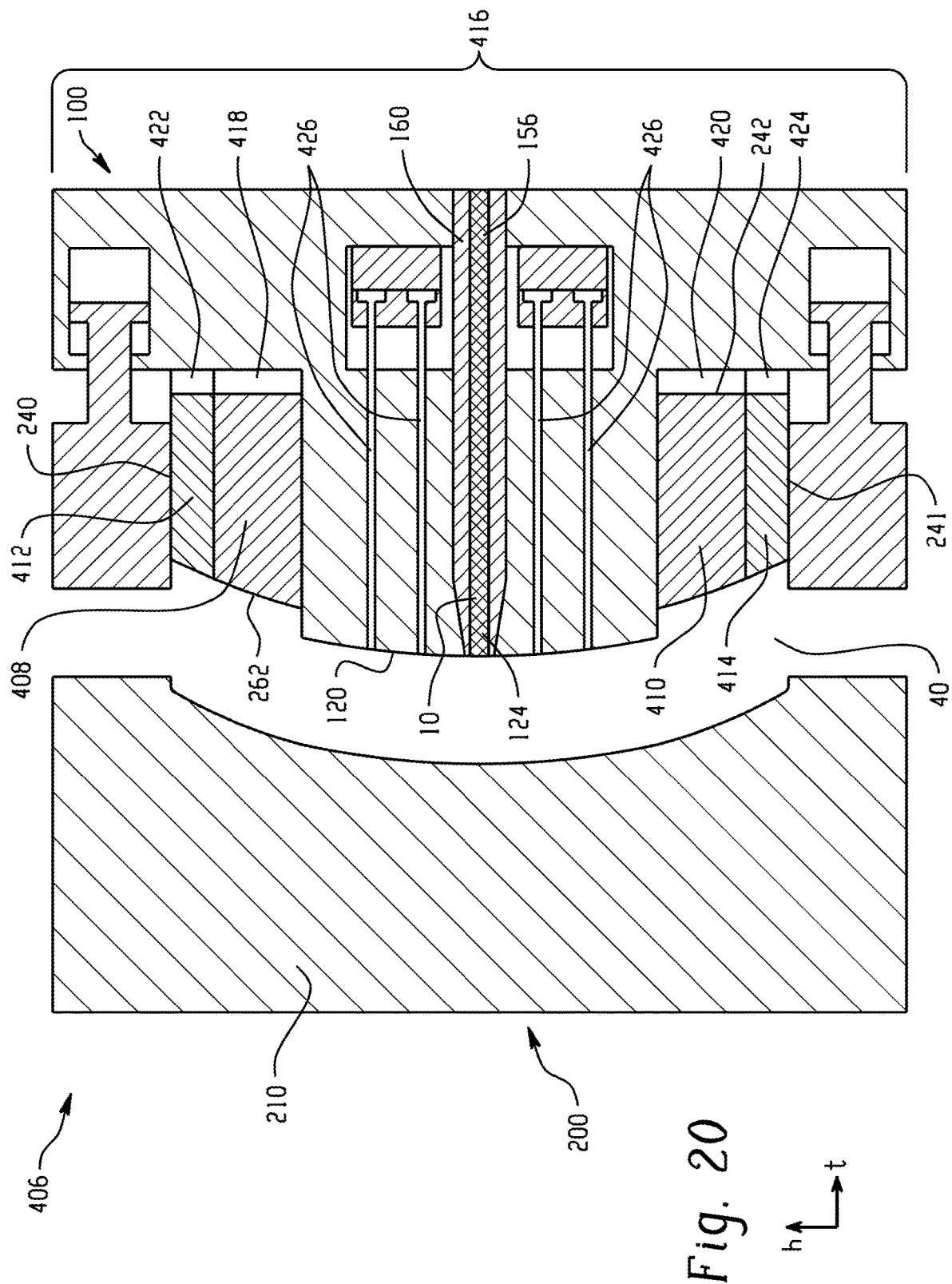
FIG. 20 is a cross-sectional illustration of another molding apparatus in an open position where mold inserts and a hot runner system are integrated in a stationary half of the mold.

FIGS. 19A-19C illustrate another movable insert actuator 249 with a double sliding cantilever 251 that includes a ball and socket joint 250 and a wedge 252. In FIGS. 19A-19C, the double sliding cantilever 251 can assist in allowing the pushing surface 402 and the insert pressing surface 242 to slide against one another until in the final position (FIG. 19C) without much wear on the pushing surface 402 and the insert pressing surface 242.

Figure 76B:
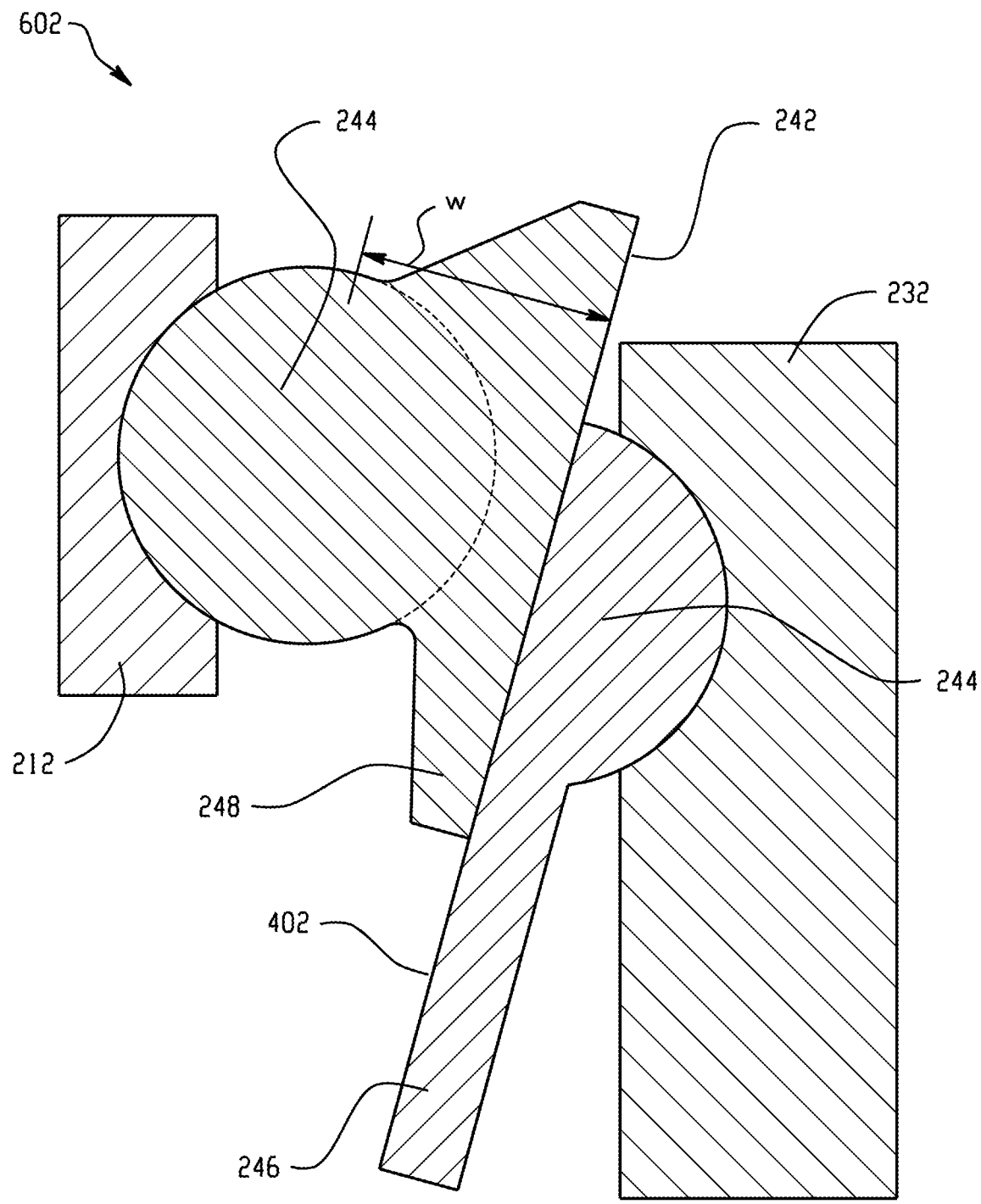
FIG. 76B is a cross-sectional view of a molding apparatus having another mold insert and another movable insert actuator.
Figure 76C:
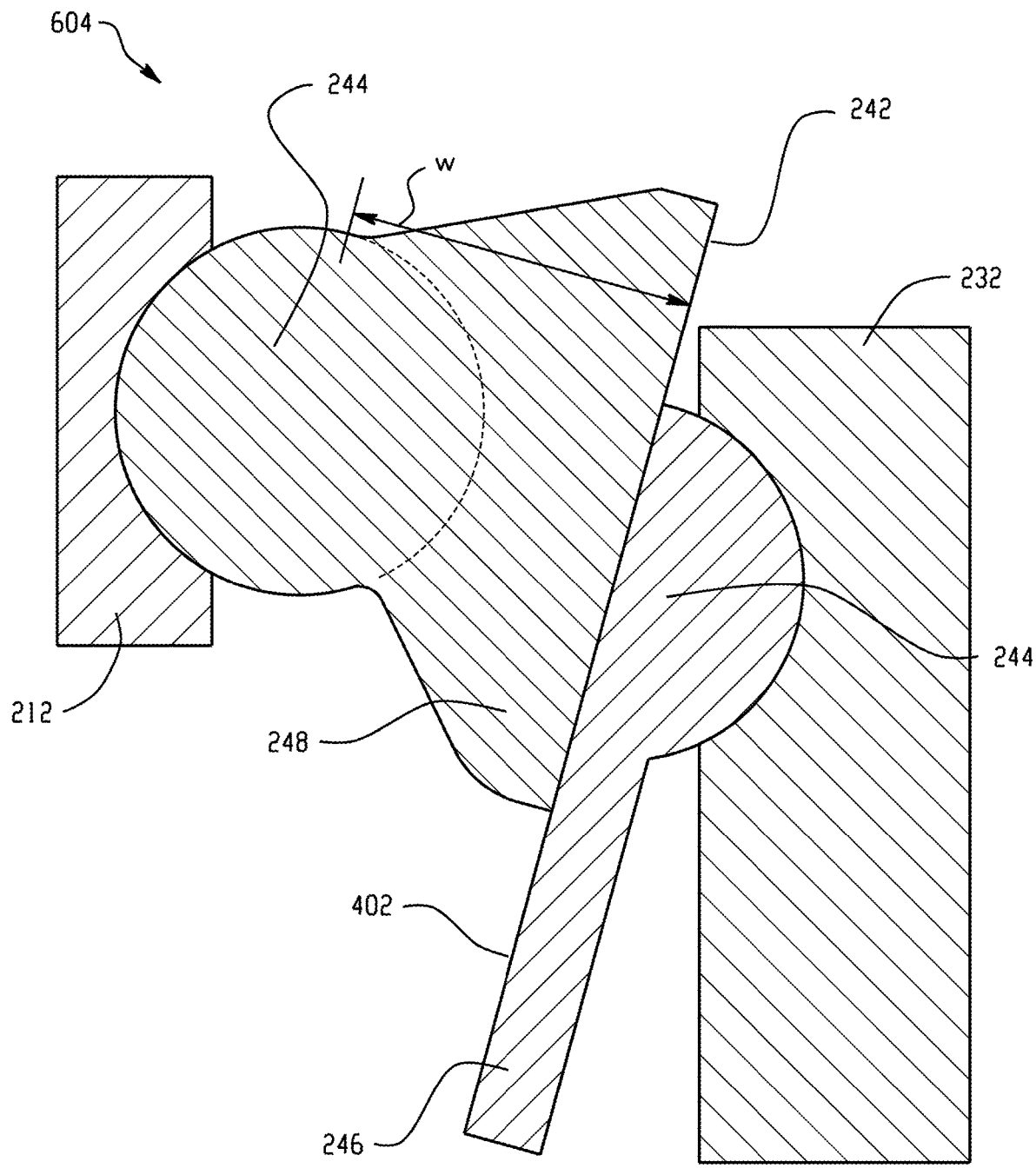
FIG. 76C is a cross-sectional view of a molding apparatus having another mold insert and another movable insert actuator.

FIGS. 76A-76C show movable insert actuators 600, 602, 604 with a pushing surface 402 that can cooperate with an insert pressing surface 242 to move the movable mold insert 212. FIG. 76A shows the movable insert actuator 600 where a shaft 248 has a width, w, that is 1 times the radius of a ball 244. In FIG. 76B, the movable insert actuator 602 has a shaft 248 with a width, w, that is 1.5 times the radius of the ball 244. In FIG. 76C, the movable insert actuator 602 has a shaft 248 with a width, w, that is 2 times the radius of the ball 244. The movable insert actuator 232 can be coupled to a single cylinder in an injection molding machine, but can actuate more than one movable insert simultaneously. As illustrated in FIGS. 76A-C, the movable insert actuator 232 can include a ball and socket joints 244 connected together by shafts 246, 248 where shaft 246 includes pushing surface 402 and is adjacent to movable insert actuator 232 and shaft 248 includes insert pressing surface 242 and is adjacent to movable mold insert 212. During actuation, the ball and socket joints can rotate allowing pushing surface 402 to move toward insert pressing surface 242. In the rest position the shaft 246 and shaft 248 can be oriented at an angle of less than 90° relative to the t axis, and in the actuated position, shaft 246 and shaft 248 can be oriented at 90° relative to the t axis. Once the pushing surface 402 and insert pressing surface 242 touch, movable insert actuator 232 can push movable mold insert 212 toward the melt in the injection molding cavity.

Turning now to FIGS. 20 to 24, a molding apparatus 406 is illustrated where mold inserts 408, 410, 412, 414 and a hot runner system 416 are integrated in a stationary half 100 of the molding apparatus 406. The molding apparatus 406 can have a moving half 200. Stationary half 100 can include a resin mold surface 120, a runner 160, and a sprue passage 156. The molding apparatus 406 can include a hot runner system 416 including hot runner 426 which feed the melt to the mold. The resin mold surface 120 can include an opening defining a gate 124 where the molding material 10 can enter a mold cavity 40. The sprue passage 156 can guide the molding material 10 through the stationary half 100, through the gate 124 and into the mold cavity 40. The gate 124 can be selected from an edge gate, a fan gage, a sub gate, a flash gate, a film gate, a disk gate, a sprue gate 124, or a ring gate. The moving half 200 can include a support plate 210. The support plate 210 can be pressed by a pressing device to impart pressure on the molding material 10 in the molding cavity 40.

The molding apparatus 406 can include a movable mold insert 408. The movable mold insert 408 is disposed the stationary half 100. The movable mold insert 408 can be positioned horizontally in the mold apparatus 406. The moldable mold insert 408 can be positioned vertically in the mold apparatus 406. The moveable mold insert 408 can include an insert molding surface 262 and an insert pressing surface 242. The insert molding surface 262 can be disposed opposite the insert pressing surface 242. The molding apparatus 406 of FIGS. 20 to 24 is shown having four movable mold inserts 408, 410, 412, 414 along the cross-section, however the molding apparatus 406 can include any number of movable mold inserts 408, 410, 412, 414. For simplicity, and ease of understanding, reference to the movable mold insert in the following description can refer to any one, or combination of any of, the movable mold inserts 408, 410, 412, 414.

The stationary half 100 can be in mechanical communication with the movable mold insert 408. The stationary half 100 can include a moveable insert actuator 418. The movable insert actuator 418 can be in mechanical communication with the movable mold insert 408. The movable insert actuator 418 can be in mechanical communication with the stationary half 100 or any element thereof. The movable insert actuator 418 can be in mechanical communication with the movable mold insert 408 (e.g., the insert pressing surface 242) and the stationary half 100 or any element thereof. The movable insert actuator 418, or a portion thereof, can be disposed at least partially between the stationary half 100 and the movable mold insert 408.

The movable insert actuator 418, the stationary half 100, any element of the stationary half 100, or a combination including at least one of the foregoing, can cooperate in moving the movable mold insert 408 relative to the moving half 200, the stationary half 100, or both. For example, the movable insert actuator 418 can be in mechanical communication with an actuation system, e.g., hydraulic element (e.g., a piston or ram), pneumatic, electro mechanic a mechanical mechanism (e.g., hydraulic, pneumatic, screw), electromechanical mechanism (e.g., induction), and the like which can move the movable insert actuator 232 and correspondingly move the insert molding surface 262 toward the resin mold surface 120.

When the molding apparatus 406 is in the open position (e.g., FIG. 20) the mold cavity 40, disposed between the insert molding surface 262 and the resin mold surface 120, is correspondingly open (e.g., where the molding material 10 is not spatially confined within the molding cavity 40, with the exception of flow passages, such as the gate 124 where the molding material 10 can be introduced to the molding cavity 40). In the open position, the molding cavity 40, disposed between the insert molding surface 262 and the resin mold surface 120, can be further defined by a first mold cavity edge 240, and a second mold cavity edge 241.

Figure 21:
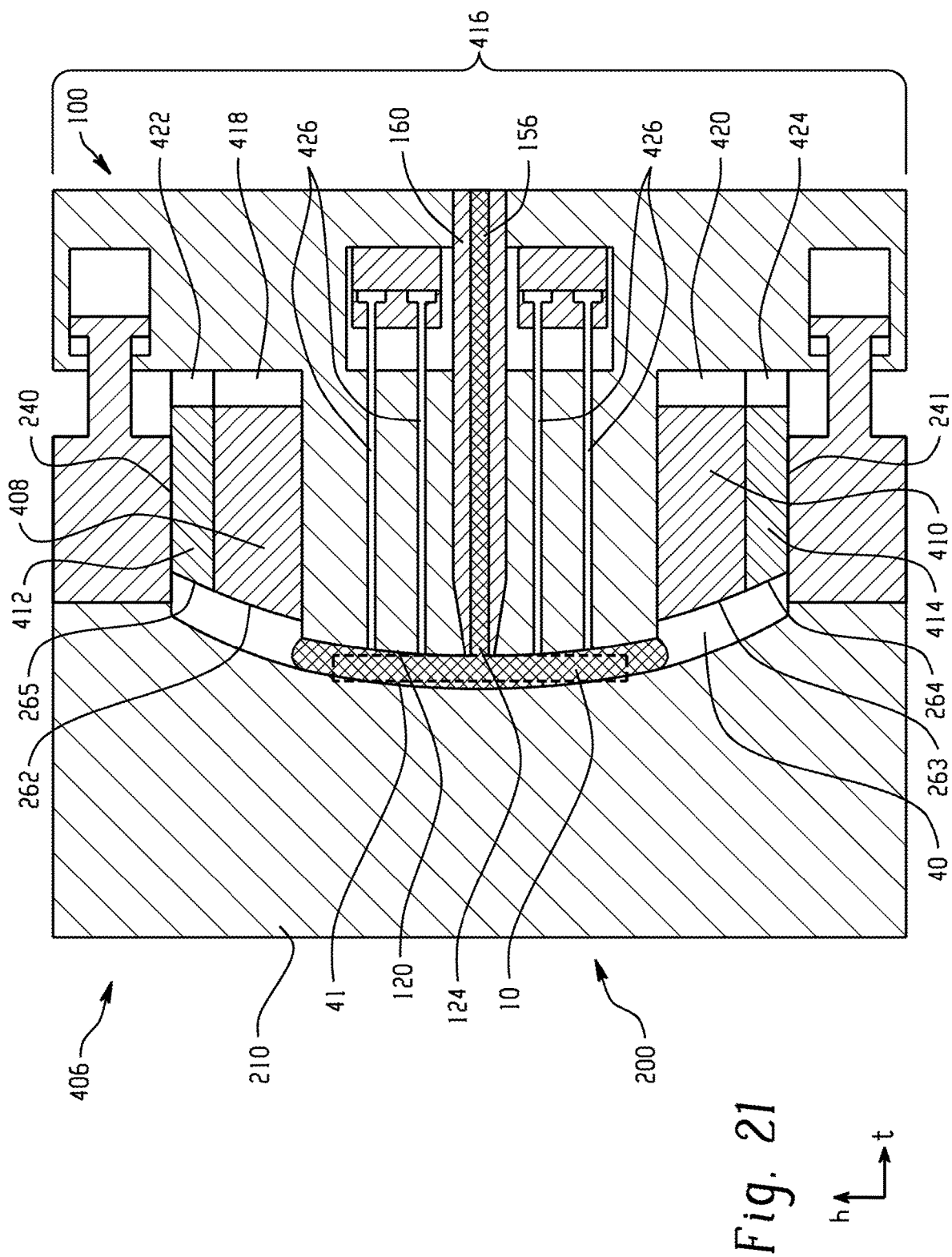
FIG. 21 is a cross-sectional illustration of the molding apparatus of FIG. 21 in a closed position where the mold inserts are in a first position.

Pressure applied to a clamp toggle by a clamp cylinder can hold the moveable half 200 in a forward position to bring the stationary half 100 and the moving half 200 together into a closed position (e.g., FIG. 21). The clamp toggle can operate using any mechanism for moving the halves, such as a mechanical mechanism (e.g., hydraulic, pneumatic, screw), electromechanical mechanism (e.g., induction), and the like.

FIG. 21 is an illustration of a cross-sectional view of the molding apparatus 406 in the closed position. In the closed position, a portion of the stationary half 100 and a portion of the moving half 200 can be in direct contact. In the closed position, the molding cavity 40, disposed between the insert molding surface 262 and the resin mold surface 120, can be further defined by the first mold cavity edge 240 and the second mold cavity edge 241. In the closed position, the molding cavity 40 can be correspondingly closed (e.g., where the molding material 10 is spatially confined within the molding cavity 40, with the exception of flow passages, such as the gate 124 where the molding material 10 can be introduced to the molding cavity 40). The movable mold insert 408 can be moved after the moving half 200 has been moved toward the stations half 100 and can correspondingly change a molding cavity shape, a molding cavity area, a molding cavity thickness (e.g., as measured along the t dimension in the accompanying figures), a molding cavity depth (e.g., as measured along the d dimension in the accompanying figures), a molding cavity volume, or a combination including at least one of the foregoing.

The movable mold inserts 408, 410, 412, 414 can be configured to move relative to the stationary half 100, any element of the stationary half 100, or a combination including at least one of the foregoing.

The following description is made in reference to FIGS. 21-24 which illustrate a molding process comprising the sequential operation of the molding apparatus 406. However, the present disclosure is not limited to such operation. It should be appreciated, that the described sequence can be altered without departing from the spirit of the disclosure.

Figure 22:
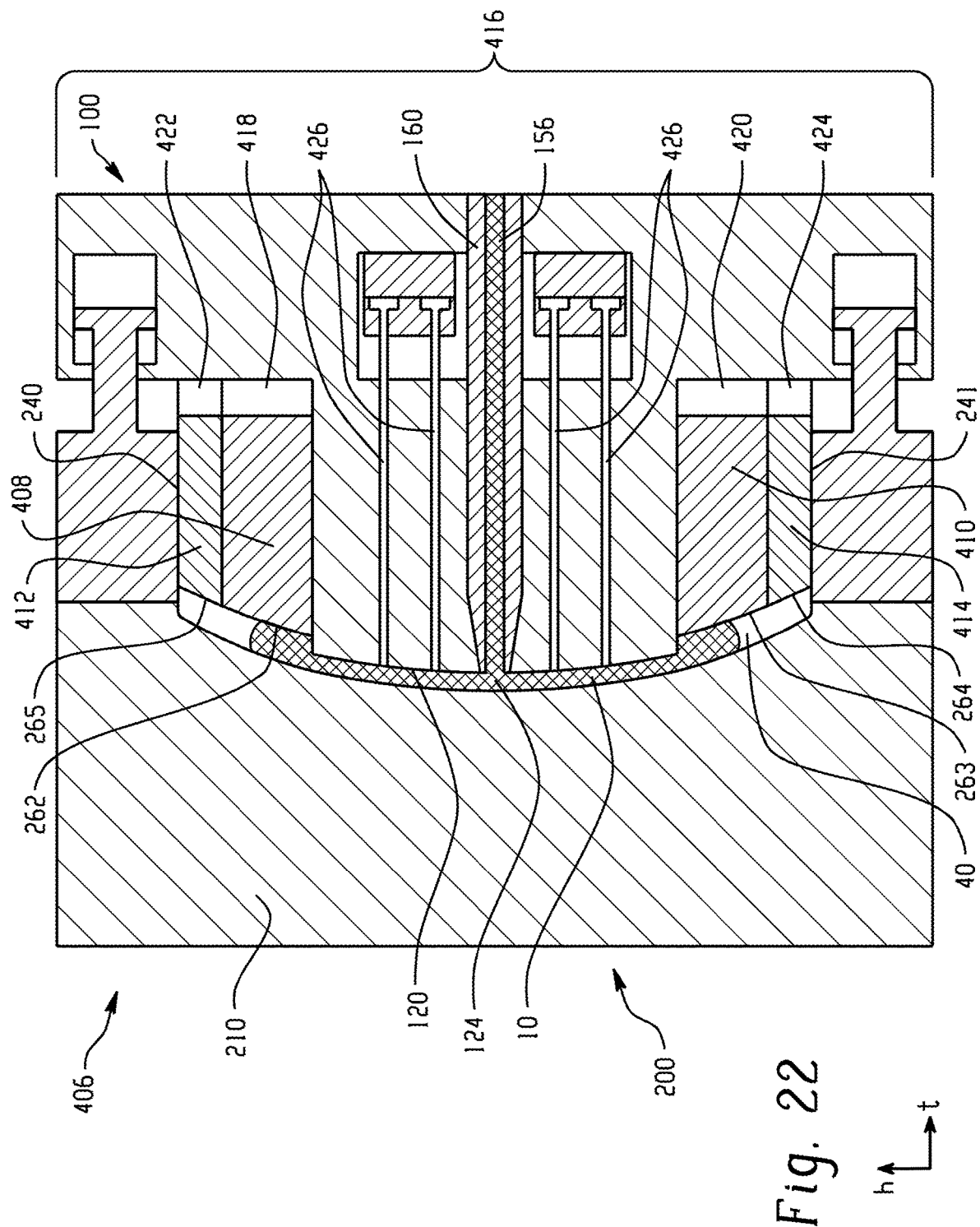
FIG. 22 is a cross-sectional illustration of the molding apparatus of FIG. 21 in a closed position where the mold inserts are in a second position.

As shown in FIG. 21, molding material 10 can be injected through the sprue passage 156 and hot runners 426 into the molding cavity 40 (e.g., into the hot runner system 416 located on the resin mold surface 120). A first portion 41 of the molding cavity 40 can be defined by at least a portion of the resin mold surface 120 and the first insert molding surface 262. FIG. 22 is an illustration of the molding apparatus 406 of FIG. 21 where the melt has been pushed further into the cavity by using the machine's compression capabilities and the compression frame to close the cavity, i.e., where the moving half 200 is squeezing the melted material.

Figure 23:
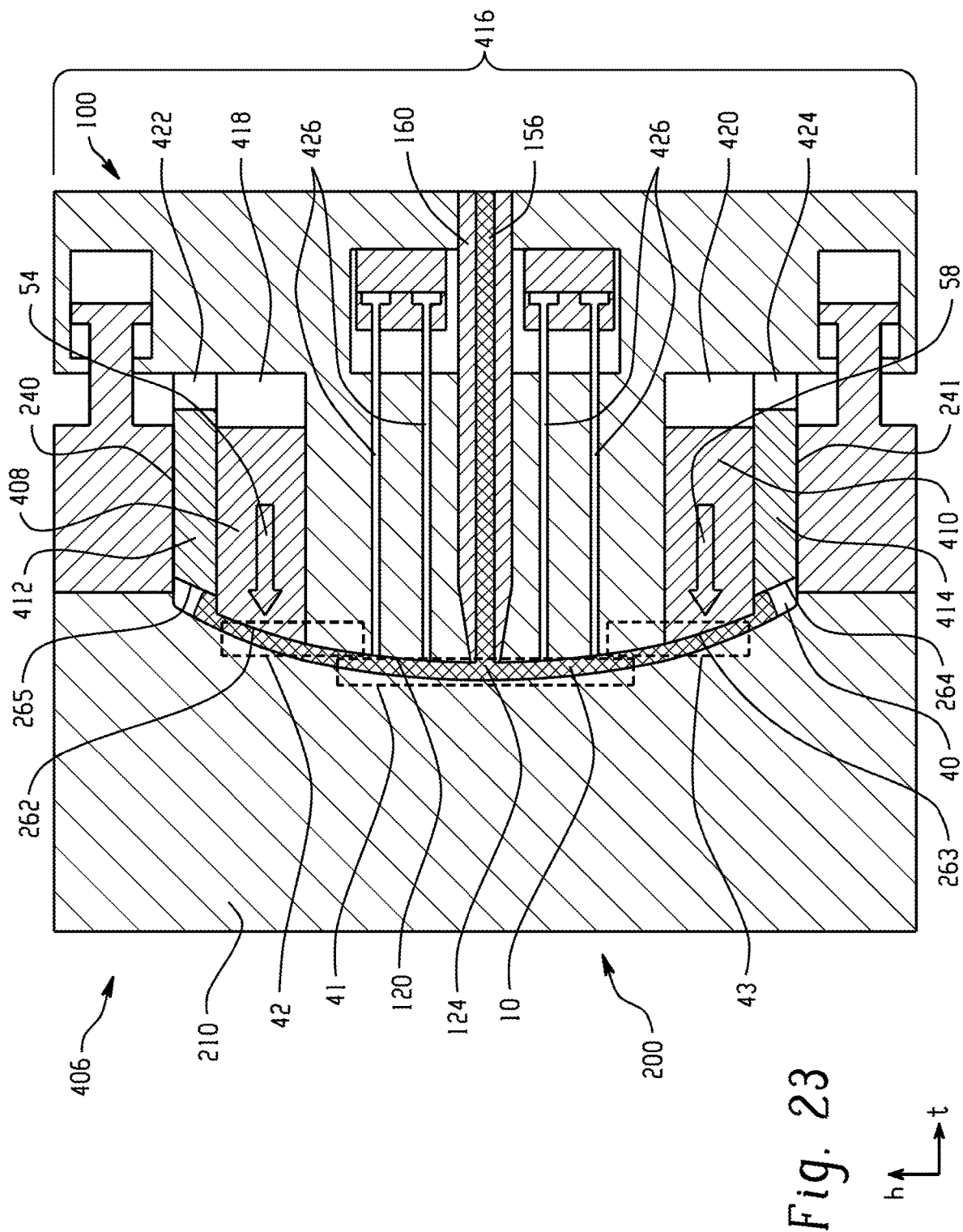
FIG. 23 is a cross-sectional illustration of the molding apparatus of FIG. 21 in a closed position where the mold inserts are in a third position.

In FIG. 23, a first movable mold insert 408, comprising the first insert molding surface 262, can be moved toward the resin mold surface 120 by a first force 54. The first insert molding surface 262 can push against the molding material 10 forcing it out of the first portion 41 and into adjacent portions of the molding cavity 40. In this way, the molding material 10 can begin to spread into the remaining volume (e.g., unoccupied volume) of the molding cavity 40. The first force 54 can be imparted on the first movable mold insert 408 by a first movable insert actuator 418. The first force 54 can be varied throughout the molding process. The first force 54 can vary depending on various factors, including, but not limited to, the projected surface area of the insert, and/or the viscosity of the polymer used, and/or the shear rate of the polymer melt that is being spread throughout the mold cavity 40. The percentage of the mold desired to be filled by the first force 54 can vary depending on the number of mold inserts that are utilized.

The molding material 10 can move into a second portion 42 of the molding cavity 40. The movement of molding material 10 into the second portion 42 of the molding cavity 40 can be due at least in part to packing of the molding material 10 in the molding cavity 40, and/or movement of the movable mold inserts (212, 213, 214, 215, 216), and/or compression capabilities of the injection molding machine. For example, such as by limiting the mold cavity volume with one or more of the other movable mold inserts (410, 412, 414) which can be moved by a corresponding movable insert actuator 420, 422, 424, support plate 210, or a combination including at least one of the foregoing. The second portion 42 can be defined by at least a portion of the resin molding surface 120 and a second insert molding surface 263 disposed along a side of a second movable mold insert 410.

The molding material 10 can move into a third portion 43 of the molding cavity 40. The movement of molding material 10 into the third portion 43 of the molding cavity 40 can be due at least in part to packing of the molding material 10 in the molding cavity 40, and/or movement of the movable mold inserts (212, 213, 214, 215, 216), and/or compression capabilities of the injection molding machine. For example, such as by limiting the volume with one or more of the other movable mold inserts. The third portion 43 can be defined by at least a portion of the resin molding surface 120 and a third insert molding surface 264 disposed along a side of a third movable mold insert 214.

Figure 24:
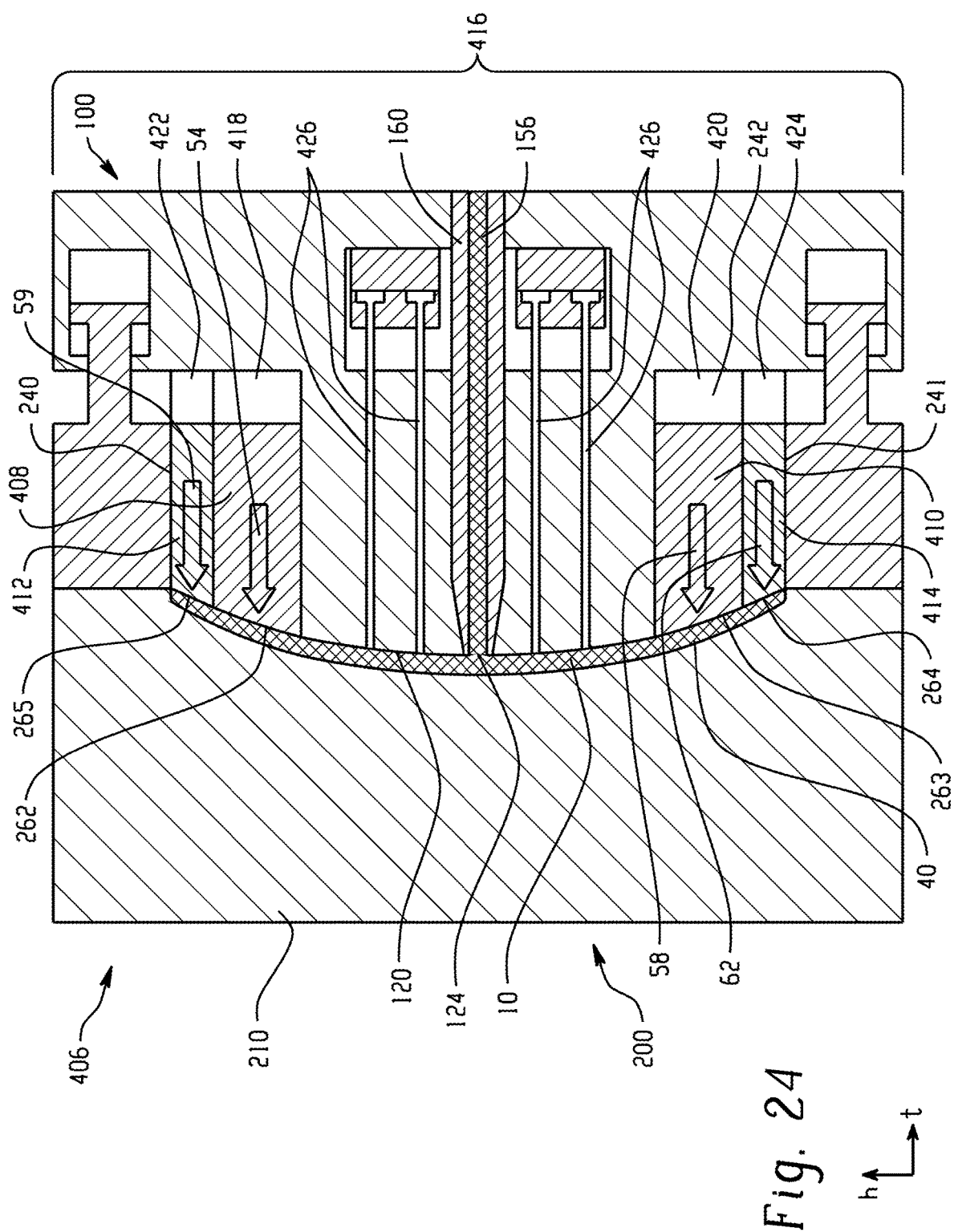
FIG. 24 is a cross-sectional illustration of the molding apparatus of FIG. 21 in a closed position where the mold inserts are in a fourth position.
Figure 25:
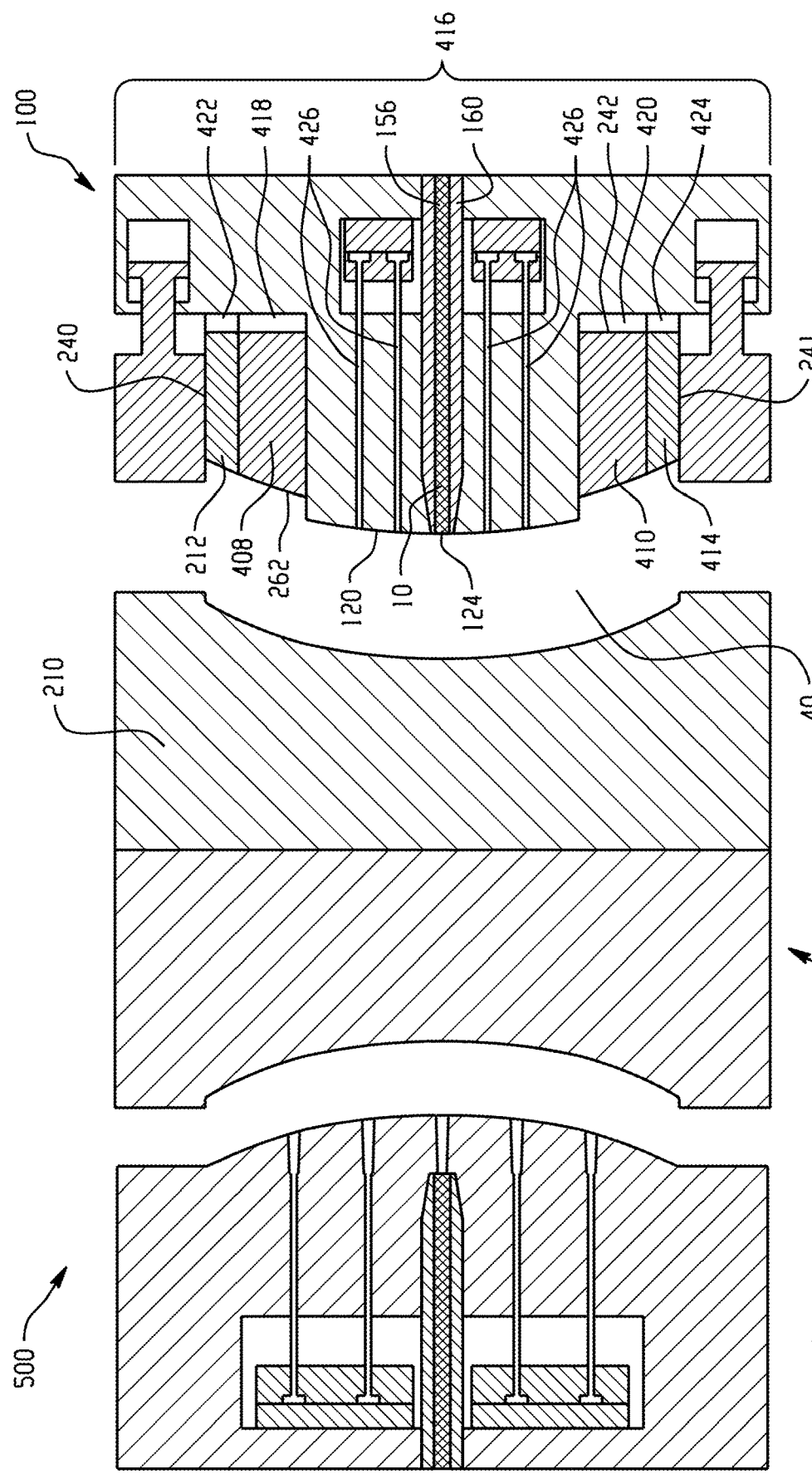
FIG. 25 is a cross-sectional illustration of another molding apparatus in an open position where mold inserts and a hot runner system are integrated in a stationary half of the mold.
Figure 26:
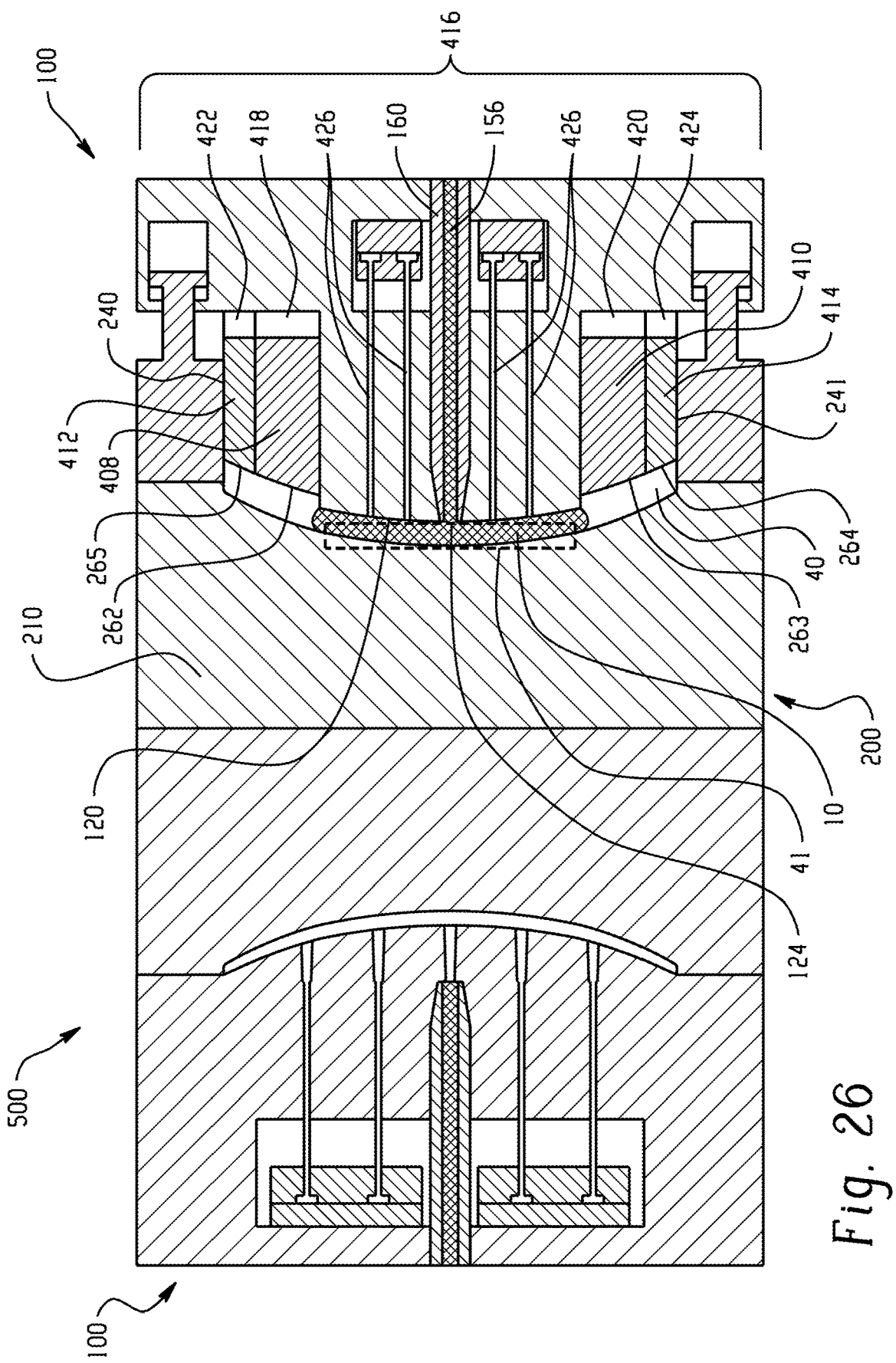
FIG. 26 is a cross-sectional illustration of the molding apparatus of FIG. 25 in a closed position where the mold inserts are in a first position.
Figure 27:
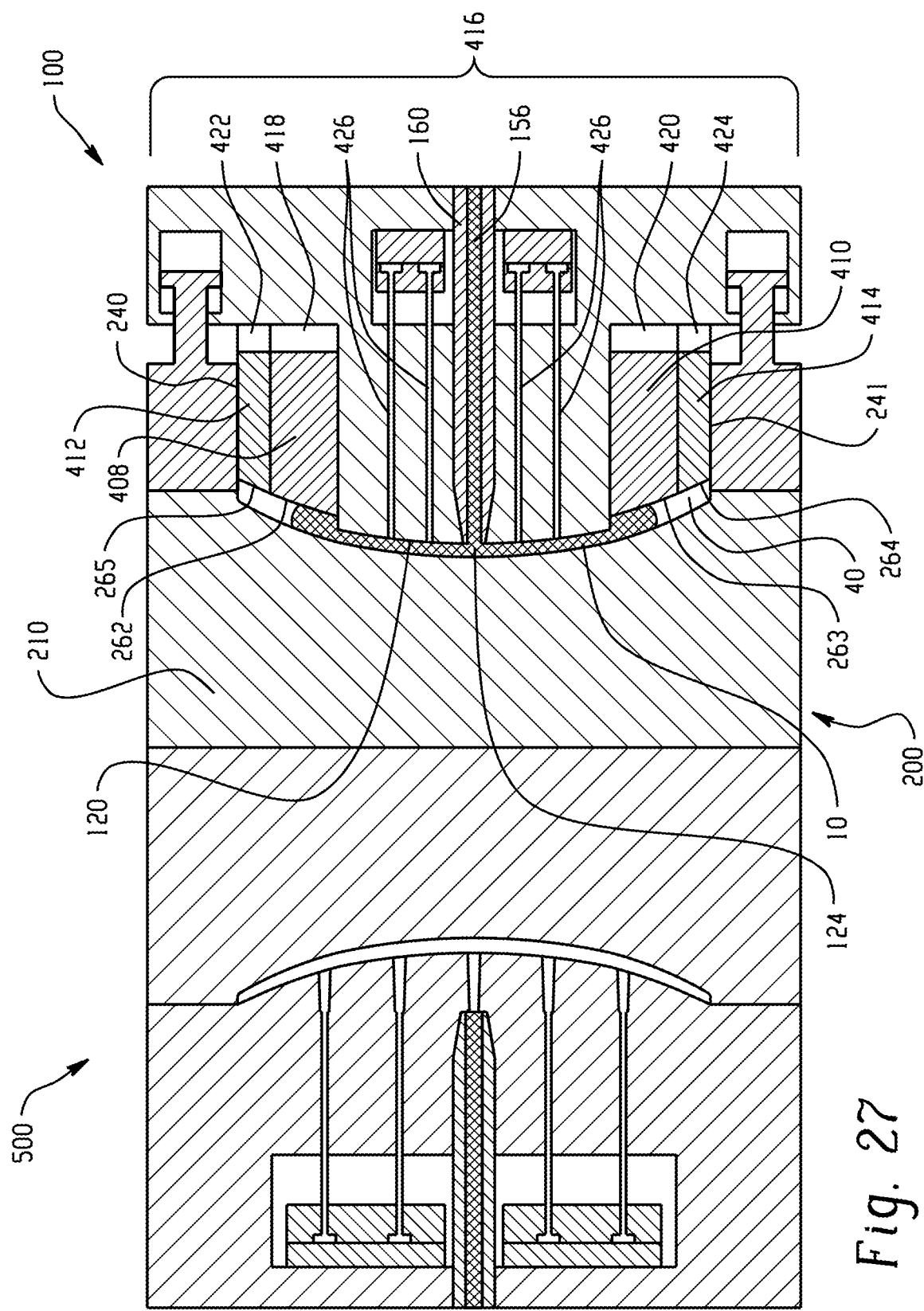
FIG. 27 is a cross-sectional illustration of the molding apparatus of FIG. 25 in a closed position where the mold inserts are in a first position.
Figure 28:
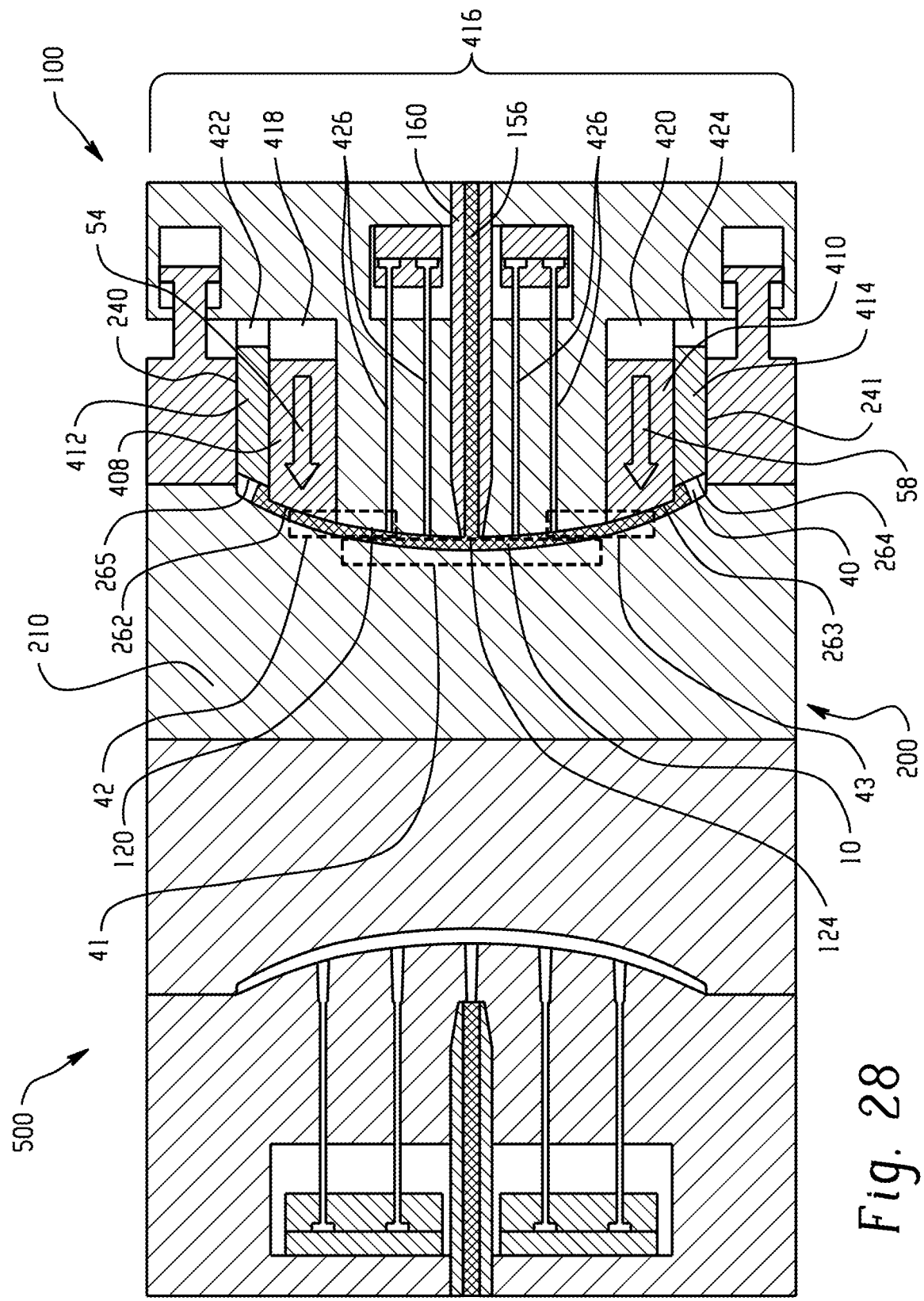
FIG. 28 is a cross-sectional illustration of the molding apparatus of FIG. 25 in a closed position where the mold inserts are in a second position.
Figure 29:
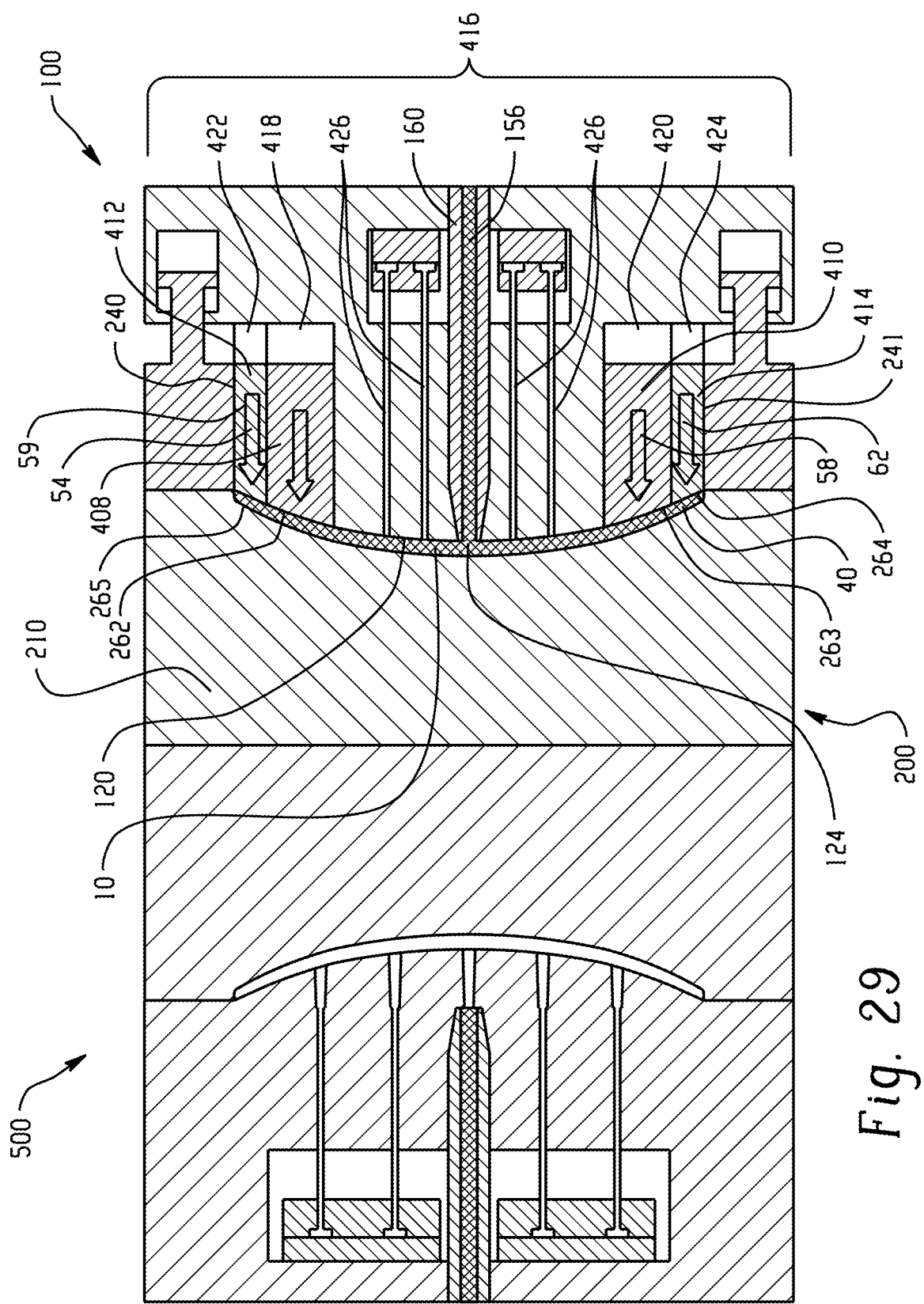
FIG. 29 is a cross-sectional illustration of the molding apparatus of FIG. 25 in a closed position where the mold inserts are in a third position.

FIG. 24 is an illustration of the molding apparatus 406 of FIG. 23 in a second position. In this position, the molding apparatus 406 can maintain the final shape of the molding material as the mold is cooled to solidify the molded part. The first force 54 applied to the first movable mold insert 408 can be reduced as the molding material 10 spreads out into the molding cavity volume. The first mold insert 408 can be kept in a position such that the thickness of the first portion 41 of the molding cavity 40 is maintained.

A second force 58 can be exerted by the second movable mold insert 410, such as corresponding to a force applied by a second movable insert actuator 420. The second force 58 can change a molding cavity shape, a molding cavity area, a molding cavity thickness (e.g., as measured along the t dimension in the accompanying figures), a molding cavity depth (e.g., as measured along the d dimension in the accompanying figures), a molding cavity volume, or a combination including at least one of the foregoing. The second force 58 can be varied throughout the molding process. The second force 58 can bring the second insert molding surface 263 in the same plane as another insert molding surface (e.g., the first insert molding surface 262) such that upon cooling a seam therebetween in the molded part is less noticeable. Seams can be located on a non-exposed side of the part in order to minimize visibility. The seams can be overmolded with a coating layer through an in-mold coating process (IMC).

A third force 59 can be applied to the third movable mold insert 412, such as corresponding to a force applied by a third movable insert actuator 422. The third force 59 can change a molding cavity shape, a molding cavity area, a molding cavity thickness (e.g., as measured along the t dimension in the accompanying figures), a molding cavity depth (e.g., as measured along the d dimension in the accompanying figures), a molding cavity volume, or a combination including at least one of the foregoing. The third force 59 can be varied throughout the molding process. The third force 59 can bring the third insert molding surface 264 in the same plane as another insert molding surface (e.g., the first insert molding surface 262) such that upon cooling a seam therebetween in the molded part is less noticeable.

A fourth force 62 can be applied to the fourth movable mold insert 414. The molding material 10 can continue to be injected through the sprue passage 156 and can cause the molding material 10 to spread out and fill the entire molding cavity volume 40.

The forces 54, 58, 59, and 62 can be varied to maintain the movable mold inserts 212-216 and the molding material 10 in a final shape, thickness, depth, volume, area, or a combination including at least one of the foregoing. The resin molding surface 120 can contact the molded part along an exposed surface, such that any seams (e.g., resulting from gaps between the movable mold inserts 212-216) are hidden from view of a viewer of the molded part. The surface of a molded part can include a Class A surface (e.g., at a minimum, such surfaces can be smooth, glossy, and weatherable). The compression capabilities of the injection molding machine itself could be used to close the mold halves even more in order to compensate for shrinkage.

The described sequence can allow for the manufacture of large (e.g., parts having a projected area of greater than or equal to 1.2 m$^2$, for example, greater than or equal to 2 m$^2$, for example, greater than or equal to 3 m$^2$) through a molding process (e.g., injection molding process). In this way, large parts can be molded into final form, including shape and finish, without the need for post forming processes.

The following description is made in reference to FIGS. 25-33 which illustrate a molding process comprising the sequential operation of the molding apparatus 500 in a two-component injection molding sequence. However, the present disclosure is not limited to such operation. It should be appreciated that the described sequence can be altered without departing from the spirit of operation. It should be appreciated, that the described sequence can be altered without departing from the spirit of the disclosure. In this embodiment, the mold inserts and stationary hot runner are illustrated in the fixed half 100 of the mold and a process where a ribbed structure is added to the formed part is also shown. The ribbed structure and molding process are as described in International Application No. WO 2017/051375, which is incorporated herein by reference in its entirety. Much of the description with respect to FIGS. 21-24 applies to FIGS. 25-33. As such, that description is not repeated. The embodiment illustrated in FIGS. 25-33 includes a center mold piece 202 which can move, e.g., slide, swivel, or rotate (90 to 180 degrees) to bring a part molded in the first cavity 40 to a second cavity 48 for an overmolding process.

Figure 30:
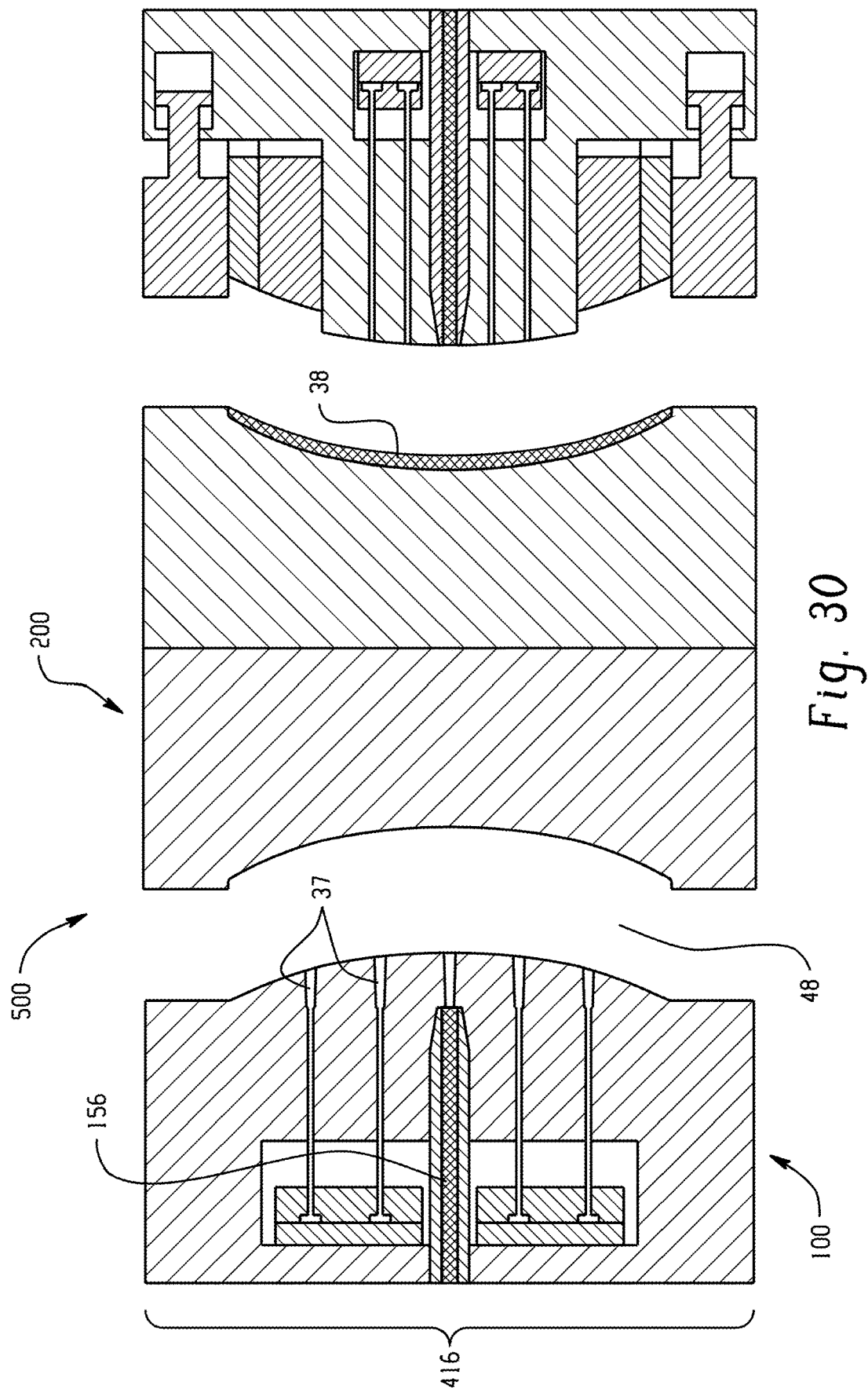
FIG. 30 is an illustration of the molding apparatus of FIG. 25 in an open position with a ribbed part being formed in a ribbed structure mold.
Figure 31:
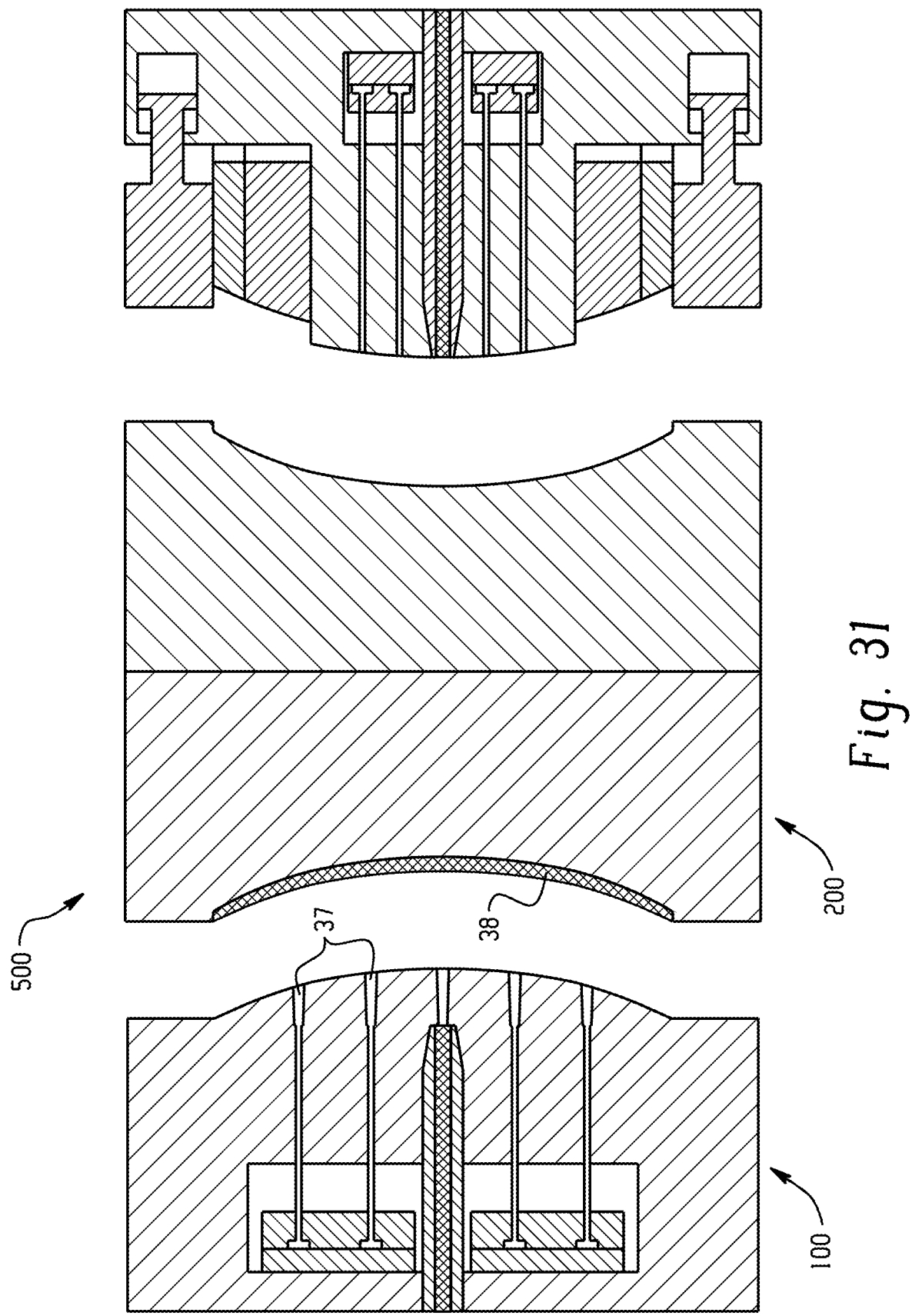
FIG. 31 is an illustration of the mold of FIG. 30 with the part formed by the mold inserts in a closed position.
Figure 32:
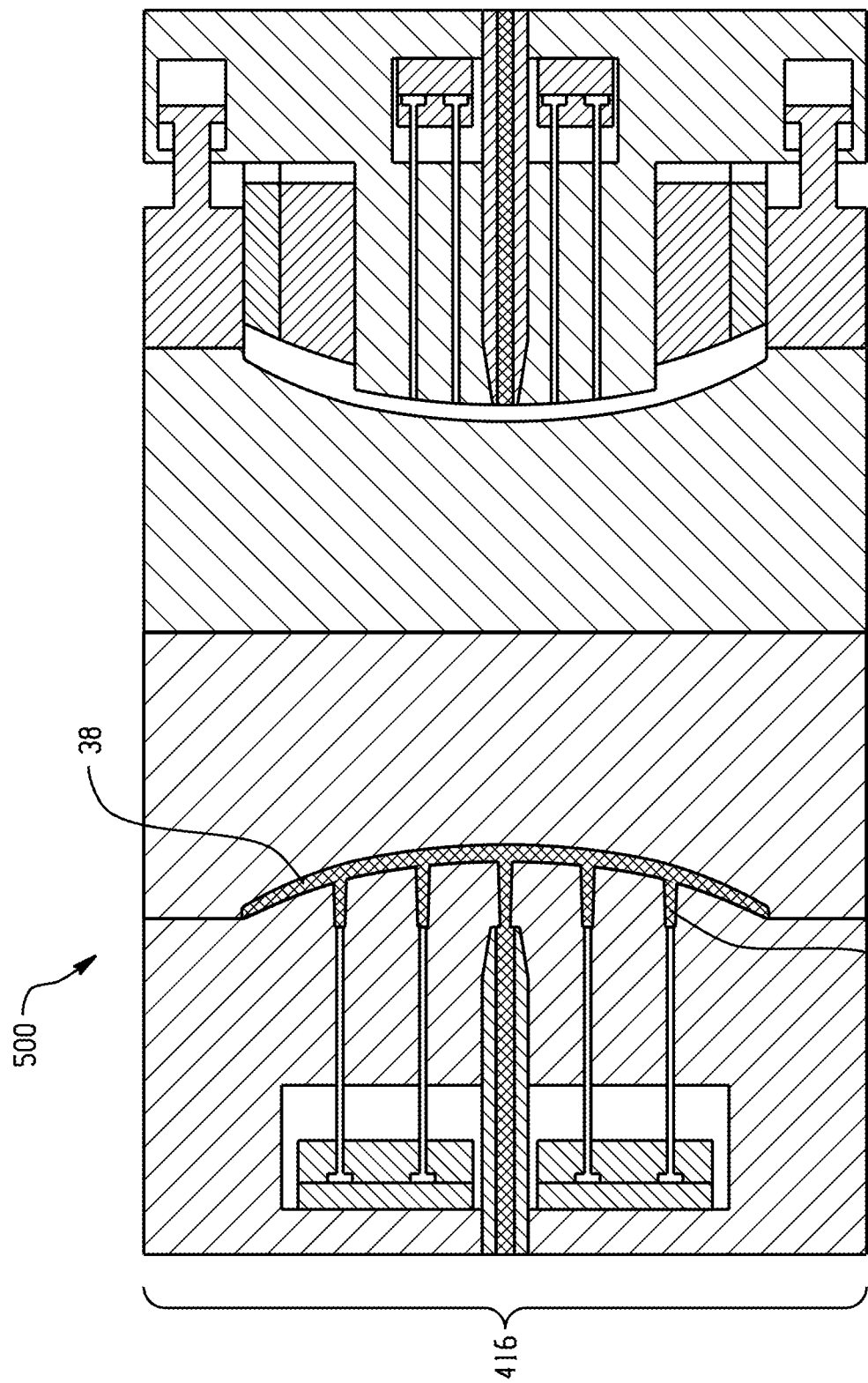
FIG. 32 is an illustration of the mold of FIG. 30 in a closed position where the ribbed part is formed.
Figure 33:
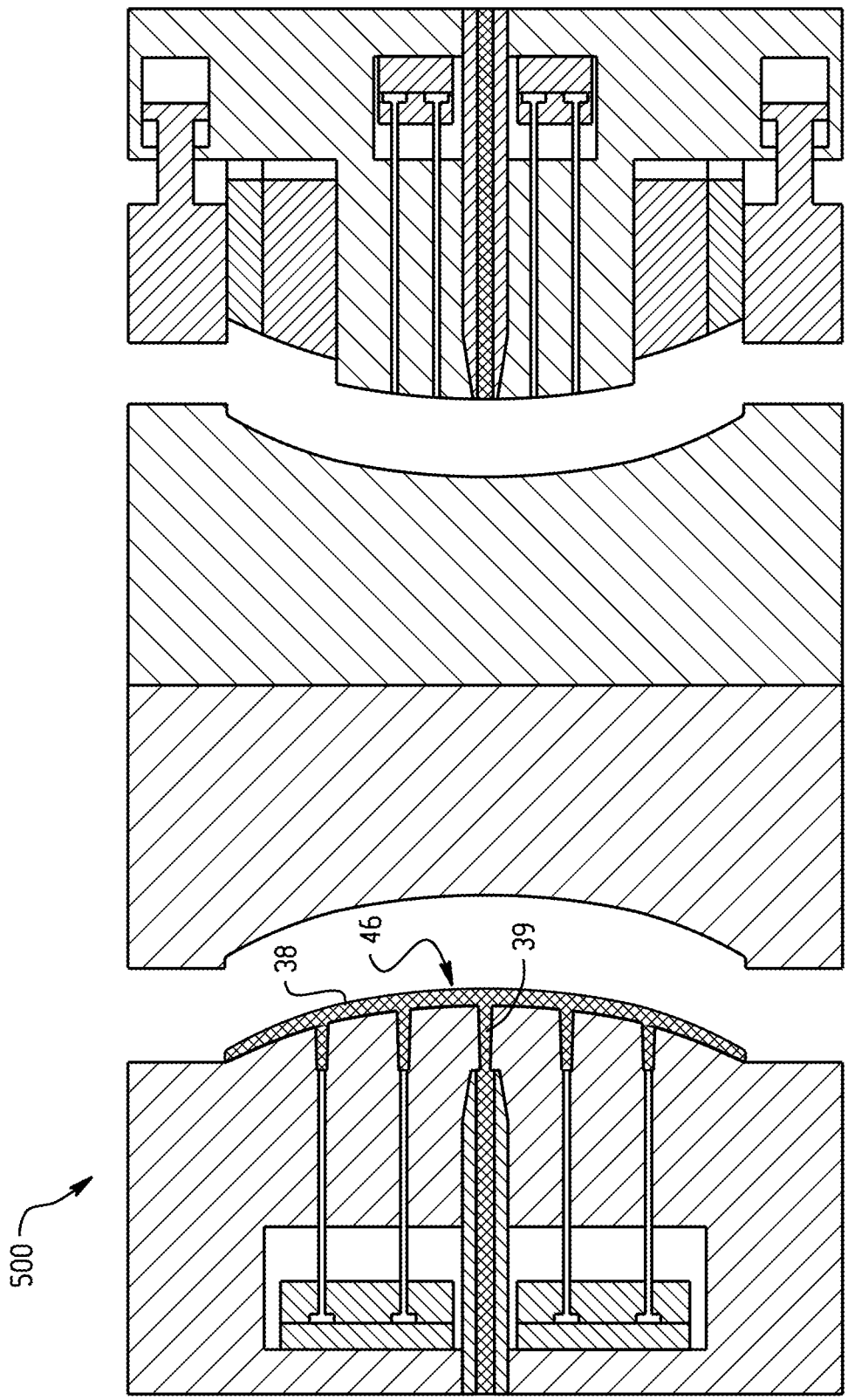
FIG. 33 is an illustration of the mold of FIG. 30 in the open position with the formed part with ribs.

FIGS. 30-33 illustrate an embodiment of forming a part with a Class A surface finish and reduced imperfections such as shrinkage or warpage on the part after molding. In FIG. 30, a molding apparatus 500 is in an open position with a stationary half 100 and a moving half 200 with a ribbed structure mold 37. In FIG. 31, the center mold piece 202 has been rotated such that part 38 is now adjacent to ribbed structure mold. In FIG. 32, the mold 500 has been closed and a second molding material 34 has been injected into the ribbed structure mold 37 through hot runner system 416 forming a ribbed part 39, wherein ribbed part 39 can be overmolded to the part 38. After the ribbed part 39 is formed, the mold 500 is opened as illustrated in FIG. 33. A formed part with ribs 46 is present in the moving half 100 of the mold. The formed part with ribs can be removed from the mold 500 after the mold 500 has been opened.

The described sequence can allow for the manufacture of large (e.g., parts having a projected area of greater than or equal to 1.2 m$^2$, for example, greater than or equal to 2 m$^2$, for example, greater than or equal to 3 m$^2$) through a molding process (e.g., injection molding process). In this way, large parts can be molded into final form, including shape and finish, without the need for post forming processes.

Turning now to FIGS. 47-50, a molding apparatus 502 is illustrated. Molding apparatus 502 is similar to molding apparatus 500 with the exception of the presence of a center mold piece and an additional hot runner mold. In that regard, elements that are the same between figures have not been repeated. In FIGS. 47-50, the insert pressers 418, 420, 422, 424 are integral to a fixed plate 504 on the molding apparatus 502. This means that an injection molding machine can be made with insert pressers already incorporated into the injection molding machine such that various mold designs can be used in the same injection molding machine utilizing the insert pressers.

A rapid temperature-changing injection molding process ("heat and cool") can be used in any of the methods disclosed herein. Use of such a rapid temperature-changing injection molding process can increase melt fluidity in the filling stage of the injection molding cycle and can further improve part quality. The heat and cool process generally includes raising the mold wall temperature above the thermoplastic polymer's glass transition temperature or melting temperature during the filling stage, followed by rapid cooling. Rapid cooling refers to cooling at a rate of 5 to 50 degrees per second. Use of the heat and cool method can result in a 20% to a 25% decrease in overall cycle time for making a part. The heat and cool process can assist in making the molding of larger part (e.g., greater than or equal to 1 m$^2$ easier and can reduce the appearance and number of seams between inserts. The heat and cool process can also reduce clamp force even further. Processing benefits can include longer, more uniform holding pressure, even in areas far from the gate, which can lower injection pressure and clamping requirements; improved flow lengths; reduction of internal part stresses; and reduction or elimination of weld lines, jetting, silver streaks, or sink marks. Other benefits can include improved replication of minute mold-surface details and improved part surface finish. For example, such a method can ensure a smooth, resin-rich surface in glass-reinforced parts or prevent visible bubbles or "splay" in foamed parts. Thermal cycling of the mold can eliminate post-mold downstream operations such as sanding, annealing, priming, and painting to hide surface defects.

Figure 51:
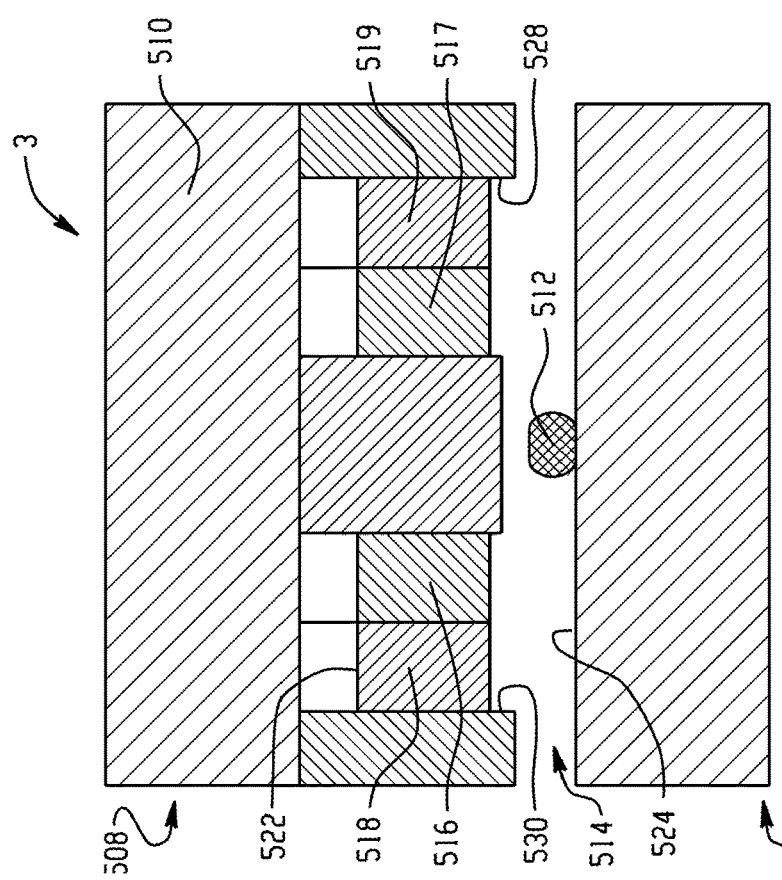
FIG. 51 is a cross-sectional illustration of another molding apparatus in an open position with molten material disposed on the stationary side of the mold.

Turning now to FIGS. 51 to 55, a compression molding apparatus 3 is illustrated. FIG. 51 is a cross-sectional view of the molding apparatus 3 in an open position with a stationary half 506 and a moving half 508. The moving half 508 can include a support plate 510. The support plate 510 can be pressed (e.g., compressed) to impart pressure on the molding material 512 in the molding cavity 514.

The molding apparatus 2 can include a first movable mold insert 516, which can be disposed in the moving half 508, the stationary half 506, or the first movable mold insert 516 can be disposed in both halves. The first movable mold insert 516 can be positioned horizontally or vertically in the mold apparatus 3. The moveable mold insert 516 can include an insert molding surface 520 and an insert pressing surface 522. The insert molding surface 520 can be disposed opposite the insert pressing surface 522. The insert molding surface 520 can face a resin mold surface 524 of the stationary half 506 when the first movable mold insert 516 is disposed in the moving half 508 and vice versa. The molding apparatus 3 of FIGS. 51 to 55 is shown having four movable mold inserts 516, 517, 518, 519 along the cross-section, however the molding apparatus 3 can include any number of movable mold inserts. For simplicity, and ease of understanding, reference to the first movable mold insert 516 in the following description can refer to any one, or combination of any of, the movable mold inserts 516, 517, 518, 519.

The moving half 508 can include a movable insert actuator 526, which can be in mechanical communication with the movable mold insert 516. The movable insert actuator 526, or a portion thereof, can be disposed at least partially between the moving half 508 and the movable mold insert 516.

The movable insert actuator 232, the moving half 508, any element of the moving half 508, or a combination including at least one of the foregoing, can cooperate in moving the first movable mold insert 216 relative to the moving half 508, the stationary half 506, or both. For example, the movable insert actuator 526 can be in mechanical communication with an actuation system, e.g., hydraulic element (e.g., a piston or ram), pneumatic, electro mechanic a mechanical mechanism (e.g., hydraulic, pneumatic, screw), electromechanical mechanism (e.g., induction), and the like which can move the movable insert actuator 526 and correspondingly move the insert molding surface 520 toward the resin mold surface 524. In the open position, the molding cavity 514 can be further defined by a first mold cavity edge 528, and a second mold cavity edge 530.

Figure 52:
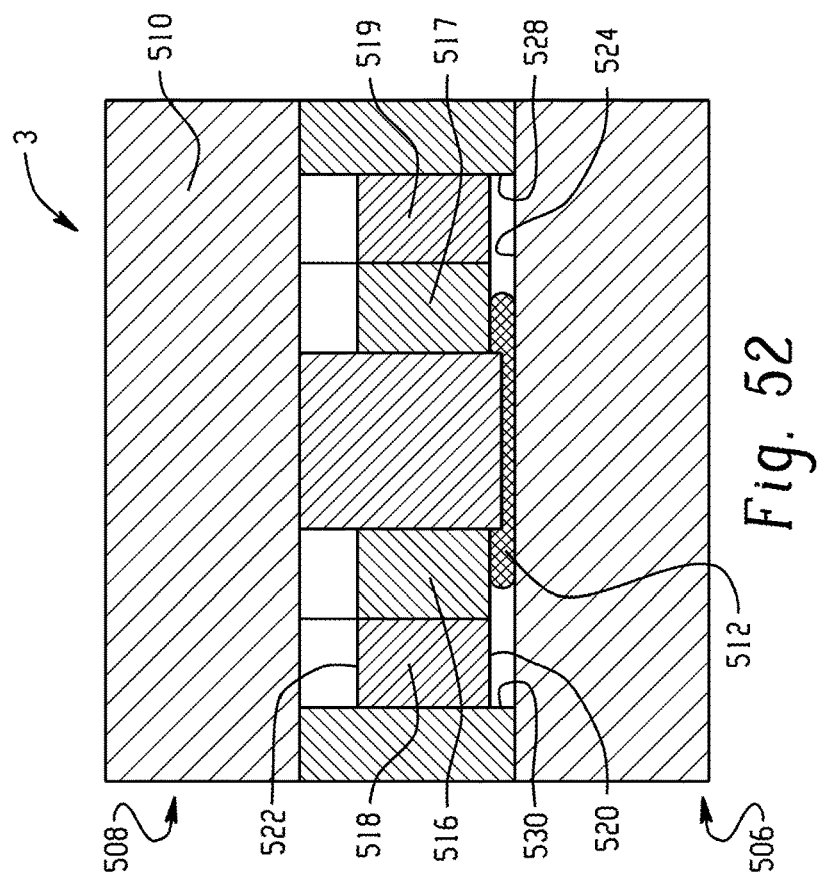
FIG. 52 is a cross-sectional illustration of the molding apparatus of FIG. 51 in a closed position with the mold inserts in a first position.

FIG. 52 is an illustration of a cross-sectional view of the molding apparatus 3 in the closed position. In the closed position, the molding cavity 514 can be correspondingly closed (e.g., where the molding material 512 is spatially confined within the molding cavity 514. The first movable mold insert 516 can be moved relative to the moving half 508 and can correspondingly change a molding cavity shape, a molding cavity area, a molding cavity thickness (e.g., as measured along the t dimension in the accompanying figures), a molding cavity depth (e.g., as measured along the d dimension in the accompanying figures), a molding cavity volume, or a combination including at least one of the foregoing.

The following description is made in reference to FIGS. 51 to 55 which illustrate a molding process comprising the sequential operation of the molding apparatus 3. However, the present disclosure is not limited to such operation. It should be appreciated, that the described sequence can be altered without departing from the spirit of the disclosure. As shown in FIG. 52, a first movable mold insert 516 can be moved toward the resin mold surface 524 by a first movable insert actuator 526. The insert molding surface 520 can push against the molding material 512 forcing it into adjacent portions of the molding cavity 514 to spread into the remaining volume of the molding cavity 514.

Figure 54:
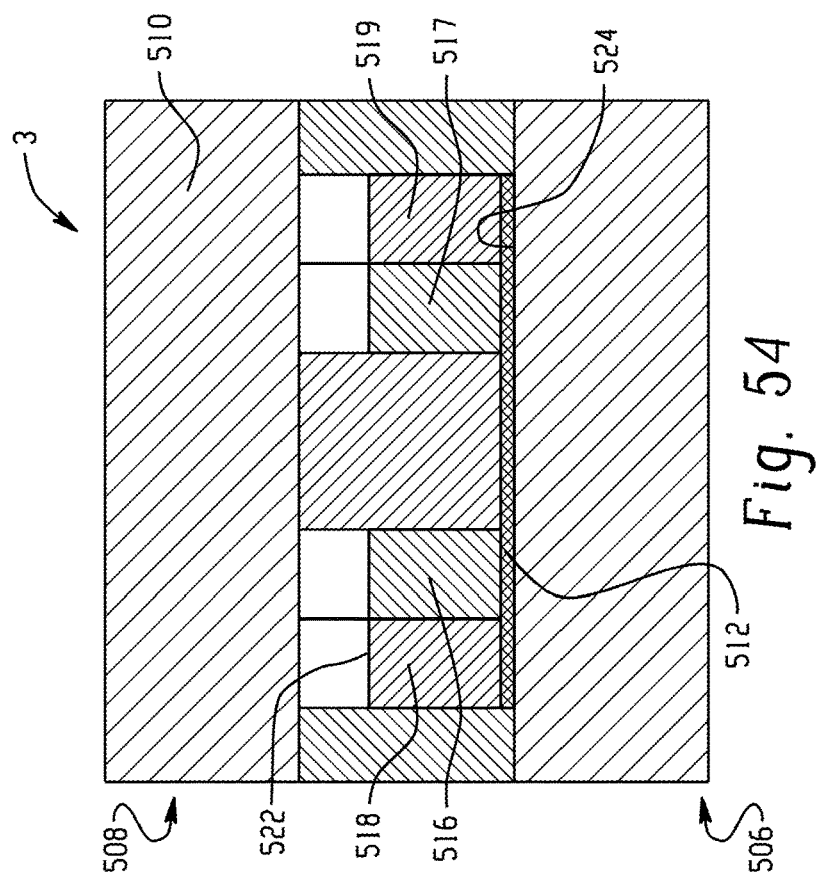
FIG. 54 is a cross-sectional illustration of the molding apparatus of FIG. 53 in a closed position with the mold inserts in a third position.
Figure 53:
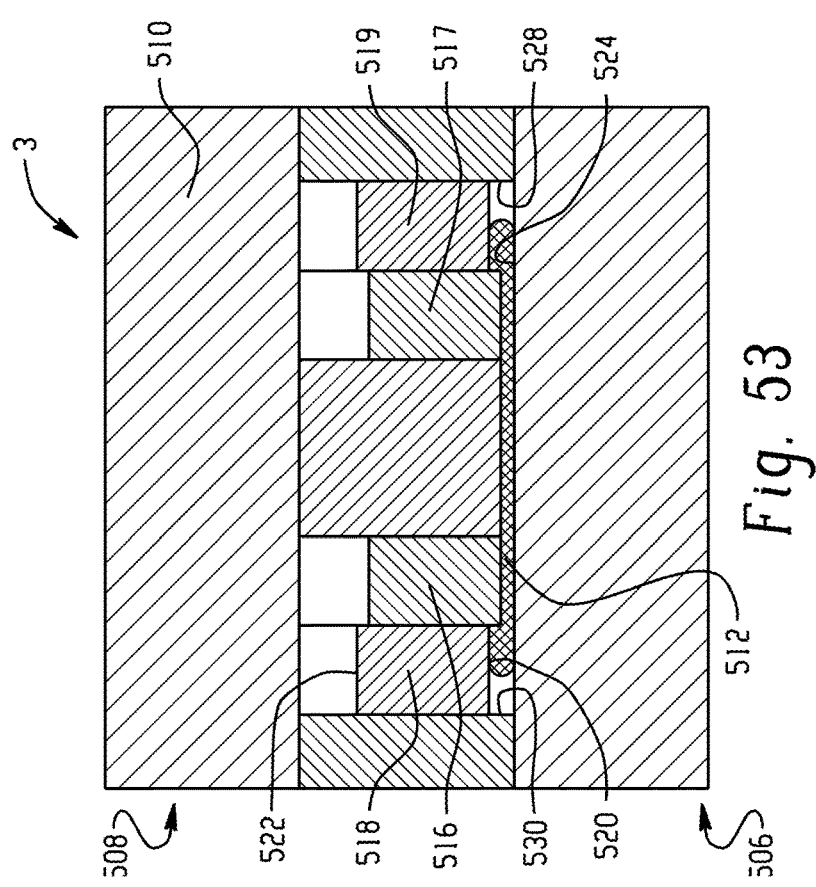
FIG. 53 is a cross-sectional illustration of the molding apparatus of FIG. 52 in a closed position with the mold inserts in a second position.
Figure 56:
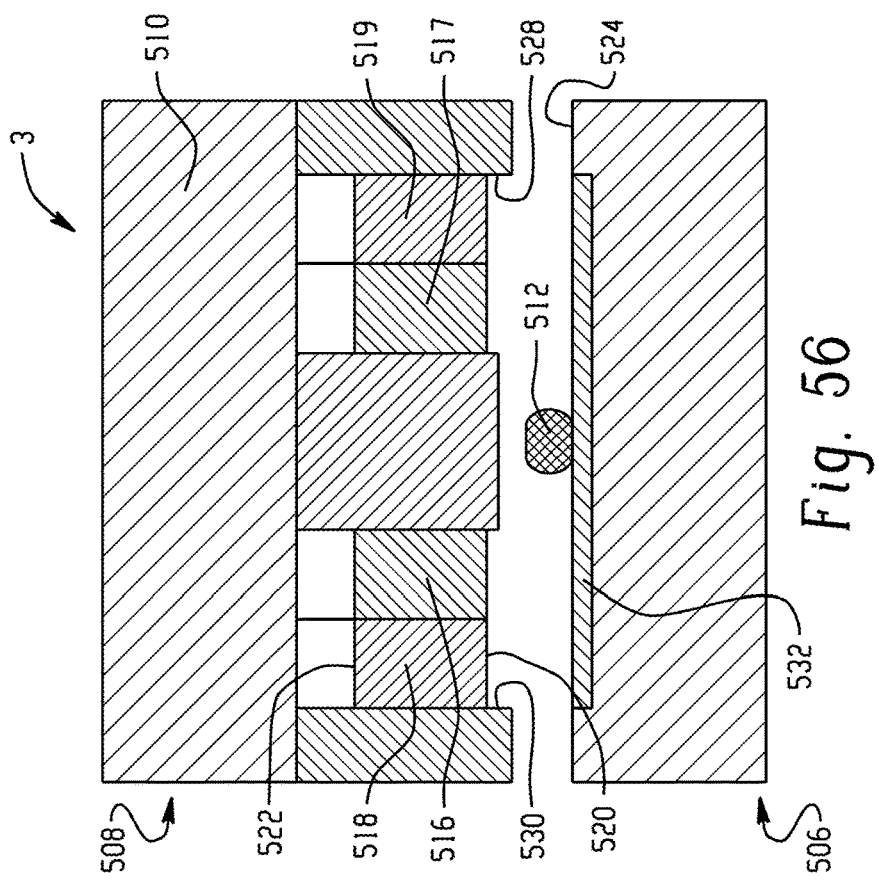
FIG. 56 is a cross-sectional illustration of another molding apparatus with apparatus in an open position with a sheet of material disposed on the stationary half of the mold and molten material disposed on the sheet of material.

The molding material 512 can move into the remainder of the molding cavity 514 by the other movable mold inserts 517, 518, 519, with the movable mold insert actuator 526 pressing on each mold insert until the entire molding cavity is filled see FIGS. 53 and 54). It is to be understood that in all the embodiments disclosed herein, movement of each mold insert can overlap one another, e.g., the first insert can still be moving while subsequent inserts begin moving. Stated another way, movement of the mold inserts can be simultaneous. Furthermore, it is to be understood that movement of the inserts can begin at any one of the inserts.

As each movable mold insert is moved, the insert molding surfaces can align such that upon cooling a seam therebetween in the molded part is less noticeable. Seams can be located on a non-exposed side of the part in order to minimize visibility. The seams can be overmolded with a coating layer through an in-mold coating process (IMC).

Figure 55:
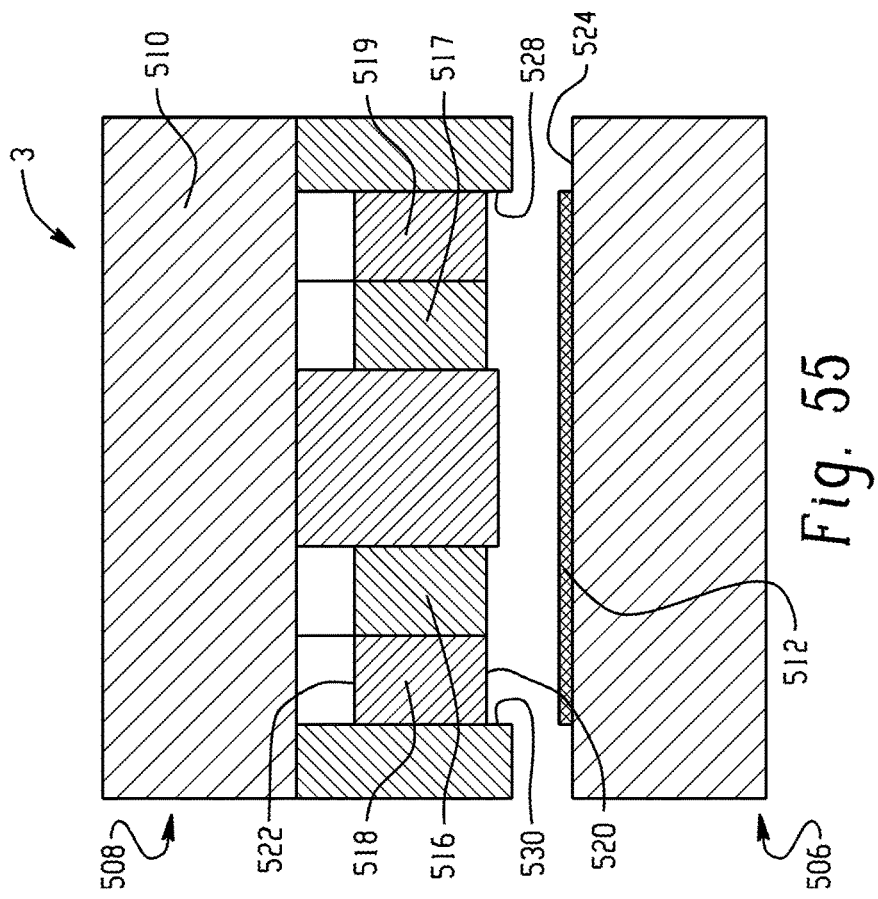
FIG. 55 is a cross-sectional illustration of the molding apparatus of FIG. 54 in an open position with the formed part.
Figure 62:
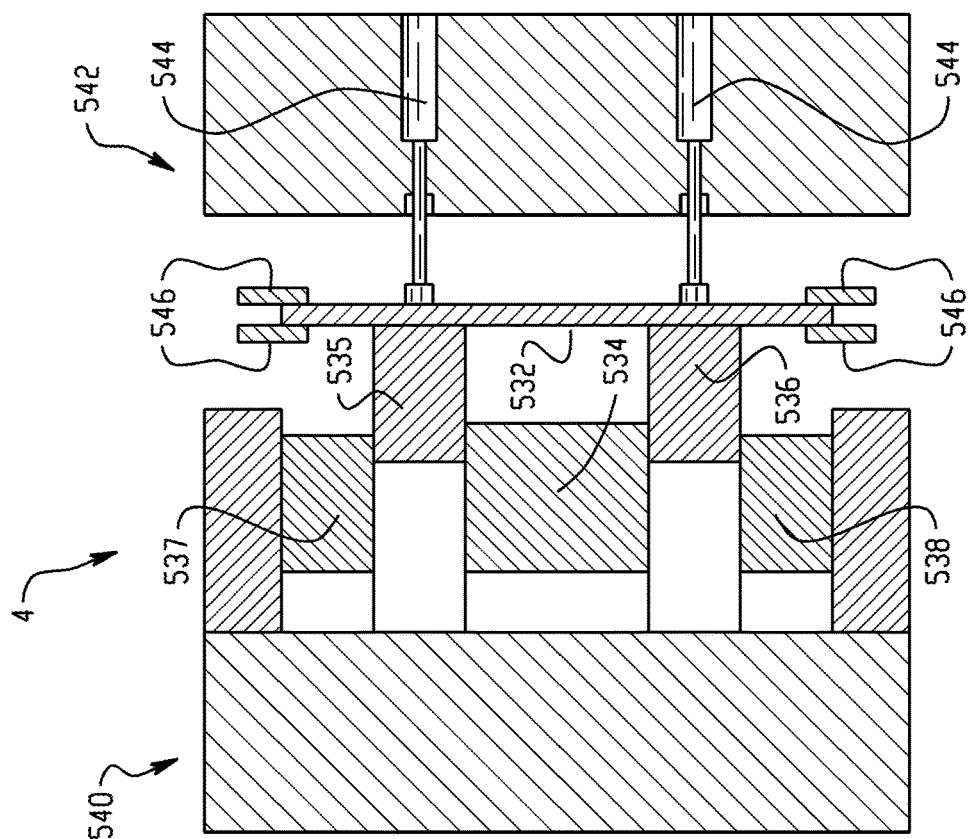
FIG. 62 is a cross-sectional illustration of the molding apparatus of FIG. 61 in an open position with a pair of mold inserts taking the sheet of material from the robot.

FIG. 54 is an illustration of the molding apparatus 3 of FIG. 51 where the mold inserts 516, 517, 518, 519 are in a second position. In this position, the molding apparatus 2 can maintain the final shape of the molding material as the mold is cooled to solidify the molded part. FIG. 55 is an illustration of the molding apparatus 3 of FIG. 51 where the mold inserts 516, 517, 518, 519 are back in their original, first position. Forces acting on the movable mold insert actuators can be varied to maintain the movable mold inserts 516, 517, 518, 519 and the molding material 512 in a final shape, thickness, depth, volume, area, or a combination including at least one of the foregoing.

Turning now to FIGS. 51 to 55, a compression molding apparatus 3 is illustrated. FIG. 51 is a cross-sectional view of the molding apparatus 3 in an open position with a stationary half 506 and a moving half 508. The moving half 508 can include a support plate 510. The support plate 510 can be pressed (e.g., compressed) to impart pressure on the molding material 512 in the molding cavity 514.

The molding apparatus 2 can include a first movable mold insert 516, which can be disposed in the moving half 508, the stationary half 506, or the first movable mold insert 516 can be disposed in both halves. The first movable mold insert 516 can be positioned horizontally or vertically in the mold apparatus 3. The moveable mold insert 516 can include an insert molding surface 520 and an insert pressing surface 522. The insert molding surface 520 can be disposed opposite the insert pressing surface 522. The insert molding surface 520 can face a resin mold surface 524 of the stationary half 506 when the first movable mold insert 516 is disposed in the moving half 508 and vice versa. The molding apparatus 3 of FIGS. 51 to 55 is shown having four movable mold inserts 516, 517, 518, 519 along the cross-section, however the molding apparatus 3 can include any number of movable mold inserts. For simplicity, and ease of understanding, reference to the first movable mold insert 516 in the following description can refer to any one, or combination of any of, the movable mold inserts 516, 517, 518, 519.

The moving half 508 can include a movable insert actuator 526, which can be in mechanical communication with the movable mold insert 516. The movable insert actuator 526, or a portion thereof, can be disposed at least partially between the moving half 508 and the movable mold insert 516.

The movable insert actuator 232, the moving half 508, any element of the moving half 508, or a combination including at least one of the foregoing, can cooperate in moving the first movable mold insert 216 relative to the moving half 508, the stationary half 506, or both. For example, the movable insert actuator 526 can be in mechanical communication with an actuation system, e.g., hydraulic element (e.g., a piston or ram), pneumatic, electro mechanic a mechanical mechanism (e.g., hydraulic, pneumatic, screw), electromechanical mechanism (e.g., induction), and the like which can move the movable insert actuator 526 and correspondingly move the insert molding surface 520 toward the resin mold surface 524. In the open position, the molding cavity 514 can be further defined by a first mold cavity edge 528, and a second mold cavity edge 530.

FIG. 52 is an illustration of a cross-sectional view of the molding apparatus 3 in the closed position. In the closed position, the molding cavity 514 can be correspondingly closed (e.g., where the molding material 512 is spatially confined within the molding cavity 514. The first movable mold insert 516 can be moved relative to the moving half 508 and can correspondingly change a molding cavity shape, a molding cavity area, a molding cavity thickness (e.g., as measured along the t dimension in the accompanying figures), a molding cavity depth (e.g., as measured along the d dimension in the accompanying figures), a molding cavity volume, or a combination including at least one of the foregoing.

The following description is made in reference to FIGS. 51 to 55 which illustrate a molding process comprising the sequential operation of the molding apparatus 3. However, the present disclosure is not limited to such operation. It should be appreciated, that the described sequence can be altered without departing from the spirit of the disclosure. As shown in FIG. 52, a first movable mold insert 516 can be moved toward the resin mold surface 524 by a first movable insert actuator 526. The insert molding surface 520 can push against the molding material 512 forcing it into adjacent portions of the molding cavity 514 to spread into the remaining volume of the molding cavity 514.

The molding material 512 can move into the remainder of the molding cavity 514 by the other movable mold inserts 517, 518, 519, with the movable mold insert actuator 526 pressing on each mold insert until the entire molding cavity is filled see FIGS. 53 and 54). It is to be understood that in all the embodiments disclosed herein, movement of each mold insert can overlap one another, e.g., the first insert can still be moving while subsequent inserts begin moving. Stated another way, movement of the mold inserts can be simultaneous. Furthermore, it is to be understood that movement of the inserts can begin at any one of the inserts.

As each movable mold insert is moved, the insert molding surfaces can align such that upon cooling a seam therebetween in the molded part is less noticeable. Seams can be located on a non-exposed side of the part in order to minimize visibility. The seams can be overmolded with a coating layer through an in-mold coating process (IMC).

FIG. 54 is an illustration of the molding apparatus 3 of FIG. 51 where the mold inserts 516, 517, 518, 519 are in a second position. In this position, the molding apparatus 2 can maintain the final shape of the molding material as the mold is cooled to solidify the molded part. FIG. 55 is an illustration of the molding apparatus 3 of FIG. 51 where the mold inserts 516, 517, 518, 519 are back in their original, first position. Forces acting on the movable mold insert actuators can be varied to maintain the movable mold inserts 516, 517, 518, 519 and the molding material 512 in a final shape, thickness, depth, volume, area, or a combination including at least one of the foregoing.

FIGS. 56 to 60 illustrate the molding apparatus 3 of FIG. 55 with an inlay sheet of material (e.g., a laminate) 532 placed in the mold before the molten material 512.

Figure 61:
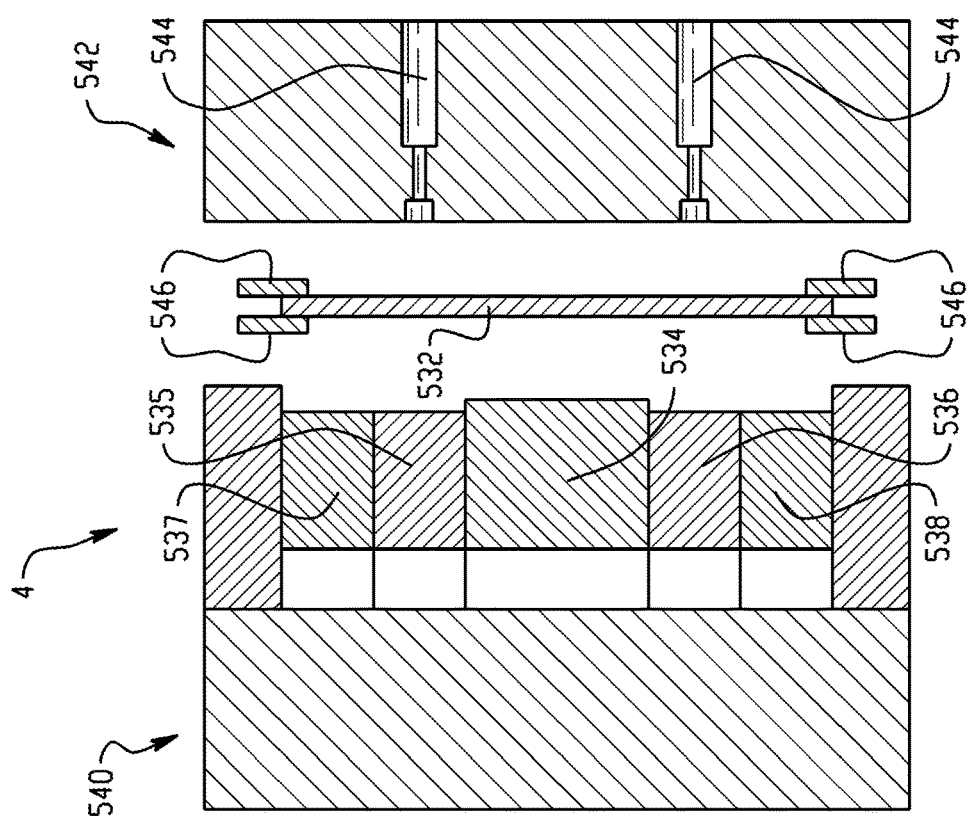
FIG. 61 is a cross-sectional illustration of another molding apparatus in an open position with a robot placing a sheet of material between the two mold halves.
Figure 64:
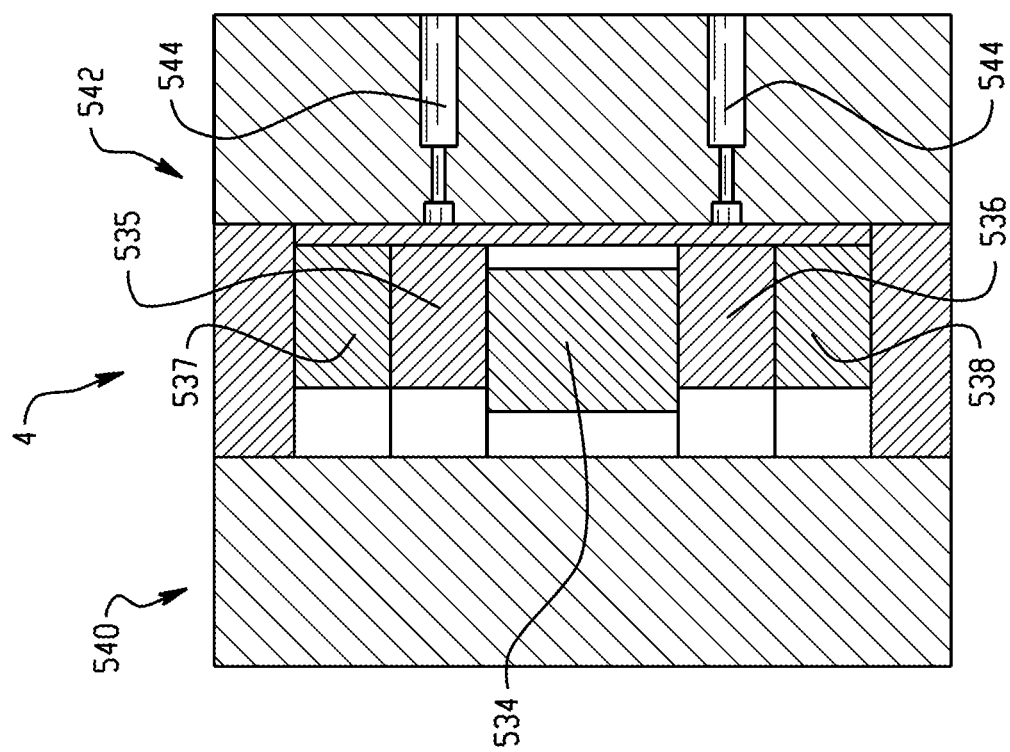
FIG. 64 is a cross-sectional illustration of the molding apparatus of FIG. 63 in a closed position.
Figure 63:
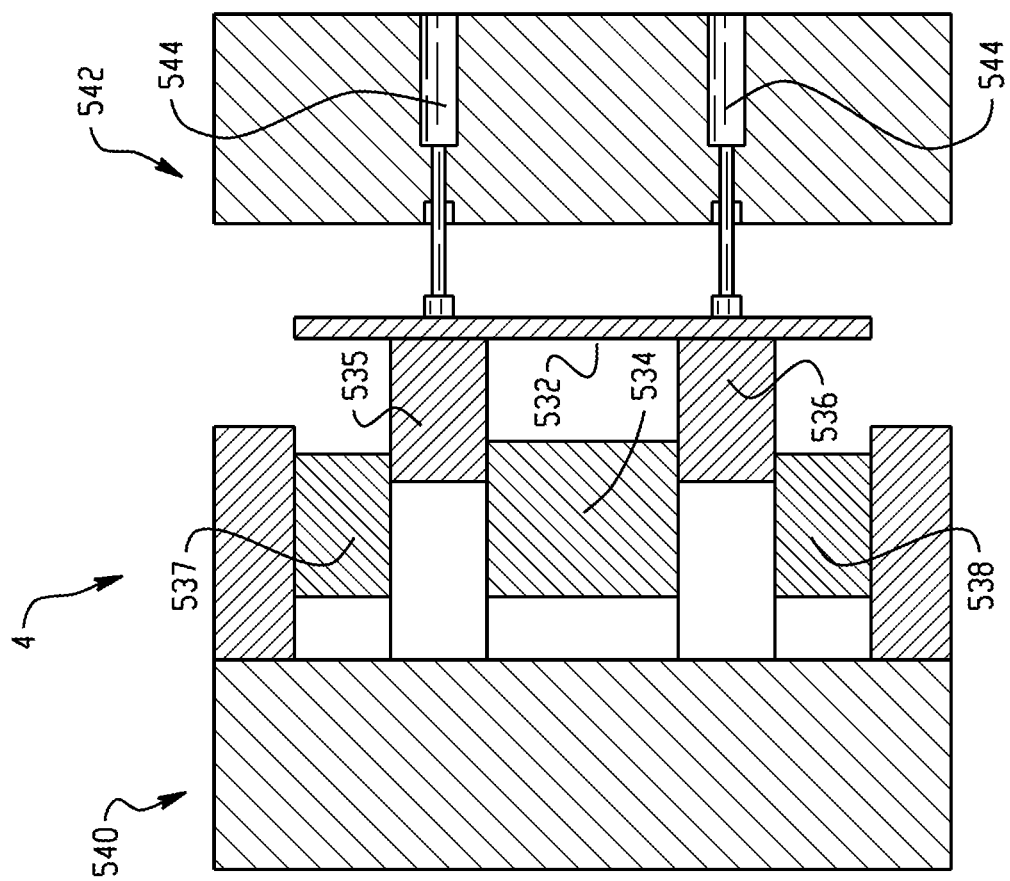
FIG. 63 is a cross-sectional illustration of the molding apparatus of FIG. 62 in an open position with the mold inserts holding the sheet of material.
Figure 66:
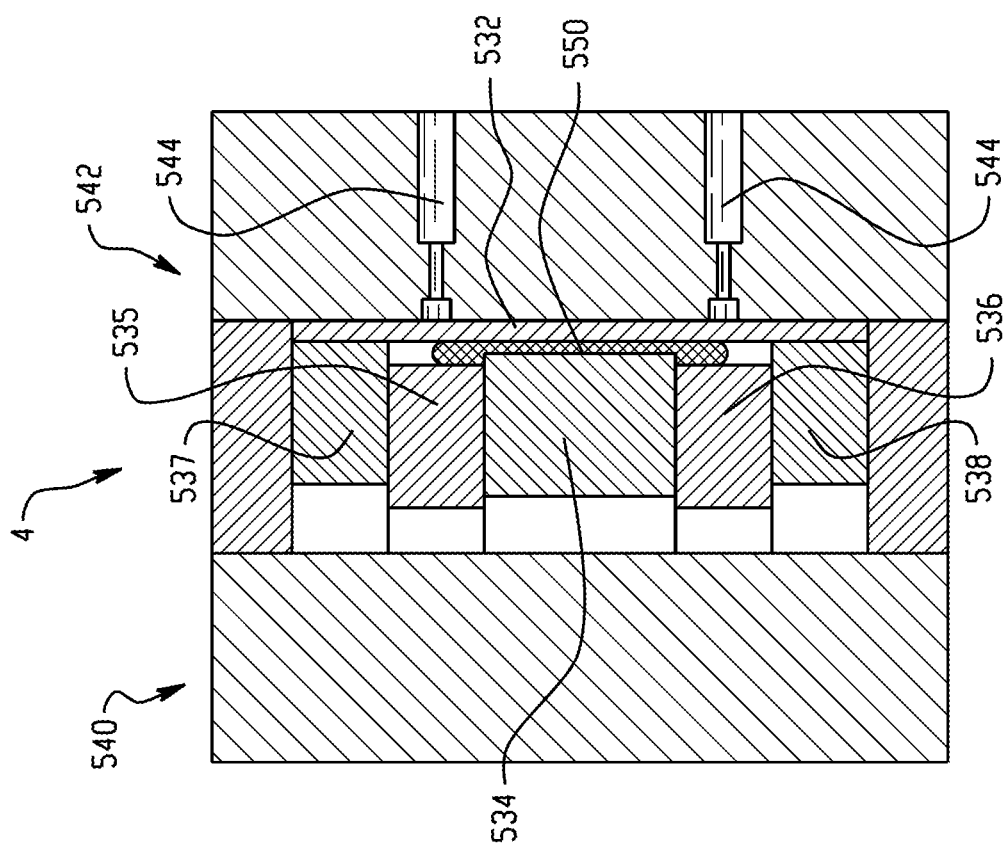
FIG. 66 is a cross-sectional illustration of the molding apparatus of FIG. 65 in a closed position with the mold inserts in a second position.
Figure 65:
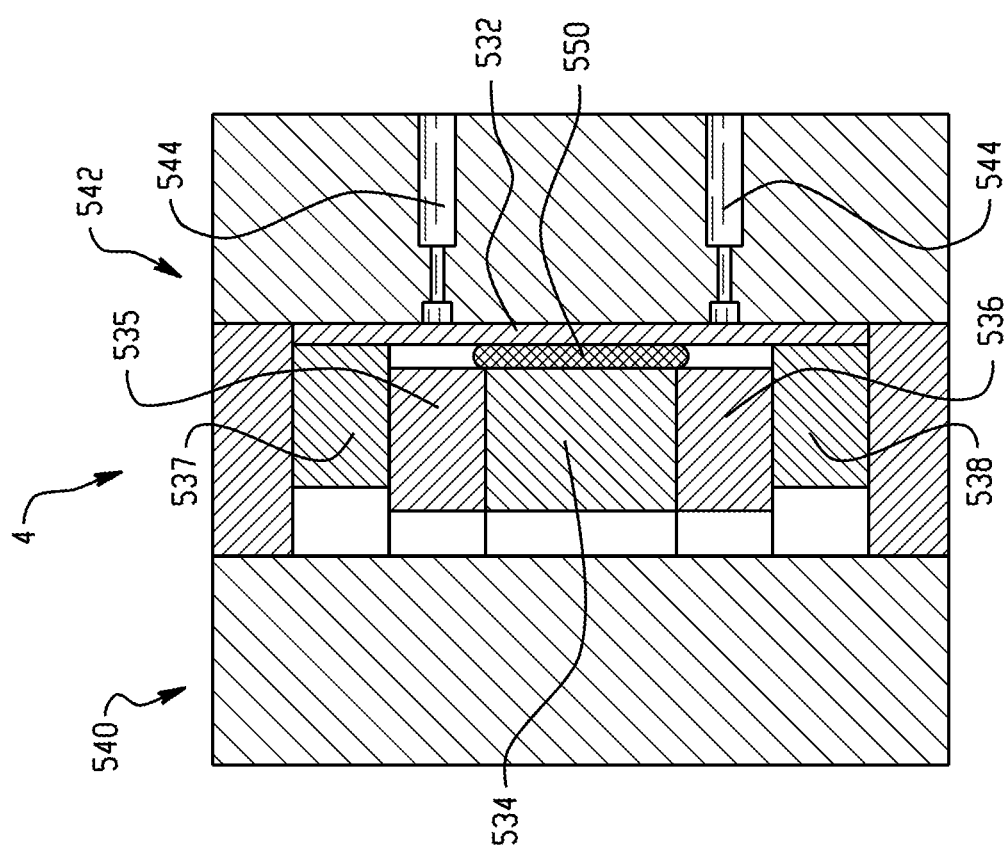
FIG. 65 is a cross-sectional illustration of the molding apparatus of FIG. 64 in a closed position with the mold inserts in a first position.
Figure 70:
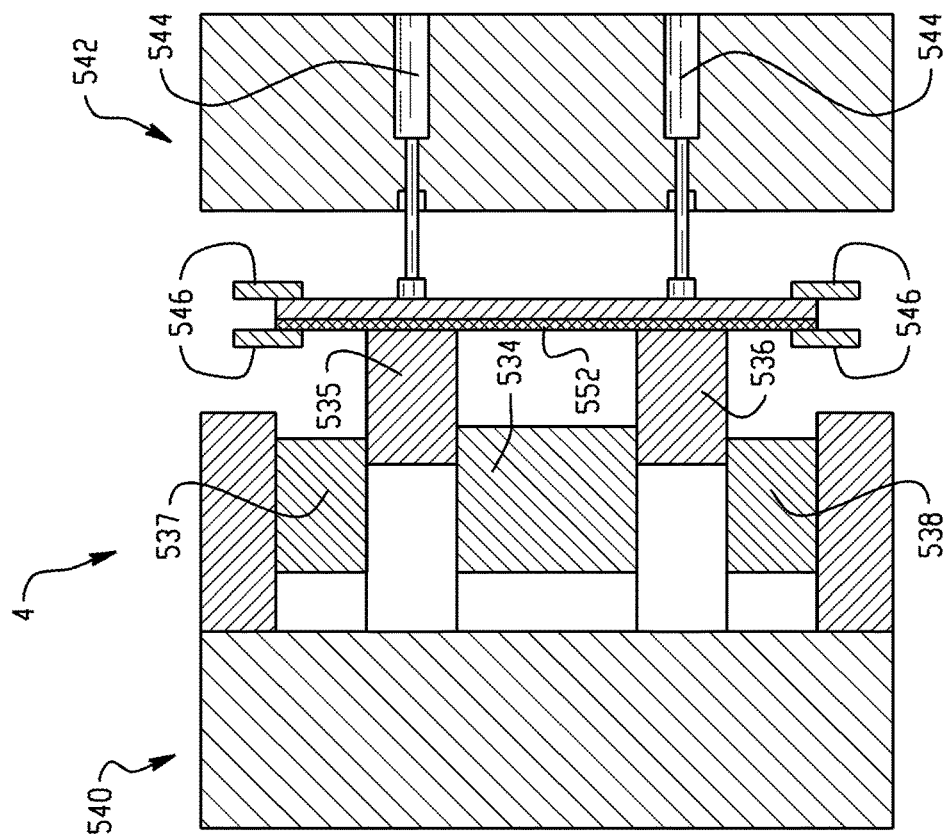
FIG. 70 is a cross-sectional illustration of the molding apparatus of FIG. 69 in an open position with the robot taking the part from the pair of mold inserts.
Figure 69:
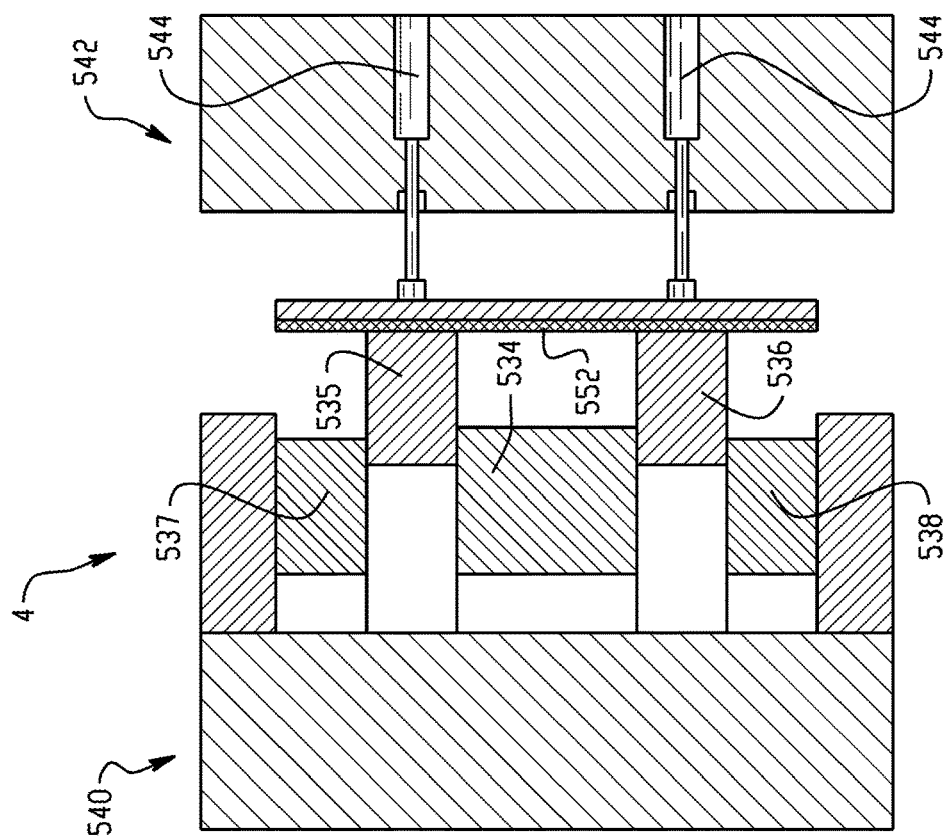
FIG. 69 is a cross-sectional illustration of the molding apparatus of FIG. 68 in an open position with the formed part held by a pair of mold inserts.

FIGS. 61 to 69 show a molding apparatus 4 where mold inserts 534, 535, 536, 537, and 538 integrated in a stationary half 540 of the molding apparatus 4 and a gripper 544 (e.g., a pneumatic gripper) is integrated in a moving half 542. An inlay 532 is disposed between the stationary half 540 and the moving half 542 held in place by a robot arm 546. In FIGS. 61-69, fragmented injection compression molding can be used to mold hybrid composite/plastic products, where the mold inserts 534-538 and gripper 544 can be used before molding to remove the inlay 532 from the robot arm 546. The mold inserts 534-538 and gripper 544 can hold the inlay 532 during mold close, and can release the inlay 532 during the injection phase. In FIG. 61, the robot arm 546 is positioning the inlay 523 into the molding apparatus 4. Next, the movable mold inserts 535, 536 and the gripper 544 take the inlay 532 (FIG. 62) and the robot arm 546 move away from the mold cavity 548 (FIG. 63) to allow the molding apparatus 4 to close (FIG. 64). Once the molding apparatus 4 has been closed, the mold inserts 537, 538 are moved to press against the laminate (FIG. 64) to hold the inlay 532 in place during injection. The mold inserts 537, 538 can be retracted when the melt 550 is approaching (FIG. 65). Mold insert 534 can be pushed into the melt 550 (FIG. 66), mold inserts 535, 536 can then be actuated and pressed toward the melt 550 (FIG. 67) as previously described herein with respect to fragmented injection compression molding. Also in FIG. 67, the mold inserts 537, 538 are retracted. The injection phase or dispersion phase can be completed by pushing the mold inserts 537, 538 into the melt 550 (FIG. 68). After cooling the mold can be opened with the gripper 544 and the mold insert 535, 536 holding onto the formed product 552 at which time it can be removed from the molding apparatus 4.

The surface of the formed product 552 can include a Class A surface (e.g., at a minimum, such surfaces can be smooth, glossy, and weatherable). The compression capabilities of the injection molding machine itself could be used to close the mold halves even more in order to compensate for shrinkage.

Figure 71:
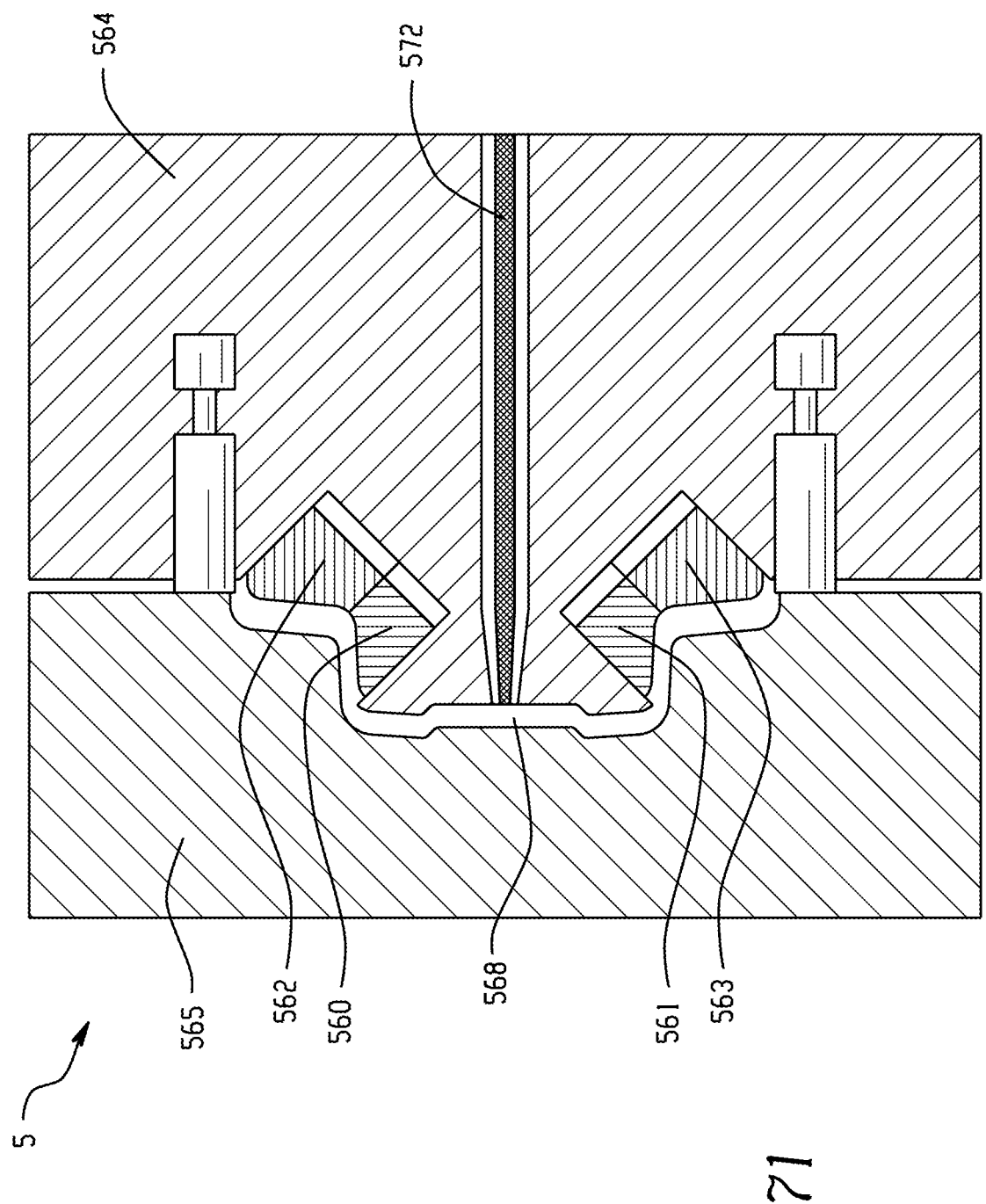
FIG. 71 is a cross-sectional illustration of another molding apparatus in an open position where a moving half of the molding apparatus is stationary during the compression phase of the injection molding cycle.
Figure 72:
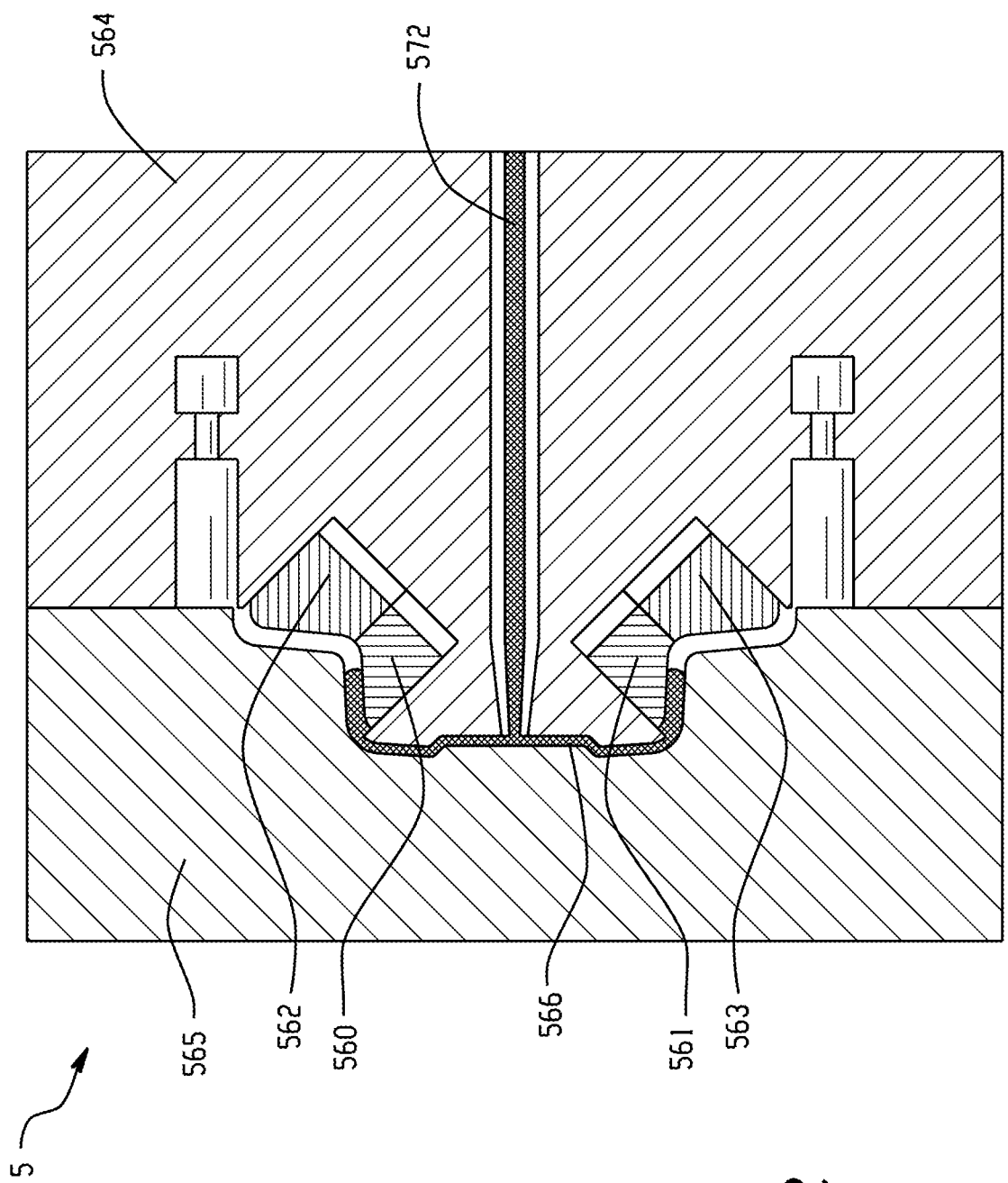
FIG. 72 is a cross-sectional illustration of the molding apparatus of FIG. 71 in a closed position where the mold inserts are in a first position.
Figure 73:
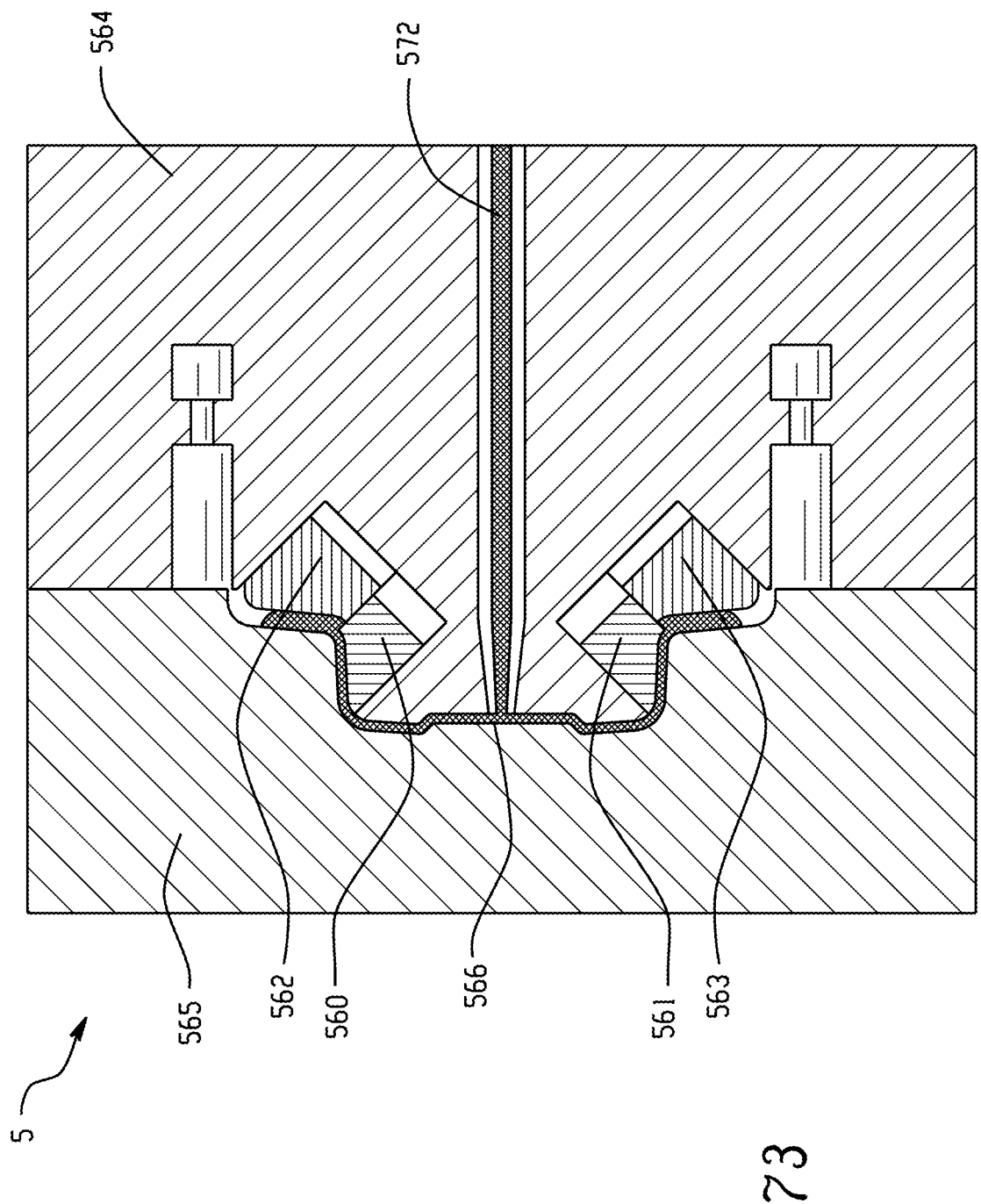
FIG. 73 is a cross-sectional illustration of the molding apparatus of FIG. 72 where the mold inserts are in a second position.
Figure 74:
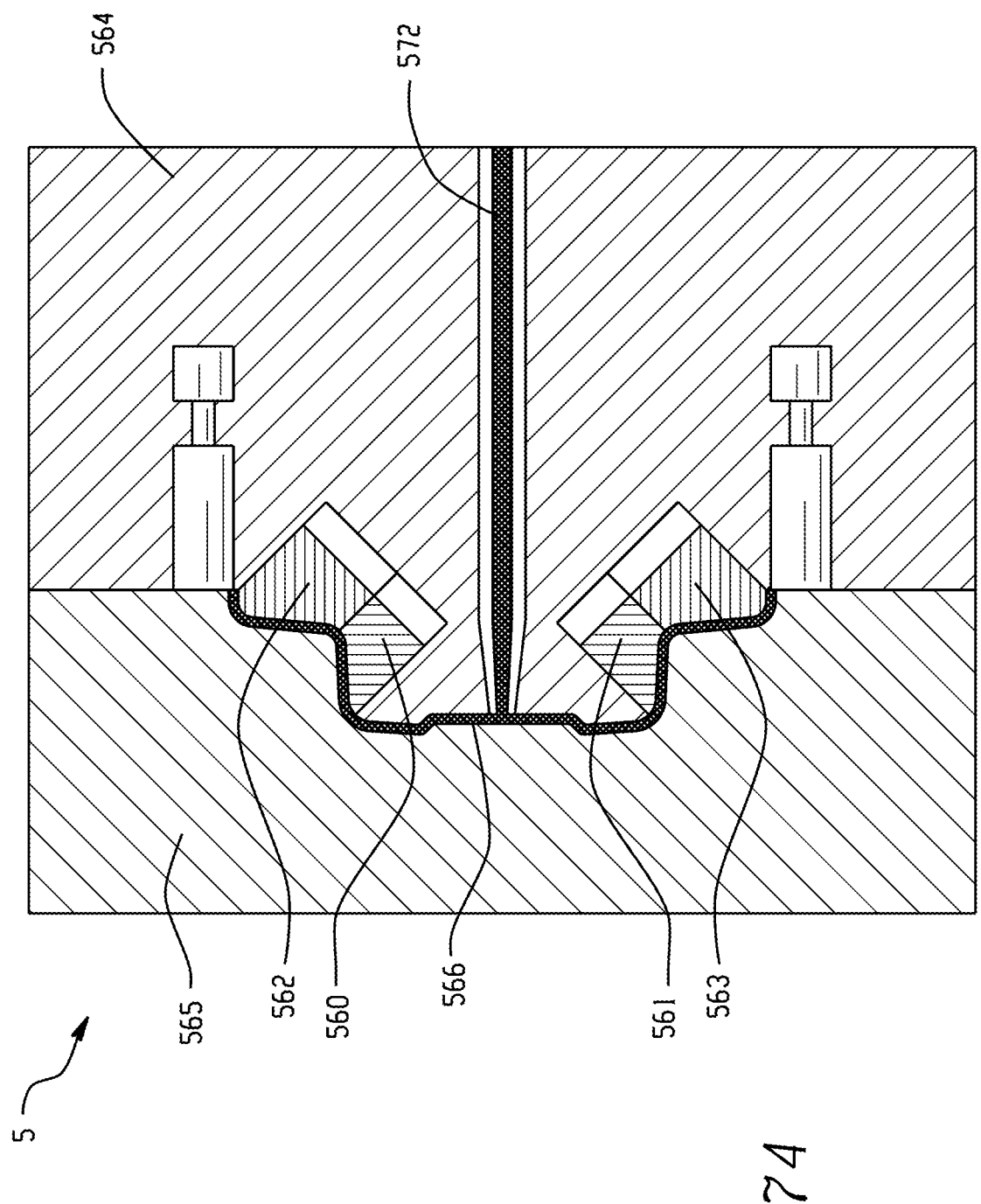
FIG. 74 is a cross-sectional illustration of the molding apparatus of FIG. 73 where the mold inserts are in a third position.
Figure 75:
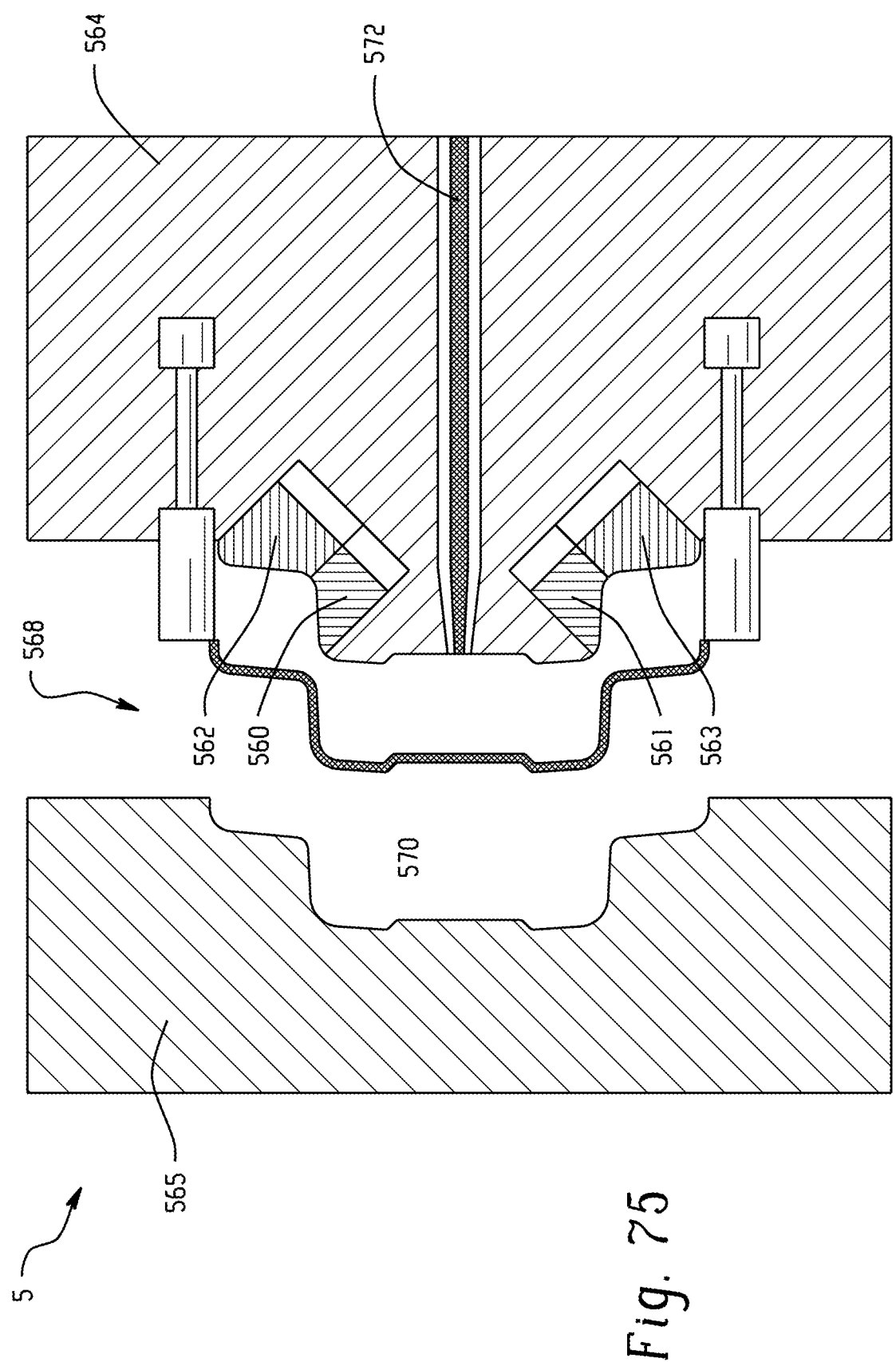
FIG. 75 is a cross-sectional illustration of the molding apparatus of FIG. 74 in an open position with the formed part being ejected from the mold.

FIGS. 71 to 75 show a molding apparatus 5 with a moving half 564 and a stationary half 565. In the molding apparatus 5, mold inserts 560, 561, 562, 563 are disposed in the moving half 564. In FIG. 71, the mold inserts 560-563 are in a first position with the molding apparatus closing. In FIG. 72, a melt 566 has been injected into a cavity 568 through sprue 572 and the mold inserts 560-563 are still in the first position. In FIG. 73, the melt 566 has moved further into the cavity 568 with the mold inserts 560, 561 in a second position and compressing the melt 566 toward the mold inserts 562, 563. In FIG. 74, the melt 566 has completely filled the cavity 568 and all the mold inserts 560-563 are in the second position. In FIG. 75, the molding apparatus 5 has been opened and the formed part 570 can be removed. FIGS. 71 to 75 demonstrate the complex parts with various molding angles can be formed with the fragmented injection compression molding processes disclosed herein.

The molding material 10 can be any material. The molding material 10 can include a polymeric material (e.g., including an oligomer), a metallic material, a glass, or a combination including at least one of the foregoing. The polymeric material can have any microstructure including branched units. Possible polymeric resins that can be employed include, but are not limited to, oligomers, polymers, ionomers, dendrimers, copolymers such as graft copolymers, block copolymers (e.g., star block copolymers, random copolymers, etc.) and combinations comprising at least one of the foregoing. Examples of such polymeric resins include, but are not limited to, polycarbonates (e.g., blends of polycarbonate (such as, polycarbonate-polybutadiene blends, copolyester polycarbonates)), polystyrenes (e.g., copolymers of polycarbonate and styrene, polyphenylene ether-polystyrene blends), polyimides (e.g., polyetherimides), acrylonitrile-styrene-butadiene (ABS), polyalkylmethacrylates (e.g., polymethylmethacrylates), polyesters (e.g., copolyesters, polythioesters), polyolefins (e.g., polypropylenes and polyethylenes, high density polyethylenes, low density polyethylenes, linear low density polyethylenes), polyamides (e.g., polyamideimides), polyarylates, polysulfones (e.g., polyarylsulfones, polysulfonamides), polyphenylene sulfides, polytetrafluoroethylenes, polyethers (e.g., polyether ketones, polyether etherketones, polyethersulfones), polyacrylics, polyacetals, polybenzoxazoles (e.g., polybenzothiazinophenothiazines, polybenzothiazoles), polyoxadiazoles, polypyrazinoquinoxalines, polypyromellitimides, polyquinoxalines, polybenzimidazoles, polyoxindoles, polyoxoisoindolines (e.g., polydioxoisoindolines), polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyls (e.g., polyvinyl ethers, polyvinyl thioethers, polyvinyl alcohols, polyvinyl ketones, polyvinyl halides, polyvinyl nitriles, polyvinyl esters, polyvinylchlorides), polysulfonates, polysulfides, polyureas, polyphosphazenes, polysilazzanes, polysiloxanes, and combinations comprising at least one of the foregoing.

More particularly, the polymeric can include, but is not limited to, polycarbonate resins (e.g., LEXAN™ resins, commercially available from SABIC's Innovative Plastics business such as LEXAN™ XHT, LEXAN™ HFD, etc.), polyphenylene ether-polystyrene blends (e.g., NORYL™ resins, commercially available from SABIC's Innovative Plastics business), polyetherimide resins (e.g., ULTEM™ resins, commercially available from SABIC's Innovative Plastics business), polybutylene terephthalate-polycarbonate blends (e.g., XENOY™ resins, commercially available from SABIC's Innovative Plastics business), copolyestercarbonate resins (e.g. LEXAN™ SLX or LEXAN™ FST resins, commercially available from SABIC's Innovative Plastics business), acrylonitrile butadiene styrene resins (e.g., CYCOLOY™ resins, commercially available from SABIC's Innovative Plastics business), polyetherimide/siloxane resins (e.g., SILTEM™, commercially available from SABIC's Innovative Plastics business), polypropylene resins, for example, long glass fiber filled polypropylene resins (e.g., STAMAX™ resins, commercially available from SABIC's Innovative Plastics business), and combinations comprising at least one of the foregoing resins.

Even more particularly, the polymeric resins can include, but are not limited to, homopolymers and copolymers of a polycarbonate, a polyester, a polyacrylate, a polyamide, a polyetherimide, a polyphenylene ether, or a combination comprising at least one of the foregoing resins. The polycarbonate can comprise copolymers of polycarbonate (e.g., polycarbonate-polysiloxane, such as polycarbonate-polysiloxane block copolymer), linear polycarbonate, branched polycarbonate, end-capped polycarbonate (e.g., nitrile endcapped polycarbonate) blends of PC, such as PC/ABS blend, and combinations comprising at least one of the foregoing, for example a combination of branched and linear polycarbonate.

The polymeric material can include additives, e.g., an impact modifier, ultraviolet light absorber, mold release agent, anti-dripping agent, flame retardant, anti-graffiti agent, pigment, or a combination including at least one of the foregoing. The molding material 10 can include reinforcing materials, such as glass, carbon, basalt, aramid, or combination comprising at least one of the foregoing. Reinforcing materials can include cut, chopped, strand fibers, or a combination comprising at least one of the foregoing. For example, the reinforcing materials can include cut glass fibers, strand glass fibers, or a combination comprising at least one of the foregoing.

The molding process can include cooling a portion of the molded part until a cooling criteria is satisfied, cooling the molded part until a cooling criteria is satisfied, cooling the molded part until a surface temperature of the part decreases below a glass transition temperature of the molding material, cooling molding material while a molding tool is closed to form the molded part, holding a molding apparatus in a closed position for a specified time duration, holding a molding apparatus in a closed position until a cooling criteria has been satisfied, or a combination including at least one of the foregoing.

Various articles can be formed in the injection molding apparatus described herein. The part can include a surface area corresponding to the molding cavity area and a thickness corresponding to the molding cavity depth. Applications can include electronic devices (e.g., mobile phones, laptop computers, electronic tablets, e-readers, televisions, computer monitors, touch displays, and the like), automotive components such as vehicular body panels (e.g., engine hoods, roof parts, doors, truck spoilers, etc.), home appliances, refrigerator shelves, medical devices, office furniture, building materials, construction materials, eye wear, face shields, and the like. For example, these articles can be used in housings, bezels, control panels, display panels, windows, covers, trim pieces, support elements, and the like. In an embodiment, the article can form a housing for an electronic device where an electronic component is disposed within the article (e.g., a mobile phone, electronic tablet, e-reader, and the like). In an embodiment, the article can form an automotive interface such as a radio bezel, heat/ventilation/air conditioner bezel (e.g., heating vent bezel, ventilation bezel, air conditioning bezel, or the like), rocker button, instrument cluster, or a combination including at least one of the foregoing.

EXAMPLES

Example 1: CIM Compared to FICM

Figure 34:
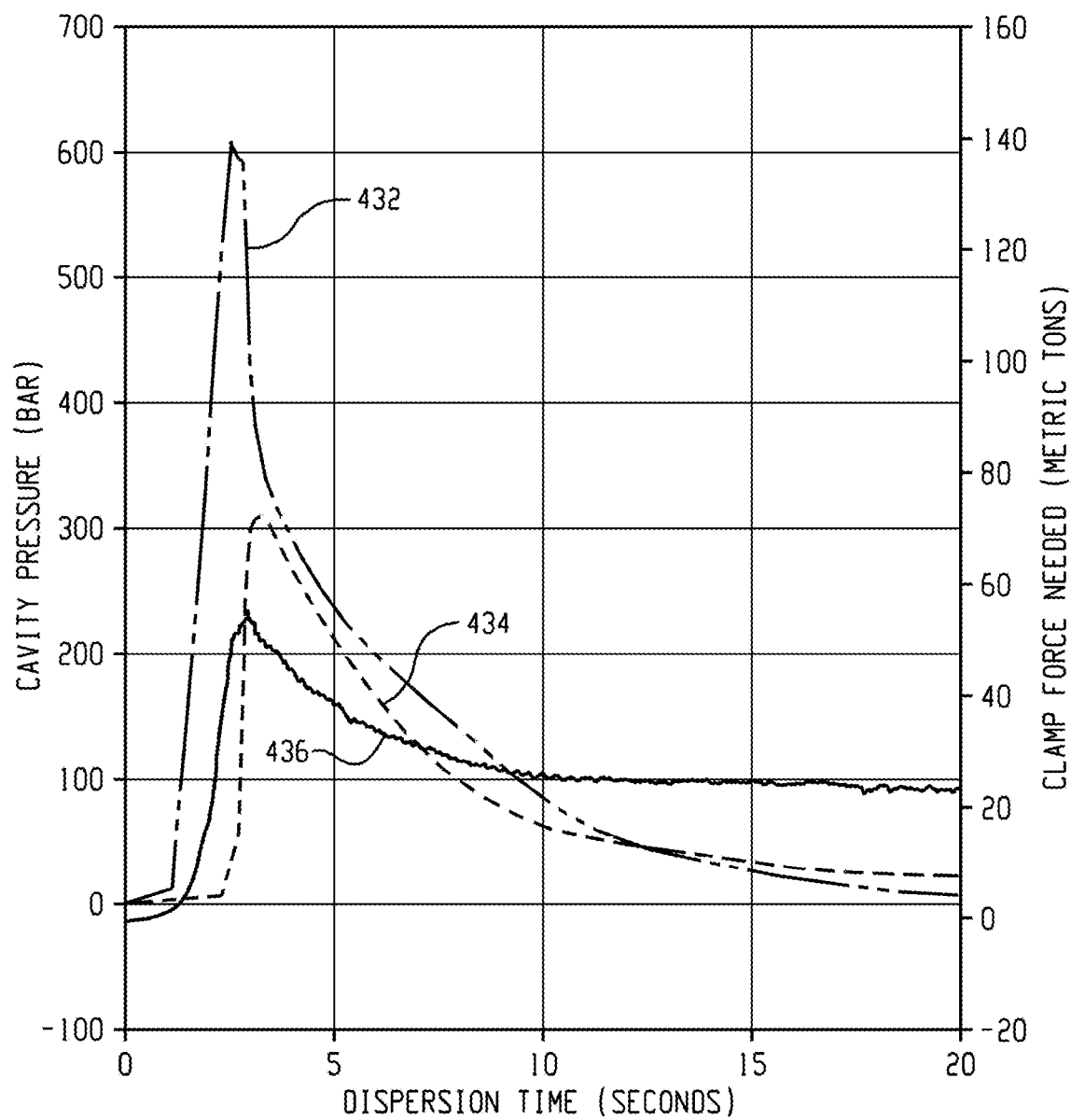
FIG. 34 is a graphical illustration of the cavity pressure and clamp force compared to conversion time during a compact injection molding cycle.
Figure 35:
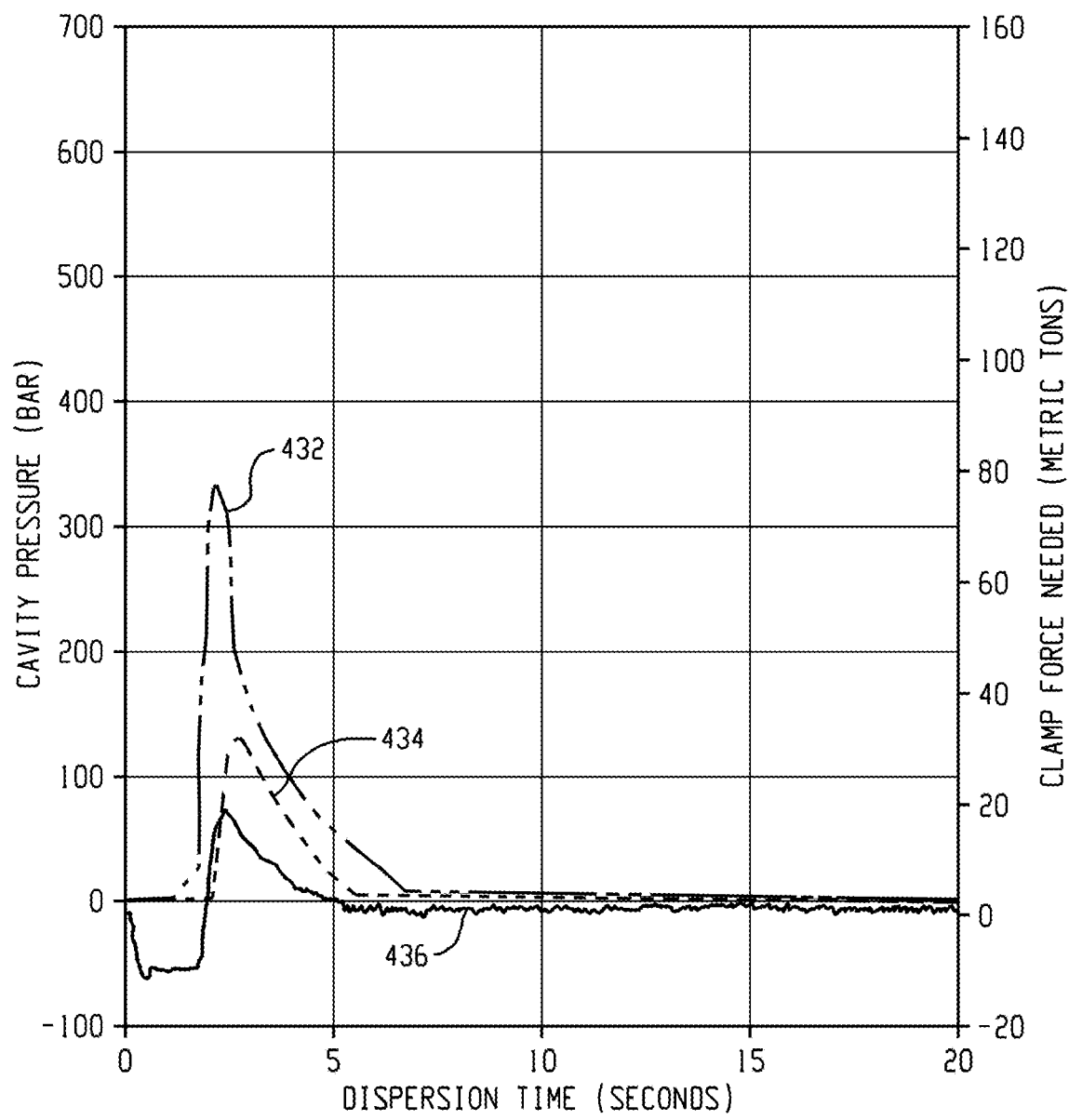
FIG. 35 is a graphical illustration of the cavity pressure and clamp force compared to conversion time during a fragmented injection compression molding cycle with the design illustrated in FIGS. 1-4.

In this example, compact injection molding (CIM) and fragmented injection compression molding (FICM) using as apparatus such as described in FIGS. 1 to 4 were compared for the cavity pressure and clamp force needed to fill the cavity at various portions along the injection mold. For example, these values were measured at a location close to the gate (CTG) and at a location at the end of the cavity (EOC). FIGS. 34 and 35 measure cavity pressure measured in bars and clamp force 436 needed to fill the cavity measured in metric tons versus dispersion time measured in seconds (s) for polycarbonate polymer, LEXAN™ 133R, commercially available from SABIC's Innovative Plastics business. As can be seen in FIG. 34 and FIG. 35, CIM illustrated in FIG. 34 required higher pressure and higher clamp force in order to fill the cavity than FICM illustrated in FIG. 35.

Figure 36:
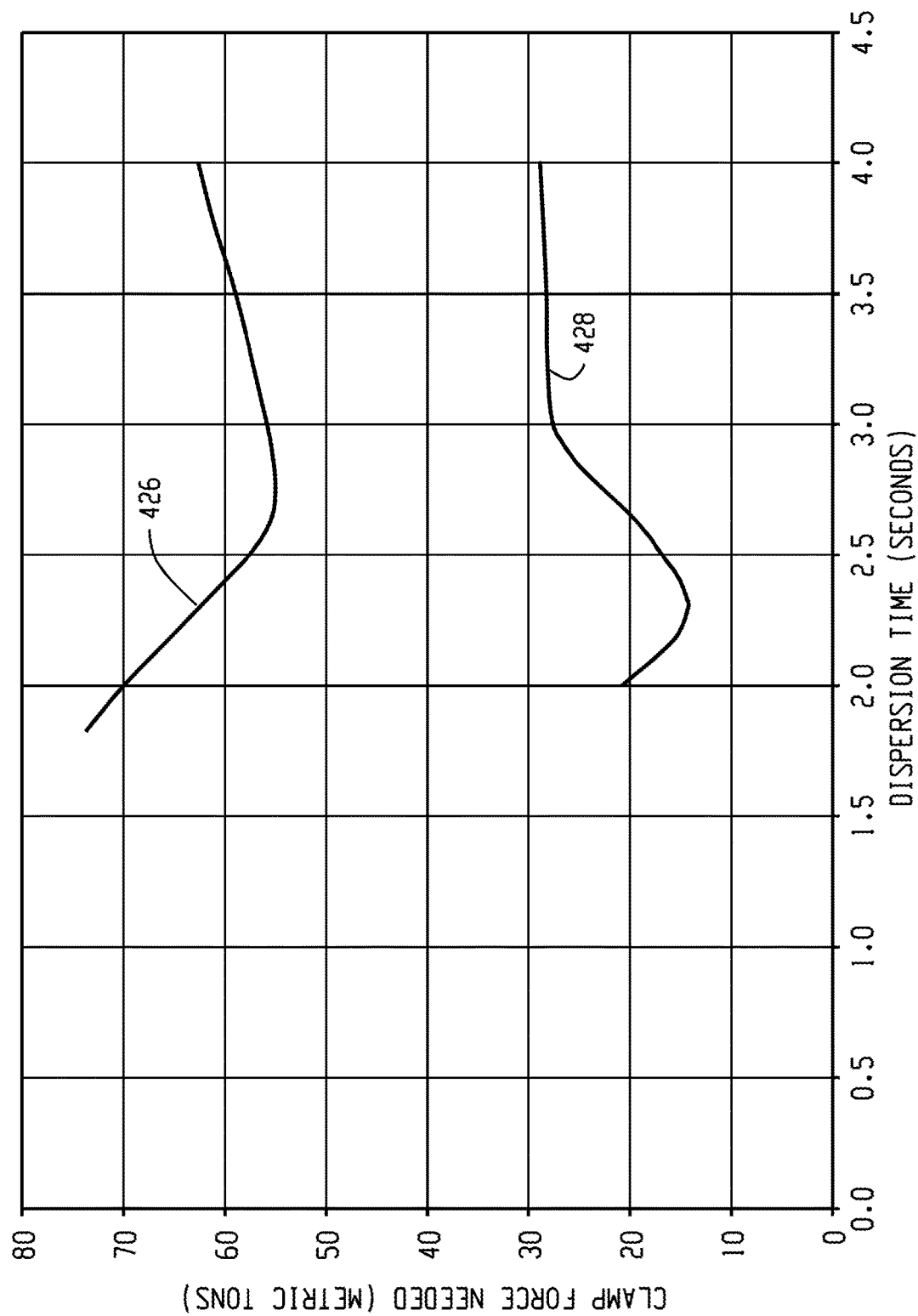
FIG. 36 is a graphical representation of the clamp force versus conversion time for polycarbonate pellets for a compression injection molding cycle and a fragmented injection compression molding cycle.

FIG. 36 illustrates polycarbonate polymer, LEXAN™ 133R, commercially available from SABIC's Innovative Plastics business that was injection molded with both CIM 426 and FICM 428 using a molding apparatus as illustrated in FIGS. 1 to 4. FIG. 36 measures clamp force needed to fill the cavity in metric tons versus dispersion time measured in seconds. As can be seen in FIG. 36, the clamp force needed to fill the cavity is reduced by at least 75% with FICM compared to CIM.

Figure 37:
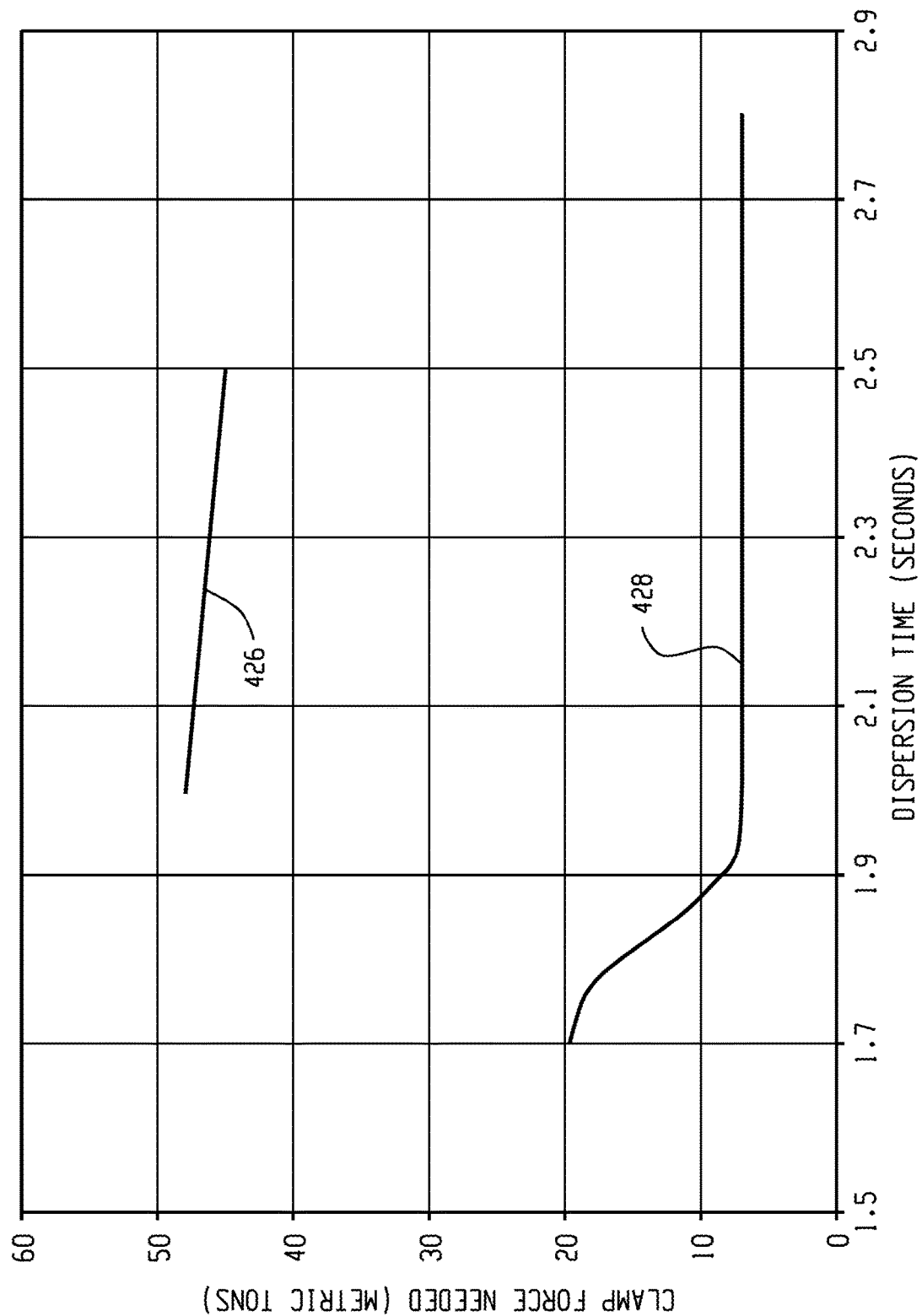
FIG. 37 is a graphical representation of the clamp force versus conversion time for polycarbonate/polyethylene terephthalate pellets for a compression injection molding cycle and a fragmented injection compression molding cycle.

In FIG. 37, a polycarbonate/polyethylene terephthalate blend, XENOY™ X2500UV, commercially available from SABIC's Innovative Plastics business that was injection molded with both CIM 426 and FICM 428 using a molding apparatus as illustrated in FIGS. 1 to 4. FIG. 37 measures clamp force needed to fill the cavity in metric tons versus conversion time measured in seconds. As can be seen in FIG. 37, the clamp force needed to fill the cavity is reduced by at least 85% with FICM compared to CIM.

Example 2: Strain Sensor Functionality

Figure 38:
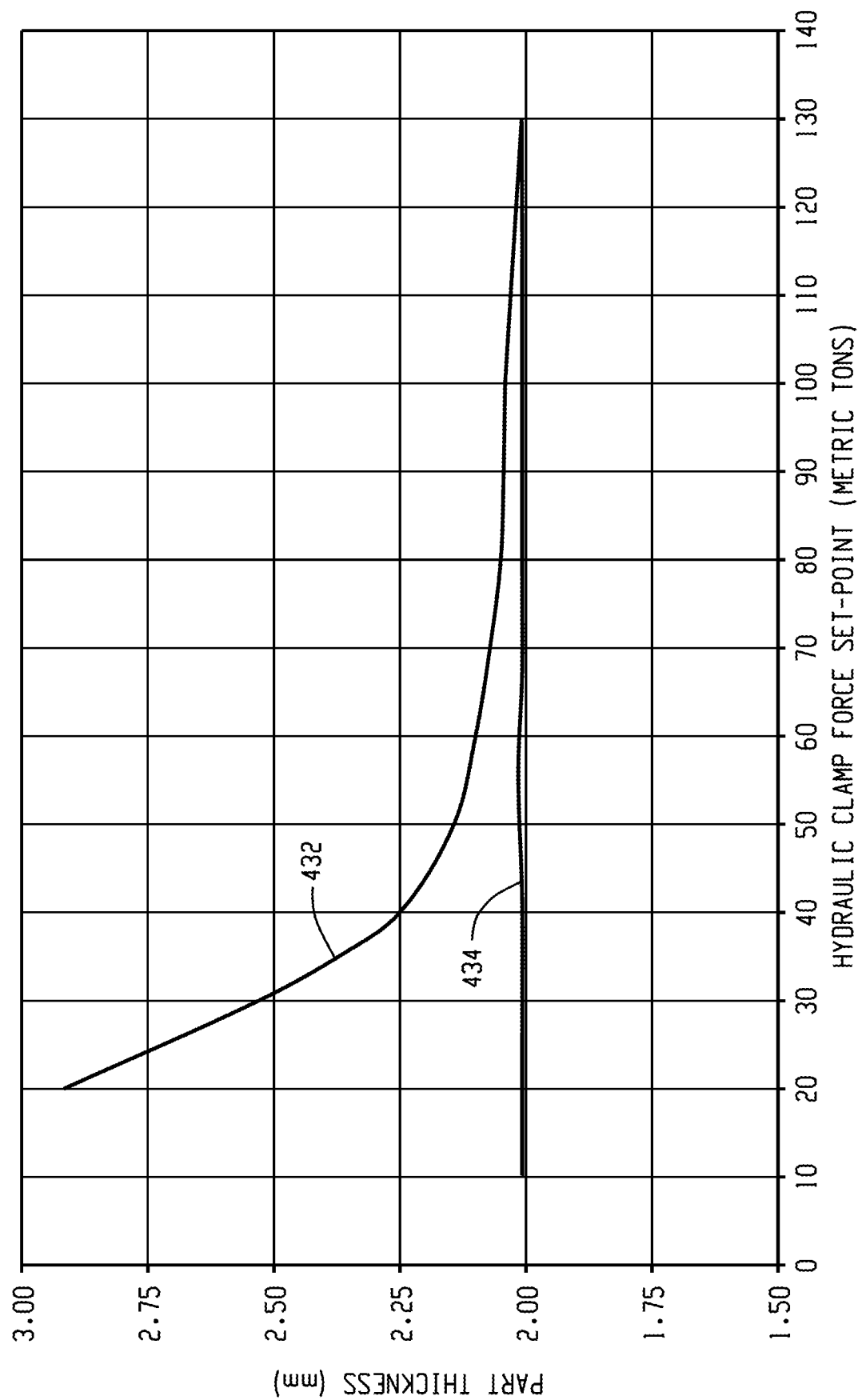
FIG. 38 is a graphical representation of the part thickness as a function of hydraulic clamp force set-point for compression injection molding and fragmented compression injection molding.

In this example, the injection molding machine's hydraulic clamping force was lowered to check the strain sensor functionality on the injection molding machine for CIM 432 and FICM 434. An Arburg 520S 1300-400 machine was used (a 130 ton injection molding machine). The material molded for this example was polycarbonate (LEXAN™ 133R, commercially available from SABIC's Innovative Plastics business.] The calculated clamp force was based upon a mold strain of 56 tons for CIM and 14 tons for FICM. As can be seen in FIG. 38, which illustrates the part thickness measured in millimeters versus the hydraulic clamp for set point measured in metric tons for a CIM sample 432 and a FICM sample 434, the part thickness was uniform regardless of hydraulic clamp for set point for the FICM sample 434. To the contrary, the part thickness of the CIM sample 432, the part thickness varied throughout the changes in hydraulic clamp force set point. These results indicate that the molding apparatus and methods disclosed herein can utilize a lower hydraulic clamp force with a consistent or uniform part thickness.

Example 3: Cavity Pressure Build-Up

Figure 39A:
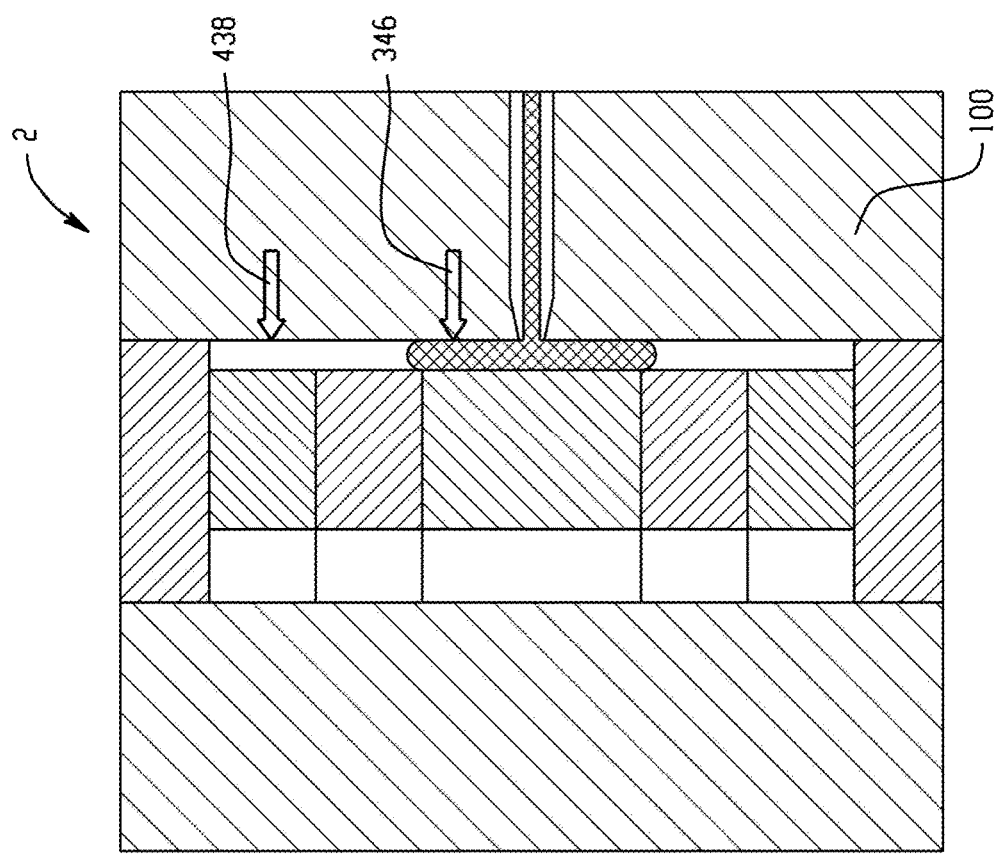
FIG. 39A is a view of a fragmented injection compression molding apparatus in a closed position at the melt injection stage of injection molding.
Figure 39B:
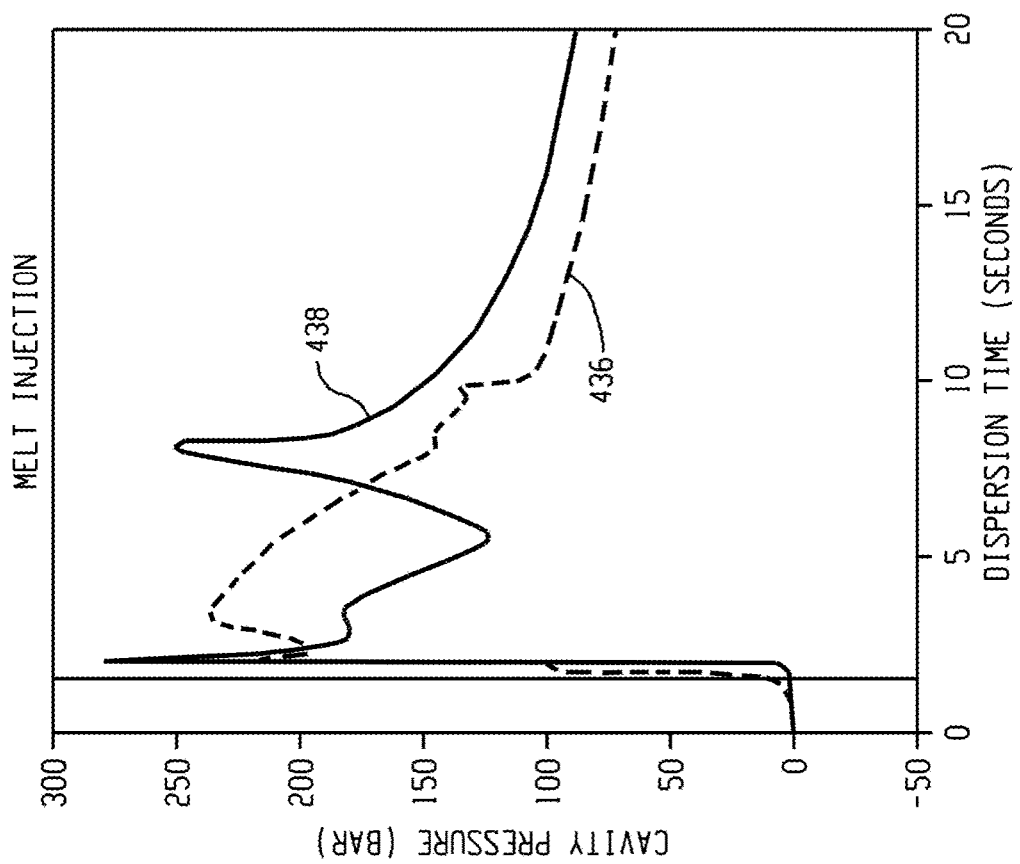
FIG. 39B is a graphical representation of the cavity pressure compared to dispersion time for the fragmented injection compression molding apparatus of FIG. 39A.
Figure 40A:
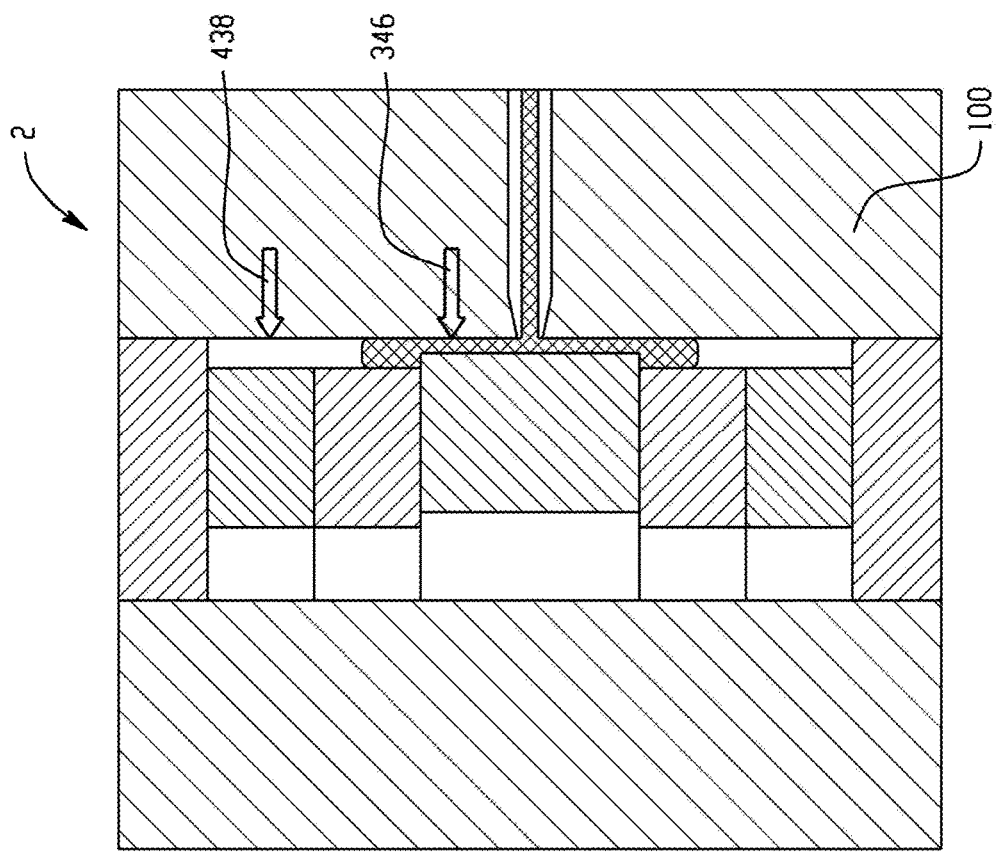
FIG. 40A is a view of the fragmented injection compression molding apparatus of FIG. 39A during movement of the first mold insert.
Figure 40B:
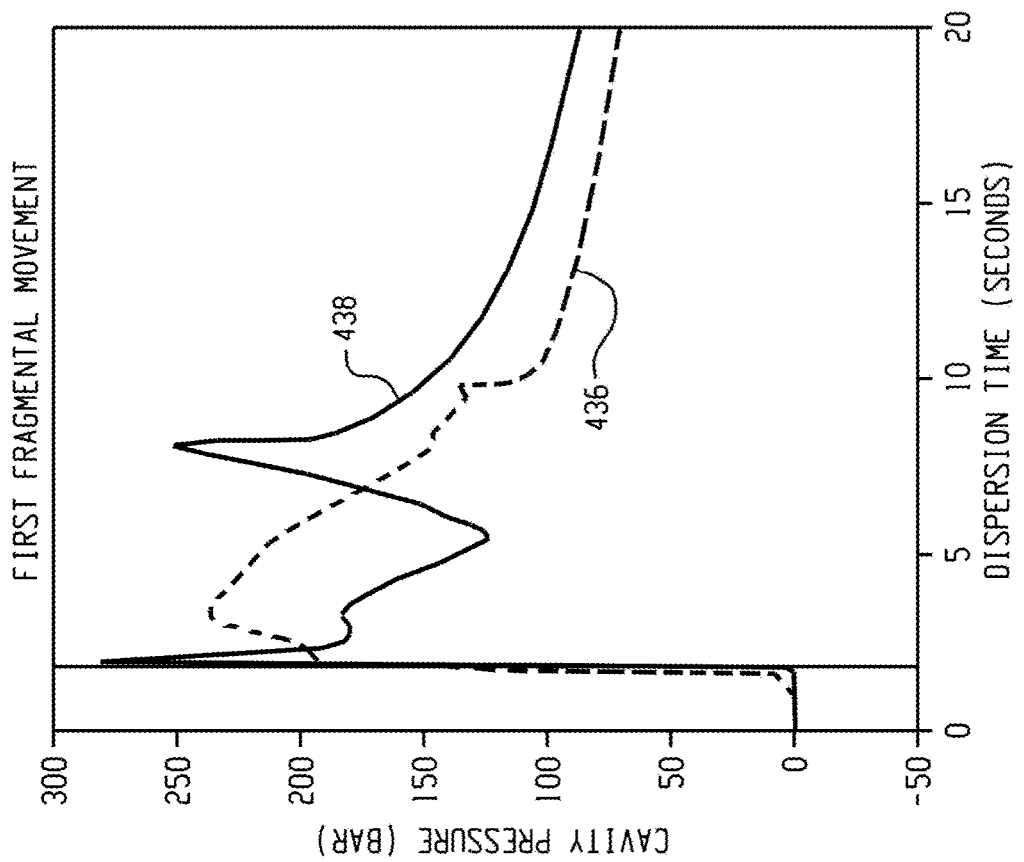
FIG. 40B is a graphical representation of the cavity pressure compared to dispersion time during movement of the first mold insert.
Figure 41A:
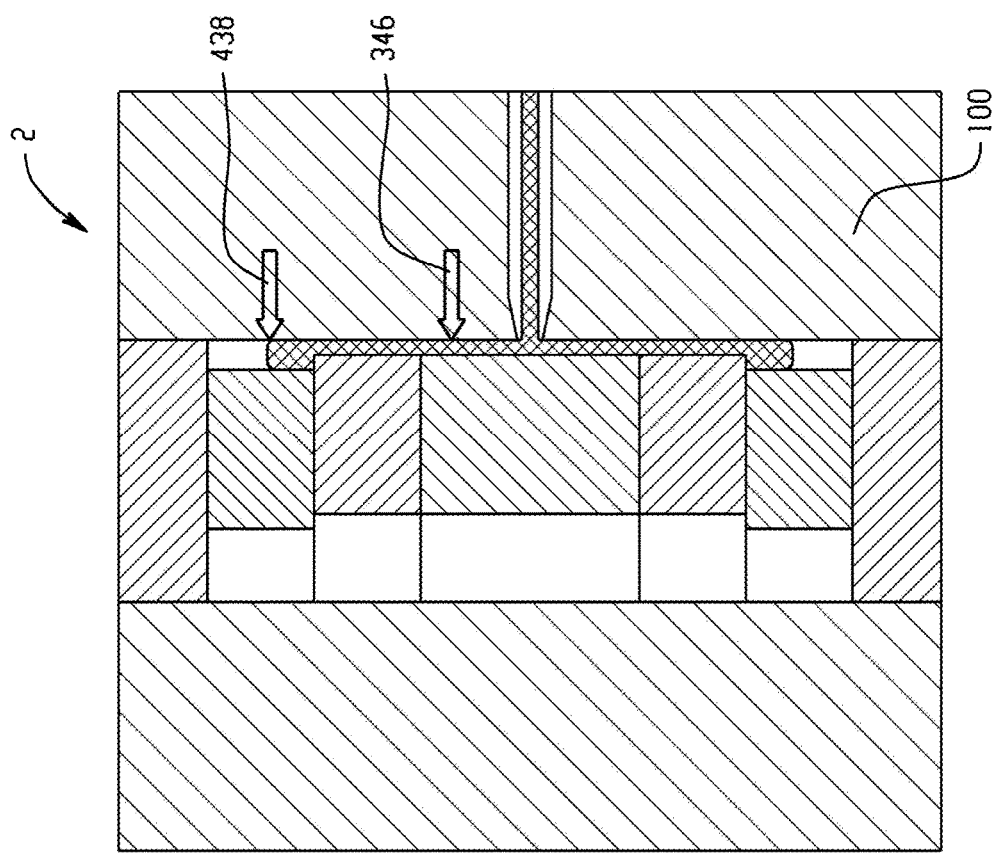
FIG. 41A is a view of the fragmented injection compression molding apparatus of FIG. 39A during movement of the second mold insert.
Figure 41B:
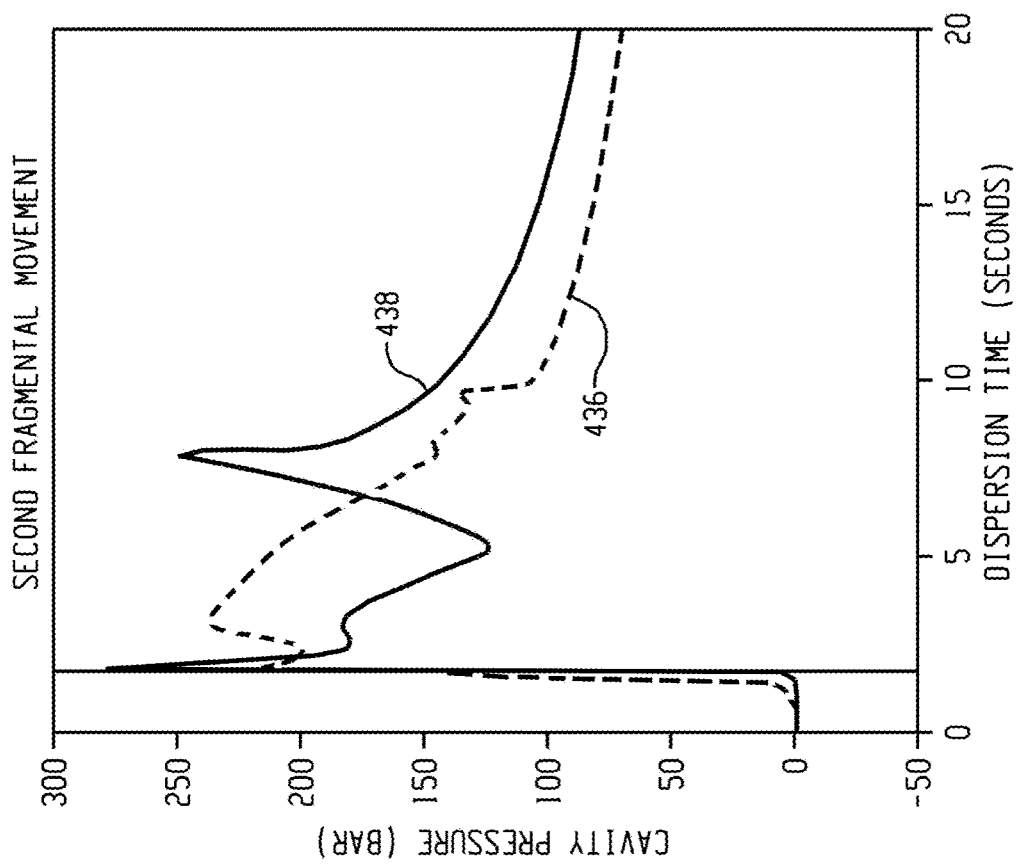
FIG. 41B is a graphical representation of the cavity pressure compared to dispersion time during movement of the second mold insert.
Figure 42A:
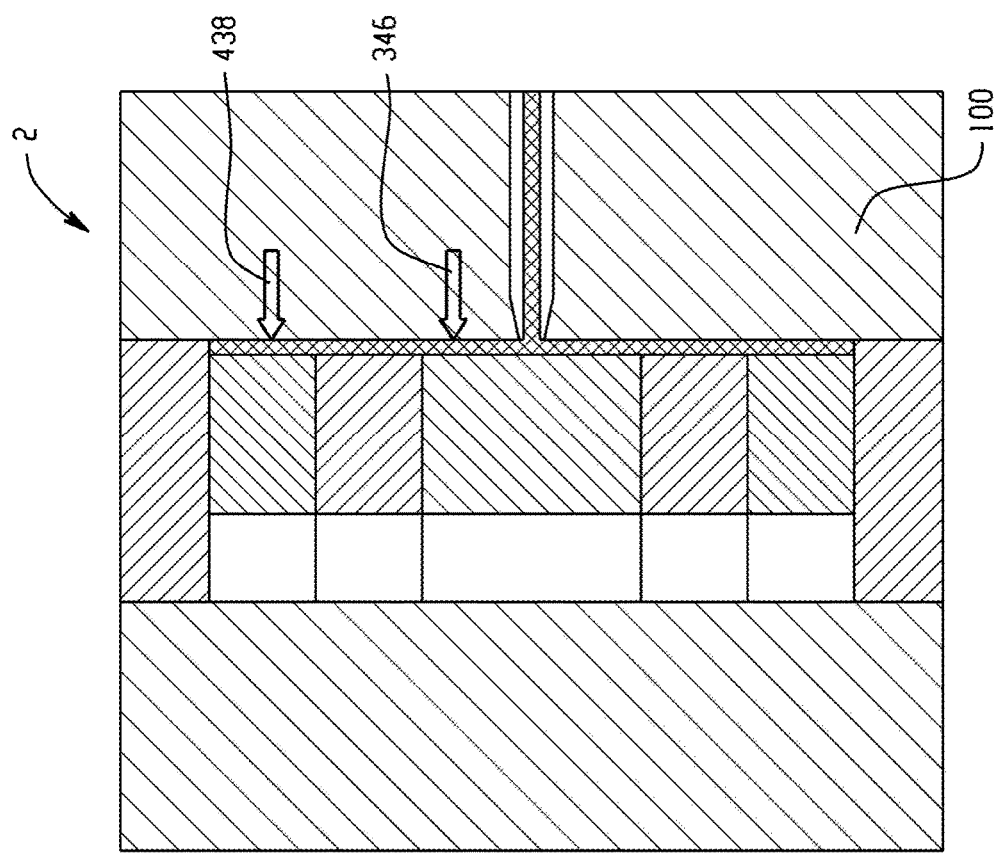
FIG. 42A is a view of the fragmented injection compression molding apparatus of FIG. 39A during movement of the third mold insert.
Figure 42B:
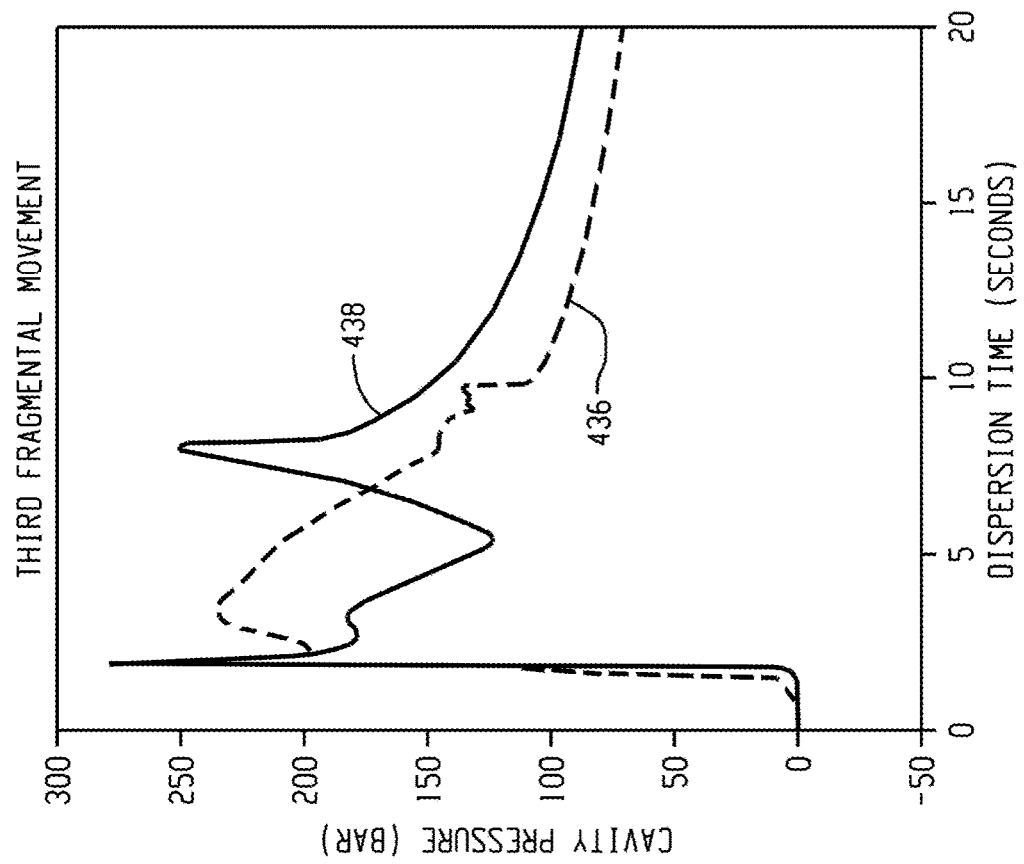
FIG. 42B is a graphical representation of the cavity pressure compared to dispersion time during movement of the third mold insert.
Figure 43A:
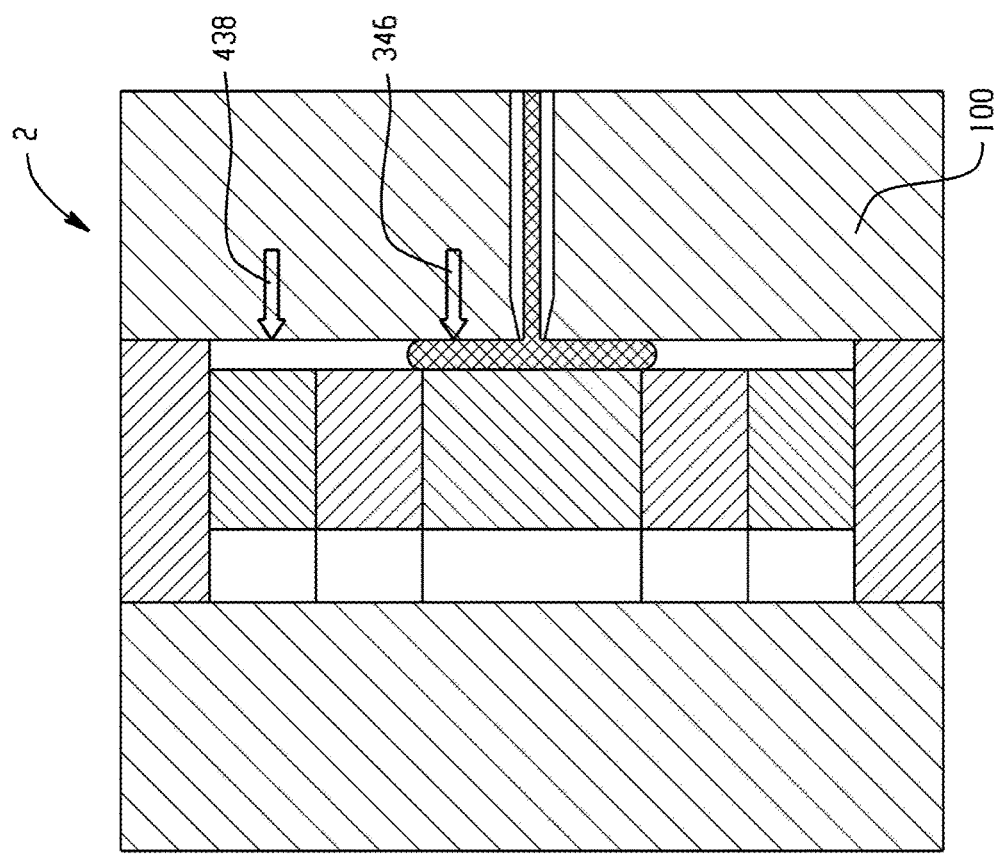
FIG. 43A is a view of the fragmented injection compression molding apparatus of FIG. 39A.
Figure 43B:
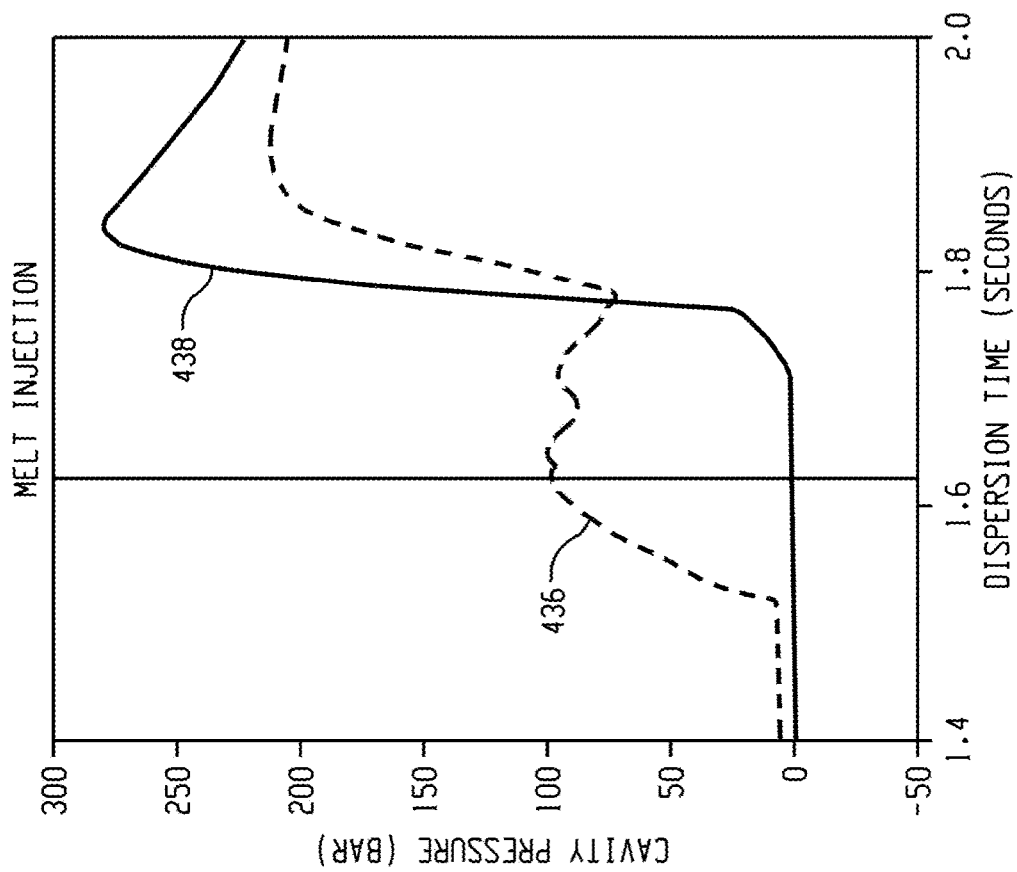
FIG. 43B is a zoomed in graphical representation of the cavity pressure compared to dispersion time in the first two seconds for the fragmented injection compression molding apparatus of FIG. 43A during melt injection.
Figure 44A:
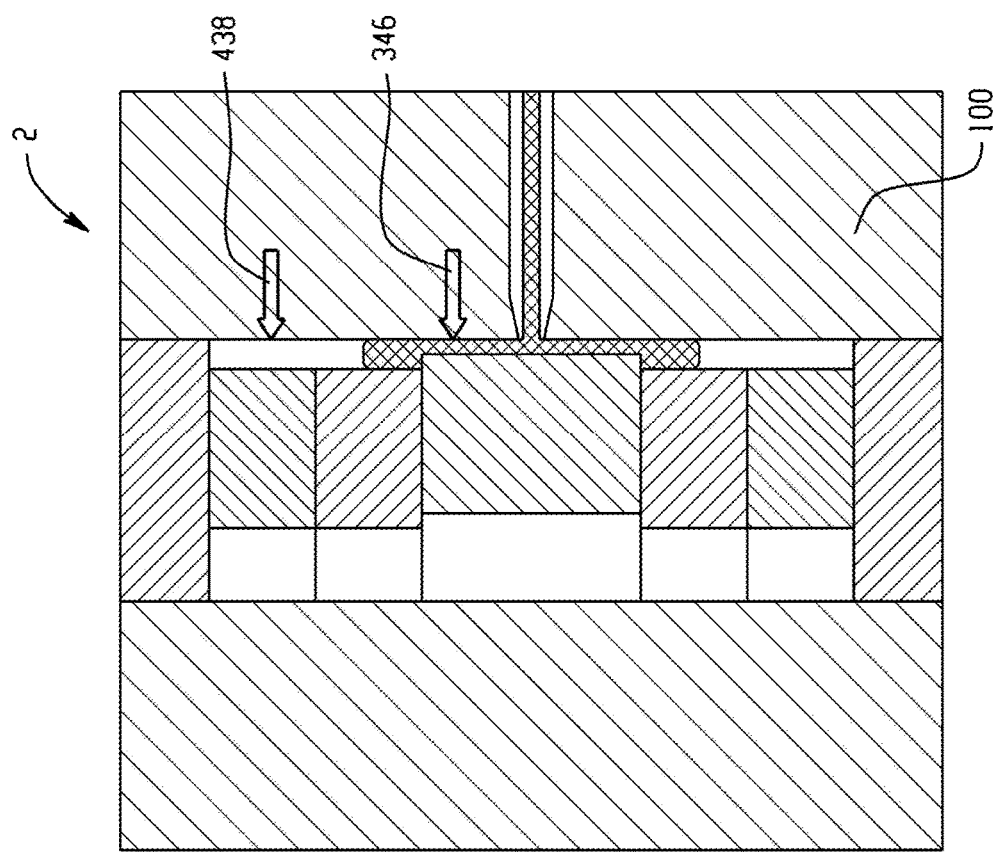
FIG. 44A is a view of the fragmented injection compression molding apparatus of FIG. 40A.
Figure 44B:
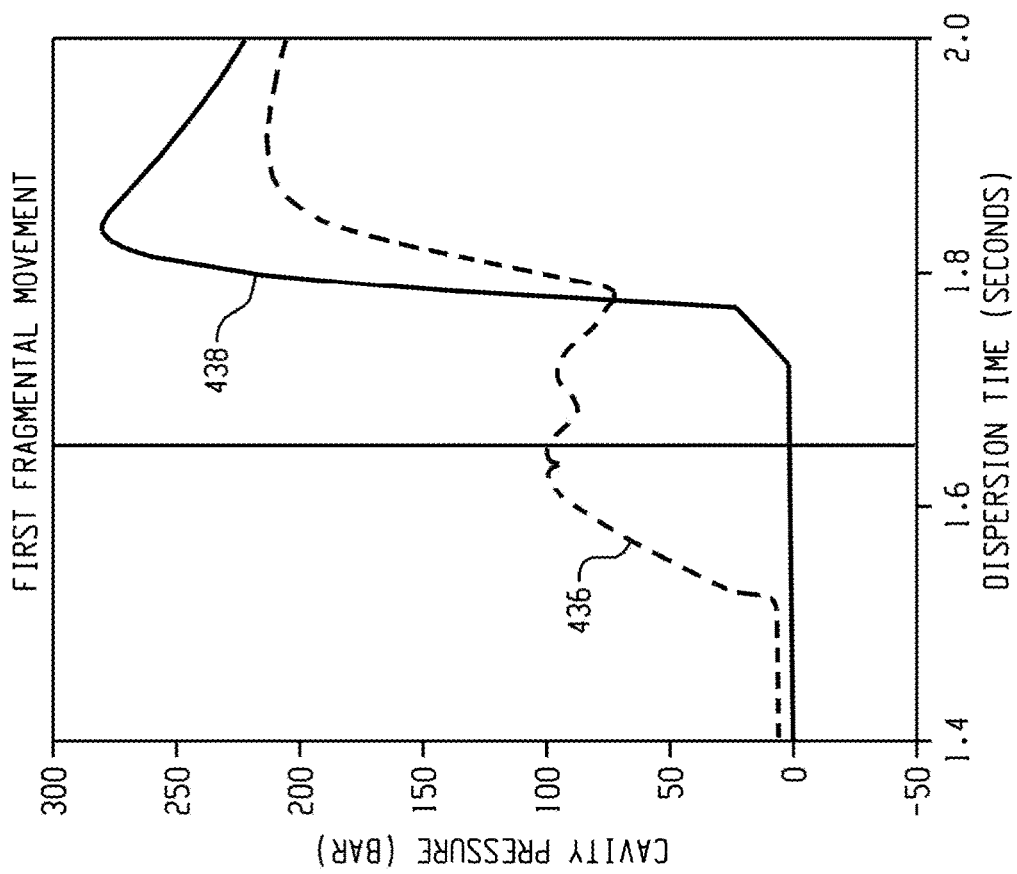
FIG. 44B is a zoomed in graphical representation of the cavity pressure compared to dispersion time in the first two seconds for the fragmented injection compression molding apparatus of FIG. 44A during movement of the first mold insert.
Figure 45A:
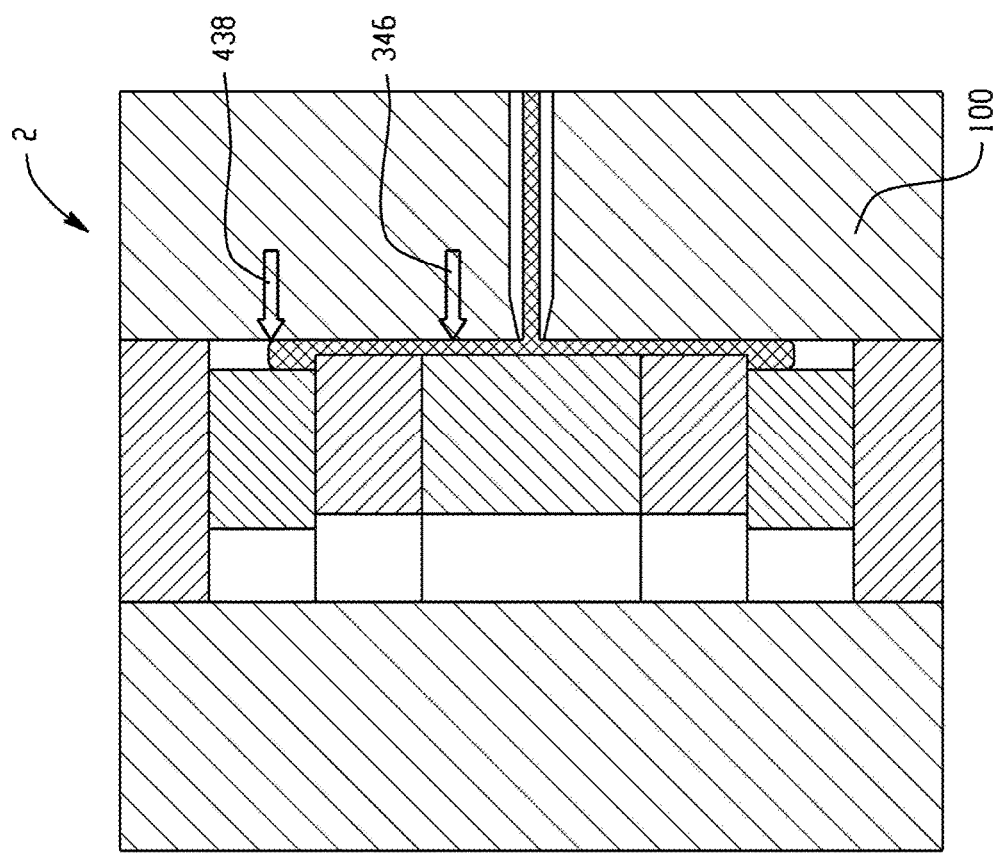
FIG. 45A is a view of the fragmented injection compression molding apparatus of FIG. 41A.
Figure 45B:
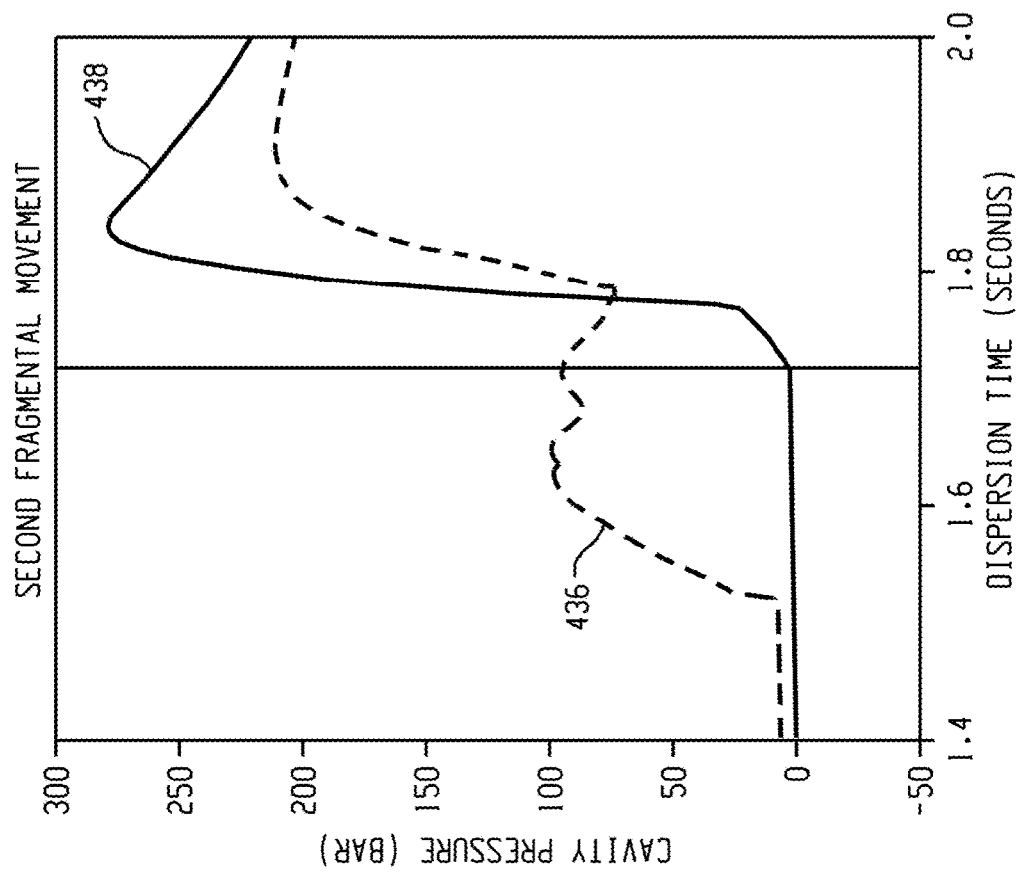
FIG. 45B is a zoomed in graphical representation of the cavity pressure compared to dispersion time in the first two seconds for the fragmented injection compression molding apparatus of FIG. 45A during movement of the first mold insert.
Figure 46A:
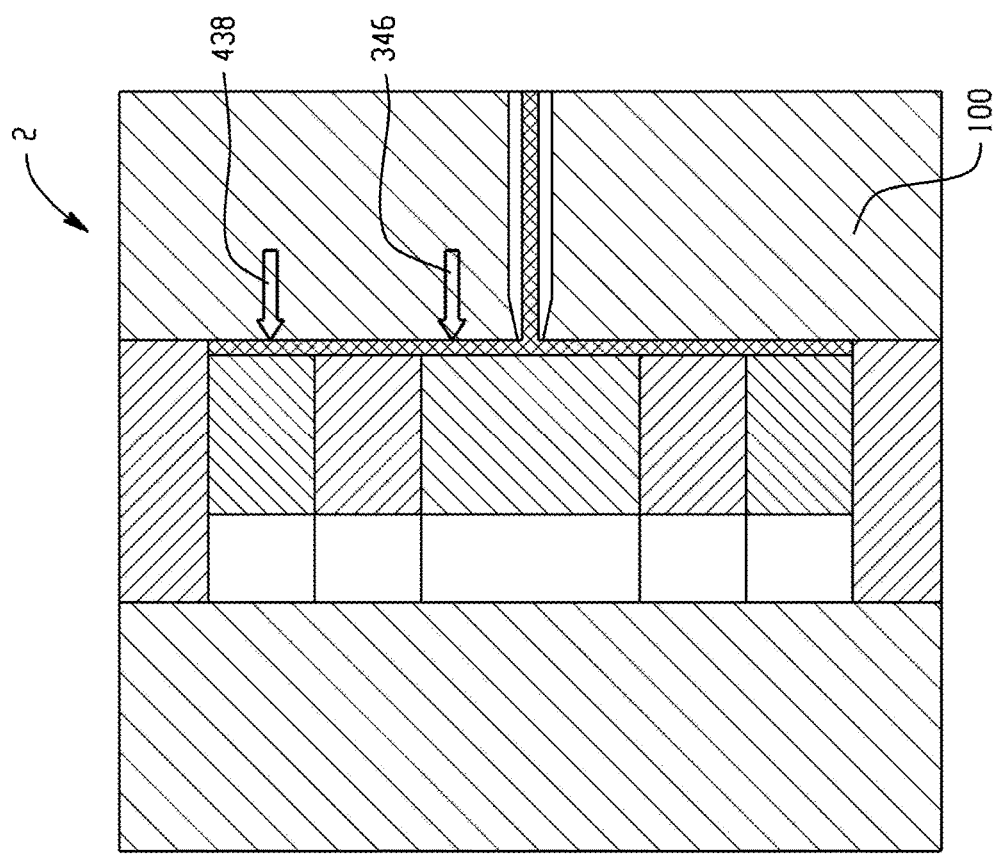
FIG. 46A is a view of the fragmented injection compression molding apparatus of FIG. 42A.
Figure 46B:
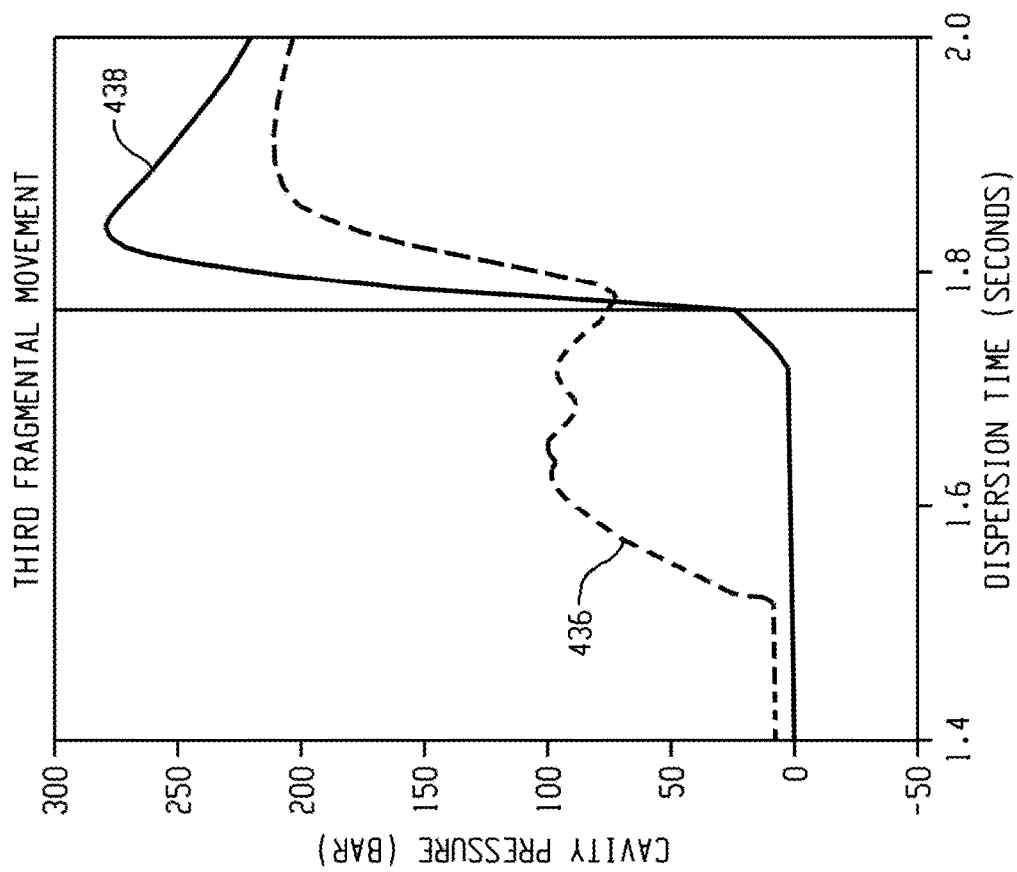
FIG. 46B is a zoomed in graphical representation of the cavity pressure compared to dispersion time in the first two seconds for the fragmented injection compression molding apparatus of FIG. 46A during movement of the first mold insert.
Figure 47:
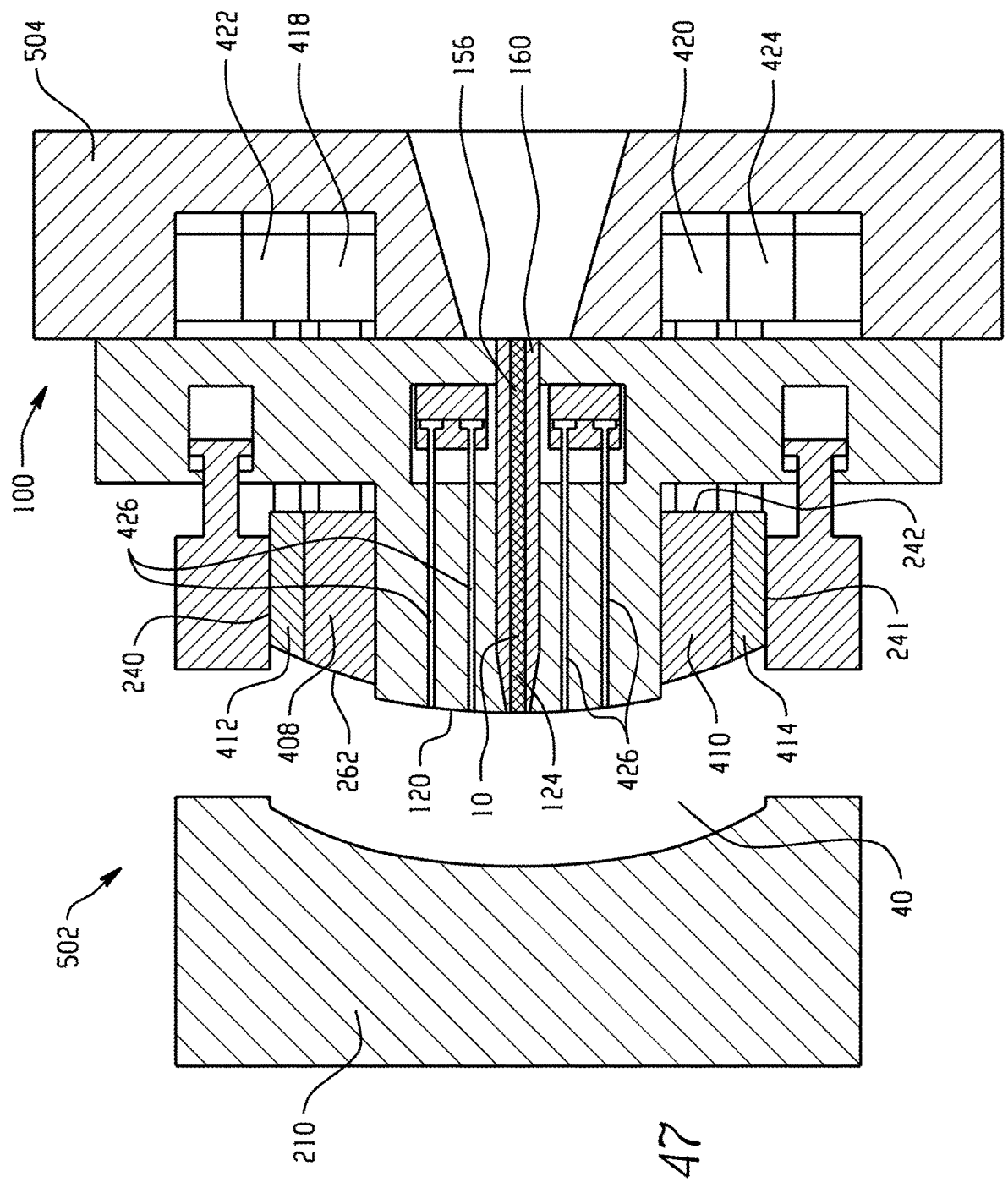
FIG. 47 is a cross-sectional illustration of another molding apparatus in an open position where mold inserts are integral to the molding apparatus and a hot runner system is integrated in a stationary half of the mold.
Figure 48:
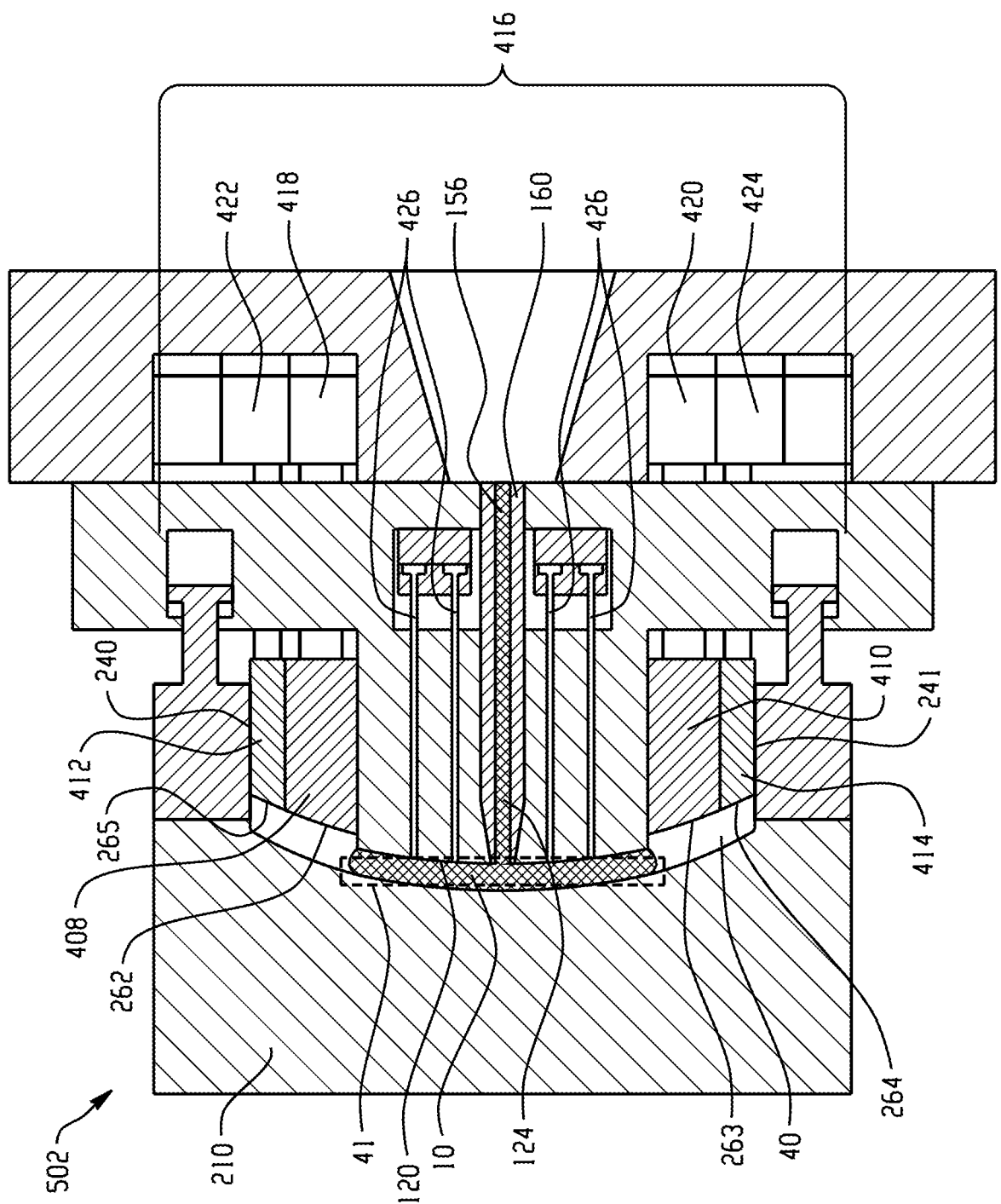
FIG. 48 is a cross-sectional illustration of the molding apparatus of FIG. 47, where material has been injected into the cavity.
Figure 49:
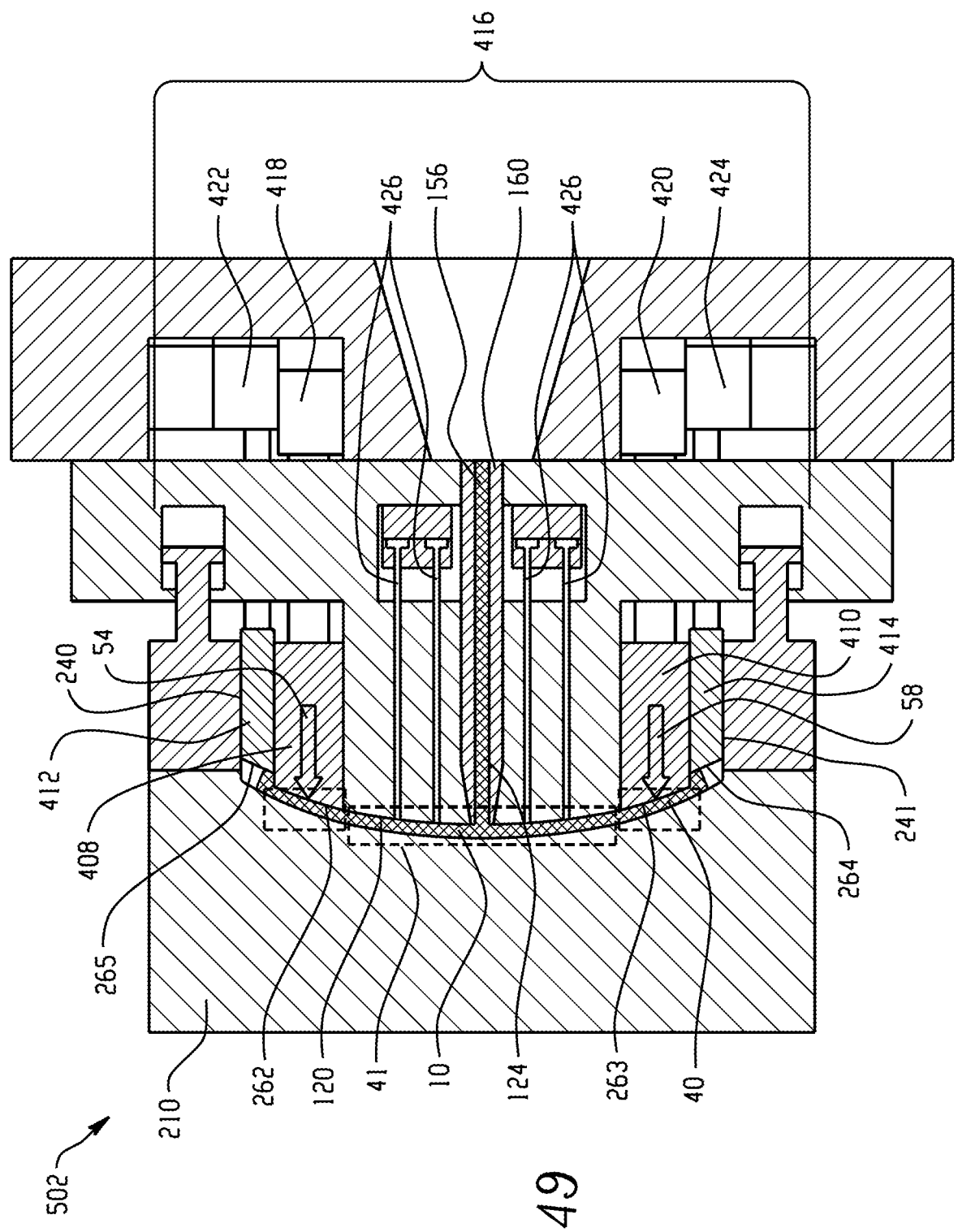
FIG. 49 is a cross-sectional illustration of the molding apparatus of FIG. 48, where mold inserts have been actuated.
Figure 50:
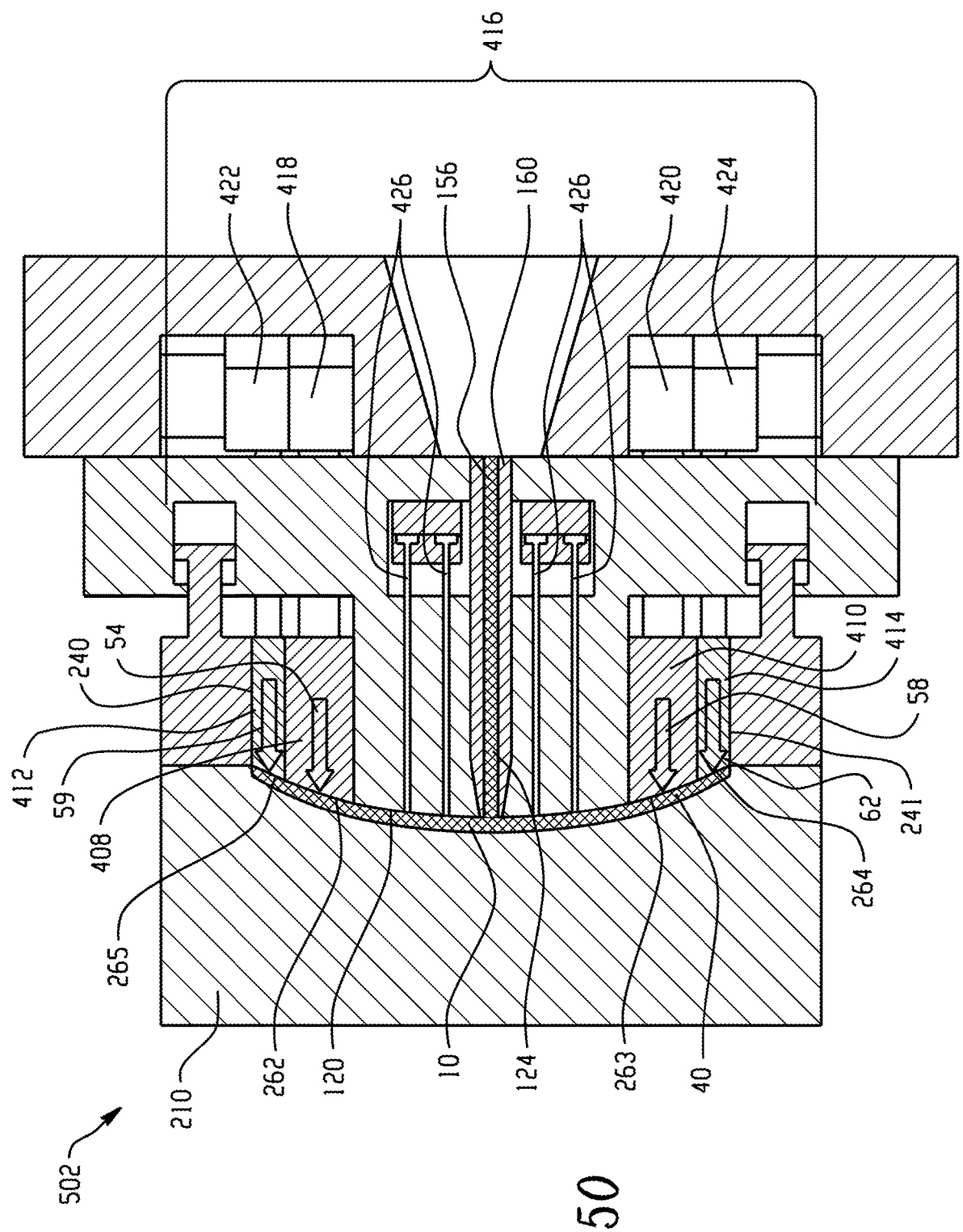
FIG. 50 is a cross-sectional illustration of the molding apparatus of FIG. 49, where the other mold inserts have been actuated.

In this example, cavity pressure was measured at various locations of an injection molding apparatus having the design illustrated in FIGS. 1 to 5. The molding material was a polycarbonate/polyethylene terephthalate blend, XENOY™ X2500UV, commercially available from SABIC's Innovative Plastics business FIGS. 39A, 40A, 41A, 42A, 43A, 44A, 45A, and 46A illustrate position 1 (436) and position 2 (438) on the stationary half 100 of the injection molding apparatus 2. FIG. 39B illustrates the mold in the stage of melt injection; FIG. 40B illustrates the mold during the first mold insert movement; FIG. 41B illustrates the mold during the second mold insert movement; and FIG. 42B illustrates the mold during the third mold insert movement. In each of FIGS. 39B, 40B, 41B, 42B, 43B, 44B, 45B, and 46B cavity pressure measured in bars is plotted against dispersion time measured in seconds (s) at position 1 (436) located close to the gate and at position 2 (438) located at the edge of the cavity. FIGS. 43B, 44B, 45B, and 46B are zoomed in views in the first two seconds of the cycle to show cavity pressures during insert movement. As can be seen in these figures, cavity pressure can be lower, e.g., 3 to 6 times lower, than cavity pressure seen in regular injection molding.

The apparatus and methods disclosed herein include at least the following embodiments:

Embodiment 1

An injection molding apparatus, comprising: a stationary half comprising: a resin mold surface, an opening in the resin mold surface defining a gate, an injection passage extending from the gate through a thickness of the stationary half; and an injector for introducing a molding material through the injection passage and into the molding cavity; a moving half disposed opposite the stationary half; a movable mold insert in mechanical communication with the moving half and comprising an insert molding surface and an insert pressing surface, wherein the movable mold insert is disposed between the moving half and the stationary half and wherein the insert molding surface and the resin mold surface face one another, wherein a molding cavity is formed between the insert molding surface and the resin mold surface; and a moveable insert actuator in mechanical communication with the moving half and the insert pressing surface of the movable mold insert, wherein the movable insert actuator is configured to move the movable mold insert adjusting a molding cavity shape, a molding cavity depth, a molding cavity volume, or a combination comprising at least one of the foregoing; or a movable mold insert in communication with the stationary half and comprising an insert molding surface and an insert pressing surface, wherein the movable mold insert is disposed between the moving half and the stationary half and wherein the insert molding surface and a moving half molding surface face one another, wherein a molding cavity is formed between the insert molding surface and the resin mold surface; and a movable insert actuator in mechanical communication with the stationary half and the insert pressing surface of the movable mold insert, wherein the movable insert actuator is configured to move the movable mold insert adjusting a molding cavity shape, a molding cavity depth, a molding cavity volume, or a combination comprising at least one of the foregoing. Embodiment 2: The injection molding apparatus of Embodiment 1, further comprising a rotatable center mold portion located between the stationary half and the moving half, wherein the center mold portion is configured to rotate formed parts from the stationary half to the moving half. Embodiment 3: The injection molding apparatus of Embodiment 1 or Embodiment 2, wherein the melt is dispersed over the molding surfaces with the movable mold insert. Embodiment 4: The injection molding apparatus of any of the preceding embodiments, comprising 2 to 20 movable mold inserts each having an independent corresponding movable insert actuator. Embodiment 5: The injection molding apparatus of any of the preceding embodiments, comprising 2 to 20 movable mold inserts each having an independent corresponding movable insert actuator, and wherein the movable mold inserts are concentric about a centroid of the molding cavity. Embodiment 6: The injection molding apparatus of any of the preceding embodiments, further comprising 2 to 20 openings in the resin mold surface defining 2 to 20 gates, wherein the gates are adjacent to the molding cavity and 2 to 20 mold passages corresponding to the gates for transferring the material from the injector through the gates and into the molding cavity. Embodiment 7: The injection molding apparatus of any of the preceding embodiments, wherein the molding cavity area is greater than or equal to 1 square meter. Embodiment 8: The injection molding apparatus of any of the preceding embodiments, wherein the molding cavity depth is less than or equal to 10 millimeters. Embodiment 9: The injection molding apparatus of any of the preceding embodiments, wherein the moveable mold insert is formed integrally with the stationary half of the molding apparatus, located in a fixed plate of the molding apparatus. Embodiment 10: A part formed in the injection molding apparatus of any of the preceding embodiments. Embodiment 11: The part of Embodiment 10, wherein the part comprises a surface area corresponding to the molding cavity area and a thickness corresponding to the molding cavity depth. Embodiment 12: The part of Embodiment 10 or Embodiment 11, wherein the part is formed from a material comprising a polymeric material. Embodiment 13: The part of Embodiment 12, wherein the polymeric material has a melt flow rate of less than or equal to 12. Embodiment 14: The part of Embodiment 12 or Embodiment 13, wherein the polymeric material has a shear rate of 50 to 100,000 s−1. Embodiment 15: The part of any of Embodiments 10-14, wherein the part includes a vehicular body panel. Embodiment 16: The part of any of Embodiment 10-15, wherein the part comprises a polymeric material and a composite sheet.

Embodiment 17

A method for forming a part in an injection mold, comprising: heating a molding material to a molding temperature, wherein the molding temperature is greater than or equal to at least one of a glass transition temperature or a melting point temperature of the molding material; injecting the molding material through a gate and into a molding cavity of the injection molding apparatus of any of the preceding embodiments; pressing the stationary half and the moving half together to form the molding cavity between the resin mold surface and the insert molding surface; moving the movable mold insert, and thereby moving the insert molding surface and adjusting the molding cavity shape, the molding cavity depth, the molding cavity volume, or a combination comprising at least one of the foregoing along at least a portion of the molding cavity; cooling a surface of the molding cavity with the cooling system; separating the resin mold surface and the moving half mold surface; and ejecting the part from the injection molding apparatus. Embodiment 18: The method of Embodiment 17, wherein the molding material has a melt flow rate of less than or equal to 12. Embodiment 19: The method of Embodiment 17 or Embodiment 18, where a shear rate of the molding material is 50 to 100,000 s−1. Embodiment 20: The method of any of Embodiments 17-19, wherein moving the movable mold insert further comprises moving the movable mold insert toward the stationary half, away from the stationary half, or a combination comprising at least one of the foregoing. Embodiment 21: The method of any of Embodiments 17-20, wherein moving the movable mold inserts is effected by a wedge mechanism, sliding cantilever mechanism, or a double sliding cantilever mechanism Embodiment 22: The method of any of Embodiments 17-21, wherein moving the movable mold insert further comprises moving a first movable mold insert followed by moving other movable mold inserts until the molding cavity volume defines a final molding cavity volume corresponding to the part volume. Embodiment 23: The method of any of Embodiments 17-22, wherein moving the movable mold insert further comprises pushing the molding material within the molding cavity by moving the movable mold insert. Embodiment 24: The method of any of Embodiments 17-23, comprising further compressing the molding material within the cavity after movement of the movable mold inserts has finished. Embodiment 25: The method of Embodiment 24, wherein compression is effected by compression of clamping plates of the injection molding apparatus or by further movement of the movable mold inserts. Embodiment 26: The method of any of Embodiments 17-25, further comprising sequentially injecting the molding material through more than one gate. Embodiment 27: The method of any of Embodiments 17-26, wherein the molding cavity area is greater than or equal to 1 square meter. Embodiment 28: The method of any of Embodiments 17-27, wherein moving the movable mold insert comprises moving a plurality of movable mold inserts in a sequential manner. Embodiment 29: The method of any of Embodiments 17-28, further comprising raising a wall temperature of the injection mold to a temperature greater than the molding material's glass transition temperature or melt temperature and after injection of the molding material, rapidly cooling the wall temperature. Embodiment 30: The method of any of Embodiments 17-29, further comprising coating using an additional material onto the formed part on a Class A surface side of the part. Embodiment 31: The method of any of Embodiments 17-30, further comprising placing an inlay of material in the mold before the mold is closed and overmolding the molding material to the inlay of material.

Embodiment 32

A method of making a vehicular body panel, comprising: heating a molding material to a molding temperature, wherein the molding temperature is greater than or equal to at least one of a glass transition temperature or a melting point temperature of the molding material; injecting the molding material through a gate and into a molding cavity of the injection molding apparatus of any of Embodiments 1-8; pressing the stationary half and the moving half together to form the molding cavity between the resin mold surface and the insert molding surface; moving the movable mold insert, and thereby moving the insert molding surface and adjusting the molding cavity shape, the molding cavity depth, the molding cavity volume, or a combination comprising at least one of the foregoing along at least a portion of the molding cavity to form the vehicular body panel; cooling a surface of the molding cavity with the cooling system; separating the resin mold surface and the moving half mold surface; and ejecting the vehicular body panel from the injection molding apparatus.

Embodiment 33

A compression molding apparatus includes: a movable mold insert in mechanical communication with a moving half and comprising an insert molding surface and an insert pressing surface, wherein the movable mold insert is disposed between the moving half and a stationary half and wherein the insert molding surface and the resin mold surface face one another, wherein a molding cavity is formed between the insert molding surface and the resin mold surface; and a moveable insert actuator in mechanical communication with the moving half and the insert pressing surface of the movable mold insert, wherein the movable insert actuator is configured to move the movable mold insert adjusting a molding cavity shape, a molding cavity depth, a molding cavity volume, or a combination comprising at least one of the foregoing; or a movable mold insert in communication with the stationary half and comprising an insert molding surface and an insert pressing surface, wherein the movable mold insert is disposed between the moving half and the stationary half and wherein the insert molding surface and a moving half molding surface face one another, wherein a molding cavity is formed between the insert molding surface and the resin mold surface; and a movable insert actuator in mechanical communication with the stationary half and the insert pressing surface of the movable mold insert, wherein the movable insert actuator is configured to move the movable mold insert adjusting a molding cavity shape, a molding cavity depth, a molding cavity volume, or a combination comprising at least one of the foregoing. Embodiment 34: The compression molding apparatus of Embodiment 33, wherein the movable insert actuator comprises a ball and socket joint with a shaft having a width that 1 times greater than a radius of the ball, preferably, 1.5 times greater, more preferably, 2 times greater.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. An injection molding apparatus, comprising:
   a stationary half comprising:
      a resin mold surface,
      an opening in the resin mold surface defining a gate, and
      an injection passage extending from the gate through a thickness of the stationary half;
   an injector for introducing a first molding material through the injection passage and into a first molding cavity;
   a moving half disposed opposite the stationary half;
   movable mold inserts integrated in the stationary half and respectively define insert molding surfaces and an insert pressing surfaces,
   wherein the movable mold inserts are configured to move toward and away from the moving half, and
   wherein the insert molding surfaces and the moving half face one another,
   wherein a side of the first molding cavity is formed by the insert molding surfaces and the resin mold surface, and
   a movable insert actuator in mechanical communication with the stationary half and the insert pressing surfaces of the movable mold inserts,
   wherein the movable insert actuator is configured to move the movable mold inserts, thereby adjusting a molding cavity shape, a molding cavity depth, a molding cavity volume, or a combination comprising at least one of the foregoing; and
   a movable center mold portion is located between the stationary half and the moving half,
   wherein the movable center mold portion is configured to move, by slide, swivel or rotate, a formed part from the first molding cavity, between the movable center mold portion and the stationary half, to a second molding cavity, between the movable center mold portion and the moving half; and
   the moving half including a hot runner system that forms a ribbed structure mold in the movable half, wherein the hot runner system is configured to inject a second molding material onto the formed part to form a ribbed part that is over-molded onto the formed part.

2. The injection molding apparatus of claim 1, wherein the melt is dispersed over the molding surfaces with the movable mold insert.

3. The injection molding apparatus of claim 1, wherein the molding cavity area is greater than or equal to 1 square meter.

4. The injection molding apparatus of claim 1, wherein the molding cavity depth is less than or equal to 10 millimeters.

5. A method for forming a part in an injection mold, comprising:
heating a molding material to a molding temperature, wherein the molding temperature is greater than or equal to at least one of a glass transition temperature or a melting point temperature of the molding material;
injecting the molding material through a gate and into a molding cavity of the injection molding apparatus of claim 1;
pressing the stationary half and the moving half together to form the molding cavity between the resin mold surface and the insert molding surface;
moving the movable mold insert, and thereby moving the insert molding surface and adjusting the molding cavity shape, the molding cavity depth, the molding cavity volume, or a combination comprising at least one of the foregoing along at least a portion of the molding cavity;
cooling a surface of the molding cavity with the cooling system;
separating the resin mold surface and the moving half mold surface; and
ejecting the part from the injection molding apparatus.

6. The method of claim 5, wherein moving the movable mold insert further comprises moving the movable mold insert toward the stationary half, away from the stationary half, or a combination comprising at least one of the foregoing.

7. The method of claim 5, wherein moving the movable mold inserts is effected by a wedge mechanism, sliding cantilever mechanism, or a double sliding cantilever mechanism.

8. The method of claim 5, wherein moving the movable mold insert further comprises moving a first movable mold insert followed by moving other movable mold inserts until the molding cavity volume defines a final molding cavity volume corresponding to the part volume.

9. The method of claim 5, comprising further compressing the molding material within the cavity after movement of the movable mold inserts has finished, wherein compression is effected by compression of clamping plates of the injection molding apparatus or by further movement of the movable mold inserts.

10. The method of claim 5, further comprising raising a wall temperature of the injection mold to a temperature greater than the molding material's glass transition temperature or melt temperature and after injection of the molding material, rapidly cooling the wall temperature.

11. The method of claim 5, further comprising coating using an additional material onto the formed part on a Class A surface side of the part.

* * * * *